United States Patent
Matsunaga

(10) Patent No.: US 8,139,255 B2
(45) Date of Patent: Mar. 20, 2012

(54) IMAGE READING APPARATUS AND CONTROL PROGRAM FOR IMAGE READING APPARATUS FOR DETERMINING OUTPUT RANGE OF IMAGE DATA BASED ON REFERENCE-RANGE INFORMATION OF SUCH IMAGE DATA

(75) Inventor: Keiichi Matsunaga, Seto (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1084 days.

(21) Appl. No.: 11/768,896

(22) Filed: Jun. 26, 2007

(65) Prior Publication Data

US 2008/0002237 A1  Jan. 3, 2008

Related U.S. Application Data

(63) Continuation-in-part of application No. 11/740,709, filed on Apr. 26, 2007.

(30) Foreign Application Priority Data

Jun. 30, 2006 (JP) ................ 2006-181760

(51) Int. Cl.
*H04N 1/04* (2006.01)
(52) U.S. Cl. ........................ 358/1.16; 358/1.17
(58) Field of Classification Search .............. 358/1.16, 358/1.17
See application file for complete search history.

(56) References Cited

U.S. PATENT DOCUMENTS

2006/0002051 A1* 1/2006 Goudy, Jr. ............ 361/220
2006/0232831 A1* 10/2006 Chiba ................ 358/448

FOREIGN PATENT DOCUMENTS

| JP | H04-322558 A | 11/1992 |
|----|----|----|
| JP | H09-281754 A | 10/1997 |
| JP | 10098609 A | 4/1998 |
| JP | 2000168975 A | 6/2000 |
| JP | 2001337662 A | 12/2001 |
| JP | 2003219122 A | 7/2003 |

OTHER PUBLICATIONS

PowerPoint 2000/98: Visual QuickStart Guide By: Rebecca Bridges Altman Date: May 7, 1999 (ISBN 0-201-35441-1) p. 393, 394, 439, 440, 455, 458, 459.*

Japan Patent Office, Notification of Reason for Refusal for Japanese Patent Application No. 2006-126980 (counterpart to above-captioned patent application), dispatched Mar. 15, 2011.

* cited by examiner

*Primary Examiner* — Benny Tieu
*Assistant Examiner* — Qian Yang
(74) *Attorney, Agent, or Firm* — Baker Botts L.L.P.

(57) ABSTRACT

An image reading apparatus including: a reading device; a display device; an operable portion; an outputting portion which outputs the image data; an image-data storing portion which successively stores a prescribed amount of the image data; a reference-range-information storing portion which stores reference-range information that is required to determine a reference range of the image data; a reference-range managing portion which determines the reference range and which successively updates the information such that the reference range is successively updated at a prescribed timing by a prescribed size; a display controlling portion which controls the display device to display the display image; a timing controlling portion which controls updating intervals at which the reference range is updated; a command detecting portion which detects a specific command; and an output-range determining portion which determines an output range of the image data.

15 Claims, 18 Drawing Sheets

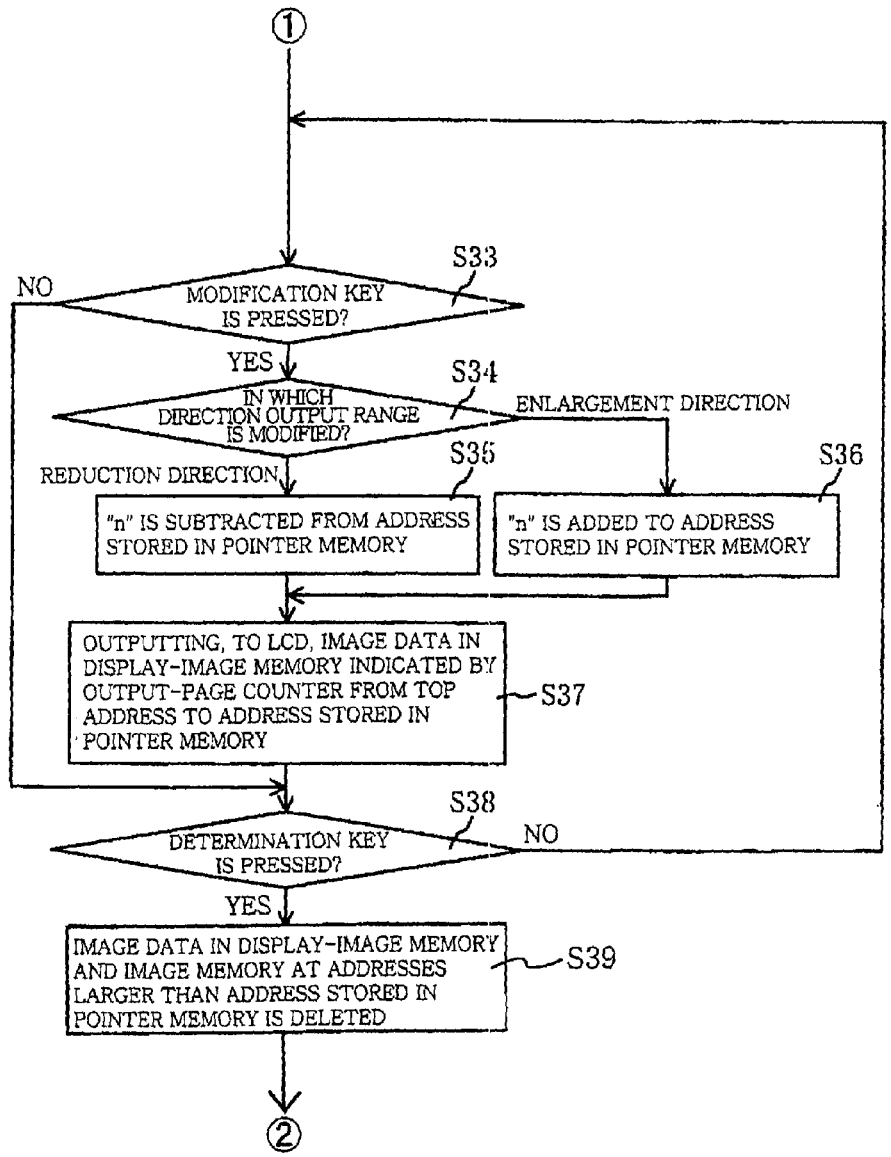

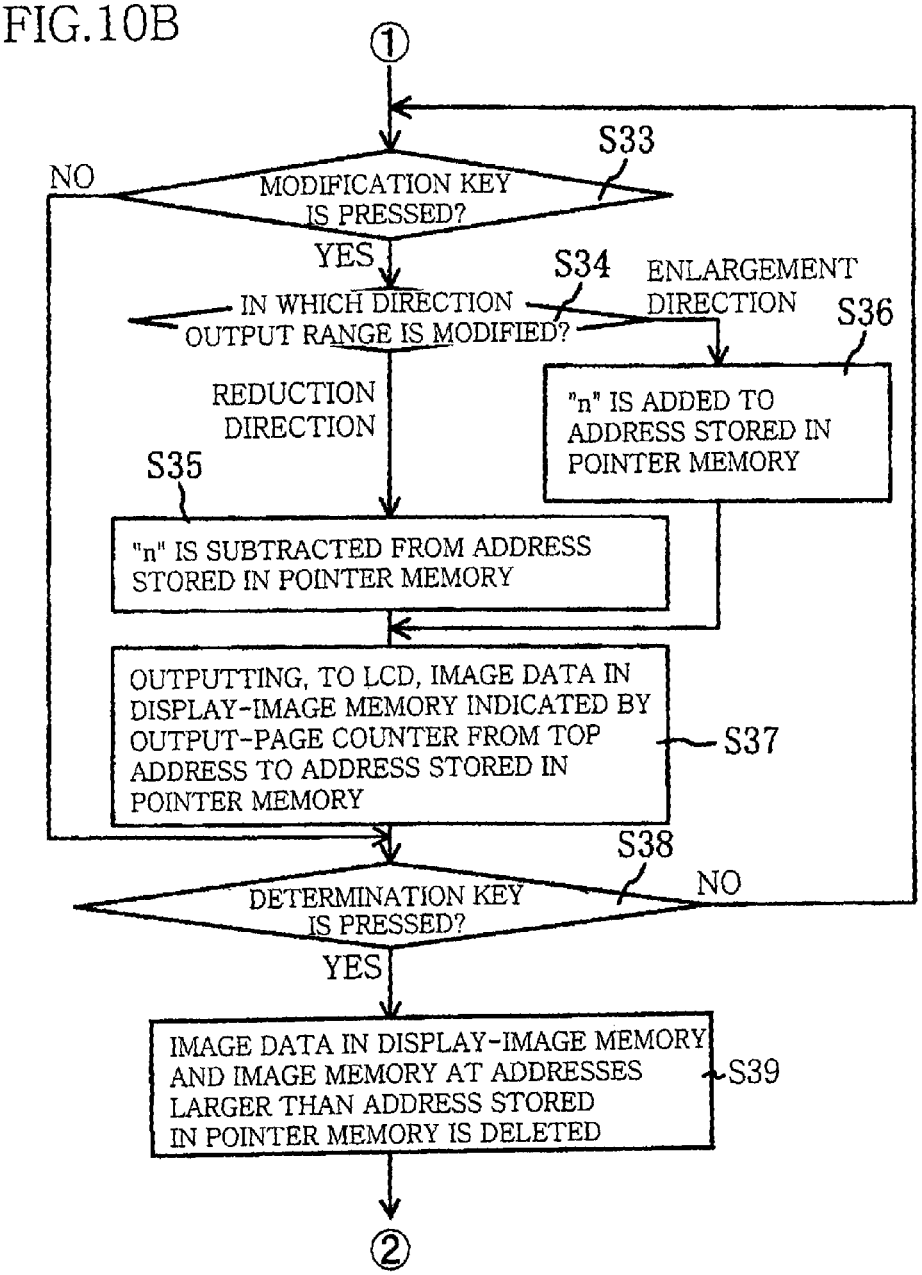

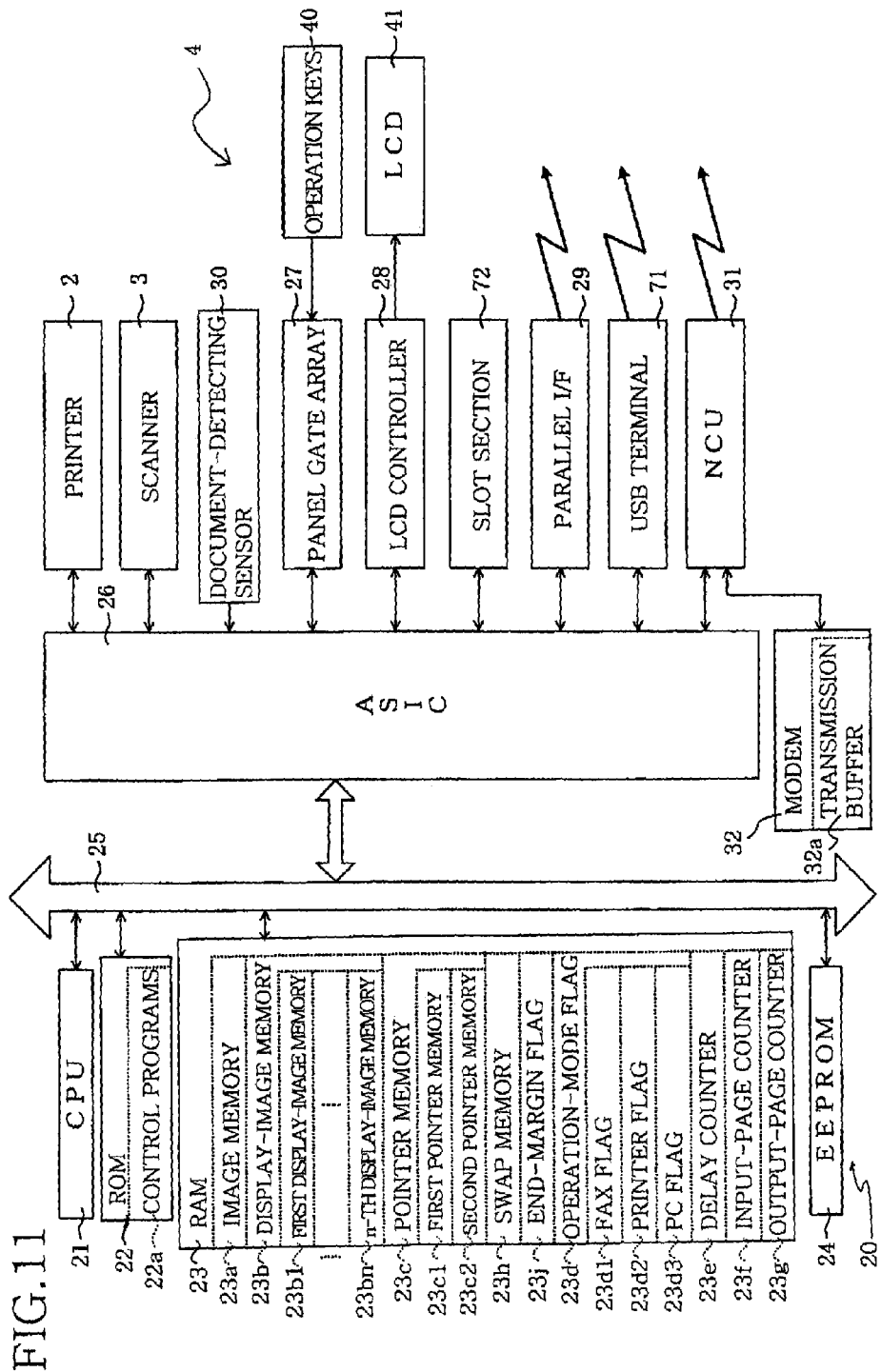

IMAGE READING APPARATUS AND CONTROL PROGRAM FOR IMAGE READING APPARATUS FOR DETERMINING OUTPUT RANGE OF IMAGE DATA BASED ON REFERENCE-RANGE INFORMATION OF SUCH IMAGE DATA

The present application is a continuation-in-part application derived from U.S. patent application Ser. No. 11/740,709 filed on Apr. 26, 2007 and is based on Japanese Patent Application No. 2006-181760 filed on Jun. 30, 2006, the contents of which are incorporated herein by reference.

BACKGROUND OF THE INVENTION

1. Field of the Invention

The present invention relates in general to an image reading apparatus and a computer-readable carrier containing a control program for the image reading apparatus. In particular, the invention relates to an image reading apparatus and a computer-readable carrier containing a control program for the image reading apparatus which permit an output range of read image data to be easily and appropriately set to a range desired by an operator.

2. Discussion of Related Art

An image reading apparatus, such as a facsimile machine, a copying machine, or a scanner, is provided with operation keys and a display portion. A user or an operator operates the apparatus using the operation keys and recognizes or checks an operating state of the apparatus on the display portion. Once the image reading apparatus starts reading a document upon manipulation of the operation keys by the user, image data of the document which has been read is outputted to a device which is supposed to receive the image data (hereinafter, referred to as "image-data receiving device" where appropriate). Where the image reading apparatus is a facsimile machine, the image-data receiving device is a recipient's facsimile machine that is connected, via communication lines, to the image reading apparatus. In this instance, the image data which has been read is transmitted to the recipient's facsimile machine via the communication lines. Where the image reading apparatus is a copying machine, the image-data receiving device is a printer incorporated in the copying machine. In this instance, an image based on the read image data is recorded by the printer on a recording sheet. Where the image reading apparatus is a scanner, the read image data is outputted to a personal computer (hereinafter abbreviated as "PC") as the image-data receiving device. Based on the image data inputted to the PC, an image is recorded by a printer connected to the PC. Alternatively, the image data inputted to the PC is written into a storage medium via a driver.

In recent years, there has been proposed an image reading apparatus configured such that the read image data is outputted to and displayed on the display portion as an image, which display portion is provided integrally with or independently of the image reading apparatus, thereby permitting a user or operator to confirm or check the displayed image that is based on the read image data. In such an image reading apparatus, a scanning portion for reading a document is configured to convert a light incident thereupon from a document surface to electric signals by means of a Charge Coupled Device (CCD), convert the thus obtained analog signals into image data in a digital form via an A/D converter, and output the image data. The image data outputted from the scanning portion is stored in a storage portion of the image reading apparatus, extracted depending upon a resolution for indication on the display portion, and then outputted to the display portion. This is because the resolution for image displaying on the display portion is generally lower than resolution for reading. The proposed image reading apparatus is configured such that the image displaying on the display portion is performed substantially concurrently with the reading by the scanning portion. The thus constructed reading apparatus is disclosed in a Patent Document 1 (JP-A-2001-337662), for instance.

SUMMARY OF THE INVENTION

In facsimile machines and copying machines, the reading of the document and the outputting of the read image data are performed on a document-by-document basis, so that the read image data of the document is entirely outputted to the image-data receiving device even if unnecessary image data is contained in the document, in other words, even if the operator does not desire outputting the entire image data of the document. That is, the conventional reading apparatus is configured to perform an outputting operation for the unnecessary image data as well, undesirably increasing a required processing time from the reading to the outputting. Further, the image-data receiving device inevitably needs to receive the unnecessary image data, resulting in a wasteful time in receiving and outputting the image data and causing wasteful consumption of recording sheets, inks, etc.

The reading apparatus disclosed in the above-indicated Patent Document 1 is equipped with a display device which sequentially displays images based on image data read by the scanning portion. Accordingly, it is possible for the operator to check a current reading position in the document. In the disclosed reading apparatus, however, it is not possible to partially read the document, namely, to partially obtain the image data of the document.

Further, in the reading apparatus disclosed in the above-indicated Patent Document 1, an image displaying speed increases with an increase in an image reading speed, making it difficult for the operator to visually check the image displayed on the display portion. In particular when a plurality of documents are successively read, the image on the display portion successively changes. In this instance, the operator may only be able to merely acknowledge that the reading of the documents is actually performed. Thus, it is impossible for the operator, on the basis of the image displayed on the display portion in parallel with the reading of the documents, to conduct a detailed checking of the image that corresponds to the read image data, such as a checking of an order of the documents and a checking whether the read documents are intended documents. In the conventional reading apparatus, therefore, it is difficult for the operator to determine a part of the image data of the image which is displayed on the display portion in parallel with the reading of the document, as an output range of the image data to be outputted.

It is therefore an object of the present invention to provide an image reading apparatus and a computer-readable carrier containing a control program for the image reading apparatus which permit an operator to easily and appropriately set an output range of the read image data to a range desired by the operator.

To achieve the object indicated above, the present invention provides an image reading apparatus comprising: a reading device which reads an image of a document to obtain image data of the image by scanning; a display device which displays a display image based on the image data read by the reading device; an operable portion which is to be operated by an operator; an outputting portion which outputs the image data read by the reading device; an image-data storing portion which successively stores, in a memory, a prescribed amount of the image data read by the reading device each time when the prescribed amount of the image data is read by the reading device, a reference-range-information storing portion which stores reference-range information that is required to determine a reference range of the image data; a reference-range managing portion which determines, on the basis of the reference-range information stored in the reference-range-information storing portion, the reference range in the image data that is stored in the memory by the image-data storing portion and which successively updates the reference-range information such that the reference range is successively updated at a prescribed timing by a prescribed size; a display controlling portion which controls the display device to display the display image such that the reference range which is updated on the basis of the reference-range information is visually recognizable on the display device; a timing controlling portion which controls updating intervals at which the reference range is updated by the prescribed size, such that an amount of the image data that corresponds to an amount of change of the reference range in a certain time period is smaller than an amount of the image data to be stored in the memory in the certain time period; a command detecting portion which detects a specific command which is to be inputted through the operable portion; and an output-range determining portion which determines an output range of the image data to be outputted by the outputting portion, on the basis of the reference range decided based on the reference-range information that is the most recently updated by the reference-range managing portion, when the specific command is detected by the command detecting portion.

To achieve the object indicated above, the present invention also provides an image reading apparatus comprising: a reading device which reads an image of a document to obtain image data of the image by scanning; a display device which displays a display image based on the image data read by the reading device; an operable portion which is to be operated by an operator; an outputting portion which outputs the image data read by the reading device; an image-data storing portion which successively stores, in a memory, a prescribed amount of the image data read by the reading device each time when the prescribed amount of the image data is read by the reading device; a display controlling portion which controls the display device to successively display as the display image, in a reading order, parts of the image of the document sequentially, based on the image data stored in the memory by the image-data storing portion, at a speed lower than a speed at which the reading device reads the image of the document; a command detecting portion which detects a specific command which is to be inputted through the operable portion; and an output-range determining portion which determines, upon detection of the specific command by the command detecting portion, an output range of the image data to be outputted by the outputting portion, on the basis of the display image displayed on the display device.

To achieve the object indicated above, the present invention also provides a computer-readable carrier containing a control program for an image reading apparatus comprising: a reading device which reads an image of a document to obtain image data of the image by scanning; a display device which displays a display image based on the image data read by the reading device; and an operable portion which is to be operated by an operator, the control program comprising: an image-data storing step of successively storing, in a memory, a prescribed amount of the image data read by the reading device each time when the prescribed amount of the image data is read by the reading device; a reference-range managing step of determining, on the basis of reference-range information required for determining a reference range of the image data, the reference range in the image data that is stored in the memory in the image-data storing step and successively updating the reference-range information such that the reference range is successively updated at a prescribed timing by a prescribed size; a display controlling step of controlling the display device to display the display image such that the reference range which is updated on the basis of the reference-range information is visually recognizable on the display device; a timing controlling step of controlling updating intervals at which the reference range is updated by the prescribed size, such that an amount of the image data that corresponds to an amount of change in the reference range in a certain time period is smaller than an amount of the image data to be stored in the memory in the certain time period; a command-detecting step of detecting a specific command which is to be inputted through the operable portion; an output-range determining step of determining an output range of the image data, on the basis of the reference range decided based on the reference-range information that is the most recently updated in the reference-range managing step, when the specific command is detected in the command detecting step; and an outputting step of outputting the image data within the reference range determined in the output-range determining step.

According to the image reading apparatus and the computer-readable carrier containing the control program for the image reading apparatus, the output range of the image data can be easily and appropriately set to the range desired by the operator.

FORMS OF CLAIMABLE INVENTION

There will be described in detail various forms of an invention which is considered claimable (hereinafter referred to as "claimable invention" where appropriate). Each of the forms of the claimable invention is numbered like the appended claims and depends from the other form or forms, where appropriate, for easier understanding of the claimable invention. It is to be understood that the invention is not limited to the technical features or any combinations thereof which will be described, and shall be construed in the light of the following descriptions of the various forms and preferred embodiments of the claimable invention. It is to be further understood that a plurality of elements or features included in any one of the following forms of the claimable invention are not necessarily provided all together, and that any form in which one or more elements or one or more features is/are added to any one of the following forms and any form in which one or more elements or one or more features is/are deleted from any one of the following forms may be considered one form of the claimable invention.

(1) An image reading apparatus comprising:

a reading device which reads an image of a document to obtain image data of the image by scanning;

a display device which displays a display image based on the image data read by the reading device;

an operable portion which is to be operated by an operator;

an outputting portion which outputs the image data read by the reading device;

an image-data storing portion which successively stores, in a memory, a prescribed amount of the image data read by the reading device each time when the prescribed amount of the image data is read by the reading device, a reference-range-information storing portion which stores reference-range information that is required to determine a reference range of the image data;

a reference-range managing portion which determines, on the basis of the reference-range information stored in the reference-range-information storing portion, the reference range in the image data that is stored in the memory by the image-data storing portion and which successively updates the reference-range information such that the reference range is successively updated at a prescribed timing by a prescribed size;

a display controlling portion which controls the display device to display the display image such that the reference range which is updated on the basis of the reference-range information is visually recognizable on the display device;

a timing controlling portion which controls updating intervals at which the reference range is updated by the prescribed size, such that an amount of the image data that corresponds to an amount of change of the reference range in a certain time period is smaller than an amount of the image data to be stored in the memory in the certain time period;

a command detecting portion which detects a specific command which is to be inputted through the operable portion; and an output-range determining portion which determines an output range of the image data to be outputted by the outputting portion, on the basis of the reference range decided based on the reference-range information that is the most recently updated by the reference-range managing portion, when the specific command is detected by the command detecting portion.

In the image reading apparatus according to the above form (1), the image data read by the reading device is successively stored in the memory by the image-data storing portion. Based on the image data stored in the memory, the image is displayed on the display device by the display controlling portion, and the reference range which is successively updated by the prescribed size is displayed, for the display image, so as to be visually recognizable.

Further, the timing controlling portion controls the updating intervals at which the reference range that is displayed on the display device is updated by the prescribed size, such that the amount of the image data that corresponds to the amount of change of the reference range in the certain time period is smaller than the amount of the image data to be stored in the memory in the certain time period.

In this connection, the prescribed size by which the reference range is updated may correspond to the prescribed amount of the image data to be stored in the memory. In this instance, the timing controlling portion may be configured to control the updating intervals at which the reference range that is displayed on the display device is updated by the prescribed size, such that the updating intervals are longer than storing intervals at which the prescribed amount of the image data is stored in the memory by the image-data storing portion.

The reference range is based on the reference-range information stored in the reference-range-information storing portion. The reference-range information is required to determine the reference range of the image data and is stored in the reference-range-information storing portion. On the basis of the reference-range information, the reference-range managing portion determines the reference range in the image data stored in the memory and successively updates the reference-range information such that the reference range is successively updated at the prescribed timing by the prescribed size.

When the command detecting portion detects the specific command, the output-range determining portion determines the output range of the image data to be outputted by the outputting portion, on the basis of the reference range decided based on the reference-range information that is the most recently updated by the reference-range managing portion. The reference range which is displayed on the display device changes every moment. Accordingly, the operator can determine a desired range as the output range of the image data by operating the operable portion to input the specific command at a timing when the reference range displayed on the display device becomes equal to the desired range.

The present arrangement enables the operator to select and output the image data required by the operator, thereby obviating needless outputting of unnecessary image data that is not required by the operator. In other words, the arrangement avoids a problem that whole image data of the document is outputted even though the image data which is desired by the operator to be outputted is only a part of the image data of the document. Therefore, the arrangement reduces a time required for outputting the image data to the above-described image-data receiving device and enables the image data to be outputted with high efficiency.

Moreover, in the present arrangement wherein the reference range which is displayed on the display device is updated by the prescribed size, namely, wherein the indication of the reference range on the display device is dynamically changed, the operator can easily determine the output range for the image data of the image of the read document simply by judging a timing of operating the operable portion, i.e., by inputting the specific command. That is, the operator need not perform any operation of changing the reference range such that the reference range which is displayed on the display device becomes equal to the desired range, thereby simplifying the required operations to be performed by the operator through the operable portion and improving operability.

The present apparatus may be configured such that, when the specific command is inputted or detected, the apparatus determines, as the output range, a range of the image data that corresponds to the reference range being displayed on the display device. For instance, the apparatus may be configured to determine an end margin of the output range. Alternatively, the apparatus may be configured such that, when the specific command is inputted or detected, the apparatus determines, as the output range, a range of the image data except the image data within the reference range displayed on the display device. For instance, the apparatus may be configured to determine a beginning margin of the output range. Further, a number of times of the operation to be made through the operable portion is not limited to one time, but may be plural times. For instance, two operations which are to be made through the operable portion for inputting the specific commands may be set as a pair, and the apparatus may be configured to determine, as the output range, a range which is not yet made as the reference range at a timing of detecting a first command and which is made as the reference range at a timing of detecting a second command. That is, the beginning margin of the output range is determined based on the reference range at the timing of detecting the first command and the end margin of the output range is determined based on the reference range at the timing of detecting the second command. Moreover, the reference-range information may be updated such that the reference range increases by the prescribed size. Alternatively, the reference-range information may be updated such that the reference range reduces by the prescribed size.

(2) The image reading apparatus according to the above form (1), wherein the timing controlling portion includes a time counter which measures a prescribed time that corresponds to a time length of each of the updating intervals, and wherein the reference-range managing portion is configured to update the reference-range information when a count value counted by the time counter reaches a prescribed count value.

In the image reading apparatus according to the above form (2), the reference range is updated when the count value counted by the time counter reaches the prescribed count value. Accordingly, the indication of the reference range on the display device can be updated at appropriate intervals. For instance, the present arrangement realizes, with a simple structure, a control for controlling the updating intervals to be made longer than the storing intervals at which the prescribed amount of the image data is stored in the memory by the image-data storing portion.

(3) The image reading apparatus according to the above form (2), further comprising a prescribed-count-value setting portion which sets the prescribed count value, on the basis of information inputted through the operable portion.

In the image reading apparatus according to the above form (3), the prescribed count value to be counted by the time counter can be set by the prescribed-count-value setting portion on the basis of information inputted through the operable portion. Because the reference range which is displayed on the display device is updated when the count value counted by the time counter reaches the prescribed count value, an updating speed at which the reference range is updated can be suitably changed by changing the prescribed count value. Accordingly, as compared with an arrangement in which the updating speed or intervals of updating the reference range is fixed or constant, the reference range which is displayed can be updated at an appropriate speed depending upon the skill of the operator, the degree of difficulty in recognizing or identifying the document, and so on.

In short, by inputting the specific command at a timing when the reference range which is displayed on the display device becomes equal to the desired range, the operator can determine the desired range as the output range. Therefore, the arrangement enables the operator to appropriately identify a current reference range in the reference range that changes every moment.

In general, as the updating speed of updating the image on the display device becomes lower, the operator can easily recognize or identify a difference between the image before updating and the image after updating. In this instance, however, the speed of performing the processing is lowered as a whole. On the contrary, as the image updating speed becomes higher, the speed of performing the processing can be made higher. In this instance, however, the operator may have a difficulty in recognizing or identifying the image displayed on the display device. In addition, even if the document to be processed is the same, the degree of difficulty in recognizing the document varies depending upon the skill of individual operators. Hence, a speed of displaying the reference range on the display device (i.e., the updating intervals of the reference range) is configured to be changeable as described above, whereby the reference range which is displayed can be updated at an optimum displaying speed for each of the individual operators (i.e., at optimum updating intervals for the individual operators). The arrangement avoids updating the indication of the reference range at an excessively high speed that makes it impossible for the operator to recognize the image based on the image data in the reference range. Further, the arrangement avoids updating the indication of the reference range at a speed lower than necessary to permit the operator to recognize the image based on the image data in the reference range. As a result, the arrangement offers the image reading apparatus with high operating use that is widely adaptable to various operators having various degrees of recognition ability.

(4) The image reading apparatus according to any one of the above forms (1)-(3), wherein the display controlling portion is configured to control the display device to display, as the display image, an image of the document that corresponds to the image data within the reference range.

In the image reading apparatus according to the above form (4), the display controlling portion controls the display device to display the image of the document based on the image data within the reference range which is decided based on the reference-range information stored in the reference-range-information storing portion. Accordingly, the image displayed on a display screen of the display device corresponds to the image data within the reference range, whereby the reference range is represented by the image based on the read image data. Therefore, the operator can easily judge up to what extent the image data is to be included in the output range.

Moreover, the image displayed on the display device corresponds to the image data within the reference range. Accordingly, the image data corresponding to the reference range that is updated by the prescribed size is successively outputted to the display device, so that there are successively displayed, on the display device, images which correspond to the reference range successively updated.

Consequently, the present arrangement eliminates provision of means of indicating, on the image displayed on the display device, a cursor or the like for determining the output range of the image data, means of moving the cursor in response to operations made through the operable portion, etc. Therefore, the arrangement simplifies the apparatus structure and permits the output range to be efficiently and easily determined.

(5) The image reading apparatus according to the above form (4), wherein the reference-range managing portion is configured to update the reference-range information such that the reference range increases by the prescribed size.

In the image reading apparatus according to the above form (5), the reference-range information can be updated by the reference-range managing portion such that the reference range increases by the prescribed size. In a case where the reference range is made as the output range, even if the operator misses a timing of inputting the specific command when the displayed reference range becomes equal to the desired range, the image data that should be included in the output range cannot be omitted therefrom since the reference range increases such that the image data is added. In other words, the operator can input the specific command enough time after the displayed reference range of the image data becomes equal to the desired output range, without a need of inputting the specific command at an accurate timing. Therefore, the arrangement facilitates the operation of determining the output range, ensuring easy handling of the apparatus.

In a case where the reference range is made as the output range, the image based on the image data to be included in the output range is displayed on the display device such that images each based on the prescribed amount of the image data are successively added. As compared with a case in which the reference-range information is updated such that the reference range of the image data reduces by the prescribed size, the operator can easily confirm whether the reference range reaches the desired output range. In an arrangement wherein the image is displayed such that the images each based on the prescribed amount of the image data are successively deleted, when it is confirmed whether the desired image data is included in the reference range, it is impossible for the operator to confirm whether the desired image data was included in the deleted images on the basis of the display image being displayed on the display device. In contrast, in the present arrangement wherein the image is displayed such that the images each based on the prescribed amount of the image data are successively added, the operator can confirm whether the desired image data is included in the reference range only on the basis of the display image being displayed on the display device.

(6) The image reading apparatus according to any one of the above forms (1)-(3), wherein the reference-range managing portion is configured to update the reference-range information such that the reference range increases by the prescribed size, and wherein the display controlling portion is configured to control the display device to display, as the display image, a part of the image of the document that corresponds to the image data within the reference range, such that, each time when the reference range increases by the prescribed size, the display device displays, by scrolling, an image based on the image data that corresponds to the prescribed size of the reference range by which the reference range is increased.

In the image reading apparatus according to the above form (6), the following processing is repeatedly performed on the display image that is displayed on the display device: (i) a prescribed amount of an image portion that is the most previously displayed is deleted; (ii) remaining image portions are shifted toward an area in which the deleted image portion has been displayed; and (iii) the prescribed amount of a new image portion is displayed on a blank area which is made as a result of the shifting of the remaining image portions. The processing indicated above is repeated, so that the image can be displayed in a scrolling manner. Thus, the image can be displayed on the display device in such a manner that enables the operator to visually recognize the image with ease. In general, the display device provided in the image reading apparatus is designed to have a smaller size than the document to be read due to a limitation in the mechanical structure. In the thus designed display device, the image is displayed inevitably in a smaller size than the document, considerably deteriorating the viewability of the document content. In the present arrangement, however, the image at be displayed in the scrolling manner, so that the whole image of the document need not be displayed on one display screen. Accordingly, there can be sequentially displayed images of sections of the document. In other words, the image to be displayed on one display screen at a time can be made as a part of the whole image of the document. Where each of the images of the sections of the document is displayed on one display screen, the image can be displayed in enlargement, as compared when the whole image of the document is displayed on one display screen. As a result, the viewability of the display image that is displayed on the display device can be improved.

(7) The image reading apparatus according to any one of the above forms (1)-(6), wherein the reference-range managing portion is configured to stop updating the reference-range information when the specific command is detected by the command detecting portion.

In the image reading apparatus according to the above form (7), when the specific command is detected by the command detecting portion, the reference-range managing portion stops updating the reference-range information. According to the arrangement, the output range determined by the operator coincides with the output range determined in the apparatus, so that the output range desired by the operator can be outputted to the image-data receiving device with high accuracy. That is, the operation of internally determining the output range of the image data is performed based on the reference-range information updated by the reference-range managing portion. On the other hand, the operator visually identifies the reference range displayed on the display device and inputs the specific command. In this instance, if the reference-range information continues to be updated even though the specific command is inputted, there may be caused a problem that the desired output range determined by the operator does not coincide with the internally determined output range. According to the present arrangement, however, the reference-range managing portion stops updating the reference-range information when the specific command is detected by the command detecting portion, thereby preventing the desired output range determined by the operator and the internally determined output range from becoming inconsistent with each other.

(8) The image reading apparatus according to any one of the above forms (1)-(7), wherein reference-range managing portion is configured to determine the reference range such that a beginning margin of the reference range corresponds to a reading-start margin of the document from which the reading device starts reading and to update the reference-range information such that an end margin of the reference range is updated.

In the image reading apparatus according to the above form (8), the reference-range managing portion determines, as the beginning margin of the reference range, the reading-start margin of the document. For instance, in a case where the reference range is made as the output range, when the specific command is detected by the command detecting portion, the output-range determining portion (i) determines, as an end margin of the output range, the end margin of the reference range which is newly decided based on the reference-range information that is the most recently updated by the reference-range managing portion and (ii) determines, as the output range of the image data to be outputted by the outputting portion, a range from the reading-start margin of the document (that is determined as the beginning margin of the reference range by the reference-range managing portion) to the end margin.

According to the above exemplified arrangement, the operator need not determine a beginning margin of the output range. For determining the output range, it is only required for the operator to visually identify the reference range displayed on the display device and simply operate the operable portion to input the specific command at a timing when the reference range becomes equal to the desired range. Therefore, the above exemplified arrangement facilitates and simplifies the operation required for the operator to determine the output range.

(9) The image reading apparatus according to any one of the above forms (1)-(3), wherein the display controlling portion is configured to control the display device to display, as the display image, an image of the document based on the image data stored in the memory and includes a marker indicating portion which indicates a marker for identifying the reference range at a position in the display image, which position is decided based on the reference-range information.

In the image reading device according to the above form (9), the marker indicating portion indicates a marker that identifies the reference range, at a position on the display image displayed on the display device based on the image data, which position is decided based on the reference-range information updated by the reference-range managing portion. According to the arrangement, the reference range is indicated by the marker on the display image displayed on the display device. The marker on the display screen of the display device is indicated in accordance with the reference-range information that is successively updated by a prescribed amount, so that an indication position of the marker moves or slides on the display screen without needing any operation by the operator. Accordingly, the operator can easily determine the output range simply by judging a timing of operating the operable portion, i.e., by inputting the specific command. Thus, the operator need not operate the operable portion for moving the marker, thereby simplifying the required operations to be made through the operable portion by the operator and improving the operability.

The marker is for identifying the reference range that is successively updated by the prescribed size, such that the reference range is visually recognizable. The updating intervals at which the reference range displayed on the display device is successively updated by the prescribed size are controlled by the timing control portion such that the amount of the image data that corresponds to the amount of change of the reference range in the certain time period is smaller than the amount of the image data to be stored in the memory in the certain time period.

Accordingly, the marker indicated on the display image moves at a speed different from image reading speed, namely, at a speed lower than the image reading speed at which the reading device reads the document image. Hence, the operator can visually follow or grasp, with ease, a current indication position of the marker which changes every moment, so that the operator can input the prescribed command at an appropriate timing and accurately determine the desired output range, based on the position of the marker indicated on the display device.

(10) The image reading apparatus according to the above form (9), wherein the reference-range managing portion is configured to update the reference-range information such that the reference range of the image data increases by the prescribed size.

In the image reading apparatus according the above form (10), the reference-range managing portion updates the reference-range information such that the reference range of the image data increases by the prescribed size. In a case where the reference range is made as the output range, even if the operator misses a timing of inputting the specific command when the displayed reference range becomes equal to the desired range, the image data that should be included in the output range cannot be omitted therefrom since the reference range increases such that the image data is added. In other words, the operator can input the specific command enough time after the displayed reference range of the image data becomes equal to the desired output range without a need of inputting the specific command at an accurate timing. Therefore, the arrangement facilitates the operation of determining the output range, ensuring easy handling of the apparatus.

(11) The image reading apparatus according to the above form (9) or (10), wherein the reference-range managing portion is configured to stop updating the reference-range information when the specific command is detected by the command detecting portion, and wherein the marker indicating portion is configured to make the marker static at a time when the reference-range managing portion stops updating the reference-range information.

In the image reading apparatus according to the above form (11), the reference-range managing portion stops updating the reference-range information when the specific command is detected by the command detecting portion, so that the marker indicated by the marker indicating portion is made static on the display device. Therefore, the present arrangement prevents occurrence of inconsistency between the output range determined by the operator owing to a judgment based on the marker indicated on the display device and the internally determined output range.

In short, when the reference range becomes equal to the desired range, the operator inputs the specific command to determine the output range. In this connection, the operation of internally determining the output range for the image data is performed based on the reference-range information updated by the reference-range managing portion. Accordingly, by stopping updating the reference-range information when the specific command is detected by the command detecting portion, it is possible to prevent the desired output range determined by the operator and the internally determined output range from becoming inconsistent with each other.

(12) The image reading apparatus according to any one of the above forms (9)-(11), wherein the reference-range-managing portion is configured to determine the reference range such that a beginning margin of the reference range corresponds to one end of the display image and to update the reference-range information such that an end margin of the reference range is updated, and wherein the marker indicating portion is configured to indicate the marker at a position in the display image that corresponds to the end margin of the reference image, such that the marker moves from said one end to another end of the display image in accordance with the updating of the reference-range information.

In the image reading apparatus according to the above form (12), the marker indicating portion indicates the marker such that the marker moves from one end to another end of the display image displayed on the display device. In brief, the reference-range managing portion determines, as the beginning margin of the reference range, a move-start margin of the display image from which the marker starts moving. For instance, in a case where the reference range is made as the output range, upon detection of the specific command by the command detecting portion, the output-range determining portion (i) determines, as an end margin of the output range, the end margin of the reference range which is newly decided based on the reference-range information that is the most recently updated by the reference-range managing portion and (ii) determines, as the output range of the image data to be outputted by the outputting portion, a range from the reading-start margin of the document (that is determined as the beginning margin of the reference range by the reference-range managing portion) to the end margin.

According to the above exemplified arrangement, the operator need not determine a beginning margin of the output range. For determining the output range, it is only required for the operator to visually identify the reference range displayed on the display device, namely, visually identify the indication position of the marker, and simply operate the operable portion to input the specific command at a timing when the indication position of the marker reaches a position indicative of the desired range. Therefore, the above exemplified arrangement facilitates and simplifies the operation required for the operator to determine the output range.

(13) The image reading apparatus according to any one of the above forms (9)-(12), wherein the command detecting portion is configured to detect two specific commands each as the specific command, wherein the reference-range managing portion is configured to update the reference-range information such that a beginning margin and an end margin of the reference range are updated independently of each other, wherein the marker indicating portion is configured to indicate two markers each as the marker, such that one of the two markers is indicated at a position corresponding to the end margin of the reference range while the other of the two markers is indicated at a position corresponding to the beginning margin of the reference range, and wherein the output-range determining portion is configured to determine an end margin of the output range on the basis of the end margin of the reference range at a time when said one of the two specific commands is detected and determine a beginning margin of the output range on the basis of the beginning margin of the reference range at a time when the other of the two specific commands is detected.

In the image reading apparatus according to the above form (13), in short, the command detecting portion detects the specific command plural times, i.e., a plurality of specific commands. For instance, upon detection of one of the plurality of specific commands by the command detecting portion, the reference-range managing portion determines one margin of the reference range based on the reference-range information stored in the reference-range-information storing portion. Moreover, upon detection of another one of the plurality of specific commands following the above-indicated one of the plurality of specific commands, the reference-range managing portion determines another margin of the reference range based on the reference-range information stored in the reference-range-information storing portion. For instance, in a case where the reference range is made as the output range, the output-range determining portion determines, as the output range, a range interposed between the above-indicated one margin and another margin.

According to the arrangement, the above-indicated one margin of the output range is not fixedly set at a certain position, e.g., at the beginning margin or the end margin of the document, thereby improving a degree of freedom in setting the output range for the document. In other words, in a case where the output range is determined only by one certain specific command, only one end of the output range can be determined, and therefore another end of the output range needs to be fixedly set at a predetermined position, e.g., at the beginning margin or the end margin of the document. In this instance, when the output range desired by the operator is located distant from the beginning margin or the end margin of the document, for instance, the image data existing between the beginning margin or the end margin of the document and one of the opposite margins of the desired output range is inevitably included in the output range. That is, the image data unnecessary for the operator is undesirably included in the output range. In the present apparatus, however, the output range can be determined by the plurality of specific commands to be inputted, whereby the unnecessary image data is not included in the output range and the output range can be determined so as to conform to the output range desired by the operator. In addition, where any two successive specific commands among the plurality of specific commands are detected or recognized as a pair, for instance, it is possible to determine a plurality of output ranges at a plurality of positions with respect to a direction in which the marker moves. In other words, even where the operator desires to output the image data extracted from various portions of the document the operator can determine the output ranges focusing on the image data of various portions of the document. Therefore, the arrangement is capable of forming efficient output data which includes the desired output ranges extracted from various portions of the document.

(14) The image reading apparatus according to any one of the above forms (1)-(13), further comprising a designating portion which designates an image-data receiving device to which the outputting portion is to output the image data, and wherein the outputting portion is configured to output, to the image-data receiving device designated by the designating portion, the image data within the output range that is determined by the output-range determining portion when the specific command is detected by the command detecting portion.

In the image reading apparatus according to the above form (14), the outputting portion outputs, to the image-data receiving device, the image data within the output range that is determined by the output-range determining portion when the specific command is detected by the command detecting portion. Accordingly, for outputting the image data to the designated image-data receiving device, it is only required for the operator to perform the operation of determining the output range without a need of performing the operation of outputting the image data aside from the determining operation. In general, the read image data becomes meaningful when being outputted in a suitable form. For this reason, most operators desire to output the read image data. Therefore, no disadvantage is offered to the operator even if the operation of outputting the image data to the image-data receiving device is arranged to be performed at a timing when the operation of determining the output range is performed, namely, at a timing when the operation of inputting the specific command is performed.

(15) The image reading apparatus according to any one of the above forms (1)-(14), further comprising: a change-information detecting portion which detects change information which is to be inputted through the operable portion and which is for changing the output range that is determined by the output-range determining portion; and an output-range changing portion which changes the output range upon detection of an input of the change information by the change-information detecting portion, such that image data within a range decided based on the change information among the image data stored in the memory is added to or deleted from the image data within the output range determined by the output-range determining portion, wherein the outputting portion is configured to output image data within the output range changed by the output-range changing portion, in a case where the output-range changing portion has changed the output range.

In the image reading apparatus according to the above form (15), when the change-information detecting portion detects an input of the change information, the output-range changing portion changes the output range such that the image data within the range decided based on the change information among the image data stored in the memory is added to or deleted from the image data within the output range determined by the output-range determining portion. Further, in a case where the output-range changing portion has changed the output range, the outputting portion outputs the image data within the changed output range.

According to the arrangement, even after the output range has been determined by the output-range determining portion, the already determined output range can be changed by inputting the change information. Thus, where the operator reconsiders the determined output range and desires to change the output range already determined by the output-range determining portion, the arrangement can deal with the desire.

In the present apparatus, in particular, the output range of the image data is determined when the operator inputs the specific command at a timing when the indication of the reference range that changes every moment on the display device becomes equal to the indication of the desired range. Accordingly, if the operator inputs the specific command at an erroneous timing, there may be caused a risk that the output range cannot be determined as desired. In the arrangement, however, by inputting the change information, the output range already determined by the output-range determining portion can be changed in accordance with the request by the operator. Therefore, where the output range determined by the output-range determining portion is not satisfactory for the operator, the output range can be modified into the one desired by the operator.

Further, in a case where the output range has been changed by the output-range changing portion, the image data within the changed output range is outputted by the outputting portion, so that the image data in the output range desired by the operator can be reliably outputted to the image-data receiving device.

(16) An image reading apparatus comprising:
a reading device which reads an image of a document to obtain image data of the image by scanning;
a display device which displays a display image based on the image data read by the reading device;
an operable portion which is to be operated by an operator;
an outputting portion which outputs the image data read by the reading device;
an image-data storing portion which successively stores, in a memory, a prescribed amount of the image data read by the reading device each time when the prescribed amount of the image data is read by the reading device;
a display controlling portion which controls the display device to successively display as the display image, in a reading order, parts of the image of the document sequentially, based on the image data stored in the memory by the image-data storing portion, at a speed lower than a speed at which the reading device reads the image of the document;
a command detecting portion which detects a specific command which is to be inputted through the operable portion; and
an output-range determining portion which determines, upon detection of the specific command by the command detecting portion, an output range of the image data to be outputted by the outputting portion, on the basis of the display image displayed on the display device.

In the image reading apparatus according to the above form (16), the image data of the image of the document read by the reading device is successively stored in the memory, and parts of the image based on the image data stored in the memory are displayed by the display controlling portion on the display device in a prescribed order at a speed lower than an image reading speed at which the reading device reads the image of the document. When the command detecting portion detects the specific command inputted through the operable portion, the output range of the image data that is to be outputted is determined by the output-range determining portion, on the basis of the display image currently displayed on the display device. The display image which is displayed on the display device changes every moment. Accordingly, the operator can determine a desired range as the output range of the image data by operating the operable portion to input the specific command at a timing when the reference range displayed on the display device becomes equal to the desired range.

Therefore, the present arrangement enables the operator to select and output the image data required by the operator, thereby obviating needless outputting of unnecessary image data that is not required by the operator. In other words, the arrangement avoids a problem that whole image data of the document is outputted even though the image data which is desired by the operator to be outputted is only a part of the image data of the document. Therefore, the arrangement reduces a time required for outputting the image data to the image-data receiving device and enables the image data to be outputted with high efficiency.

Further, the image based on the read image data is dynamically and sequentially displayed, whereby the operator can easily determine the output range simply by judging a timing of operating the operable portion, i.e., by inputting the specific command. Described more specifically, where the output range of the image data is determined while statically displaying the image based on the read image data, it will be required to provide means of indicating a cursor on a display screen of the display device and means of moving the cursor in response to the operation to be made through the operable portion. In the present apparatus, however, the output range can be determined by inputting the specific command, thereby eliminating provision of such means. Hence, as compared with an arrangement in which the image is statically displayed, the present arrangement simplifies the apparatus structure and determines the output range with high efficiency and ease. In addition, the operator is not required to perform an operation of moving the cursor, an operation of determining a cursor position, etc., thereby simplifying the required operations to be performed by the operator through the operable portion and improving operability.

The present apparatus may be configured such that, when the specific command is detected or inputted, the apparatus determines, as the output range, a range of the image data that corresponds to the image being displayed, namely, the apparatus may be configured to determine an end margin of the output range. Alternatively, the apparatus may be configured such that, when the specific command is detected or inputted, the apparatus determines, as the output range, a range of the image data except the image data of the image being displayed, namely, the apparatus may be configured to determine a beginning margin of the output range. Further, a number of times of the operation made through the operable portion is not limited to one time, but may be plural times. For instance, two operations which are to be made through the operable portion for inputting the specific commands may be set as a pair, and the apparatus may be configured to determine, as the output range, a range which is not yet made as the reference range at a timing of detecting a first command and which is made as the reference range at a timing of detecting a second command. That is, the beginning margin of the output range is determined based on the reference range at the timing of detecting the first command and the end margin of the output range is determined based on the reference range at the timing of detecting the second command.

(17) A computer-readable carrier containing a control program for an image reading apparatus comprising: a reading device which reads an image of a document to obtain image data of the image by scanning; a display device which displays a display image based on the image data read by the reading device; and an operable portion which is to be operated by an operator, the control program comprising:
an image-data storing step of successively storing, in a memory, a prescribed amount of the image data read by the reading device each time when the prescribed amount of the image data is read by the reading device;

a reference-range managing step of determining, on the basis of reference-range information required for determining a reference range of the image data, the reference range in the image data that is stored in the memory in the image-data storing step and successively updating the reference-range information such that the reference range is successively updated at a prescribed timing by a prescribed size;

a display-controlling step of controlling the display device to display the display image such that the reference range which is updated on the basis of the reference-range information is visually recognizable on the display device;

a timing controlling step of controlling updating intervals at which the reference range is updated by the prescribed size, such that an amount of the image data that corresponds to an amount of change in the reference range in a certain time period is smaller than an amount of the image data to be stored in the memory in the certain time period;

a command-detecting step of detecting a specific command which is to be inputted through the operable portion;

an output-range determining step of determining an output range of the image data, on the basis of the reference range decided based on the reference-range information that is the most recently updated in the reference-range managing step, when the specific command is detected in the command detecting step; and an outputting step of outputting the image data within the reference range determined in the output-range determining step.

In the computer-readable carrier containing the control program according to the above form (17), the image data read by the reading device is successively stored in the memory in the image-data storing step. In the display controlling step, the display image based on the image data stored in the memory is displayed on the display device and the reference range which is successively updated by the prescribed size is displayed, for the display image, so as to be visually recognizable. Further, in the timing controlling step, the updating intervals at which the reference range that is displayed on the display device is updated by the prescribed size are controlled such that the amount of the image data that corresponds to the amount of change in the reference range in the certain time period is smaller than the amount of the image data to be stored in the memory in the certain time period. The reference range is a range that is determined, in the reference-range managing step, for the image data stored in the memory, based on the reference-range information. The reference-range information is updated in the reference-range managing step such that the reference range is successively updated at the prescribed timing by the prescribed size. When the specific command is detected in the command detecting step, the output range of the image data to be outputted in the outputting step is determined on the basis of the reference range decided based on the reference-range information that is the most recently updated in the reference-range managing step.

In this connection, the prescribed size by which the reference range is updated may correspond to the prescribed amount of the image data to be stored in the memory. In this instance, in the timing controlling step, the updating intervals are controlled to be longer than storing intervals at which the prescribed amount of the image data is stored in the memory by the image-data storing portion.

By implementing the steps mentioned above, it is possible to determine, as the output range, a range of the image data desired by the operator. Accordingly, the arrangement enables the operator to select and output the image data required by the operator, thereby obviating needless outputting of unnecessary image data that is not required by the operator. In other words, the arrangement avoids a problem that whole image data of the document is outputted even though the image data which is desired by the operator to be outputted is only a part of the image data of the document. Therefore, the arrangement reduces a time required for outputting the image data and enables the image data to be outputted with high efficiency.

The control program indicated above may be configured such that, when the specific command is detected or inputted, the control program determines, as the output range, a range of the image data that corresponds to the reference range being displayed on the display device. For instance, the control program may be configured to determine an end margin of the output range. Alternatively, the control program may be configured such that, when the specific command is detected or inputted, the control program determines, as the output range, a range of the image data except the image data within the reference range being displayed. For instance, the control program may be configured to determine a beginning margin of the output range. Further, a number of times of the operation made through the operable portion is not limited to one time, but may be plural times. For instance, two operations which are to be made through the operable portion for inputting the specific commands may be set as a pair, and the control program may be configured to determine, as the output range, a range which is not yet made as the reference range at a timing of detecting a first command and which is made as the reference range at a timing of detecting a second command. That is, the beginning margin of the output range is determined based on the reference range at the timing of detecting the first command and the end margin of the output range is determined based on the reference range at the timing of detecting the second command. Moreover, the reference-range information may be updated such that the reference range increases by the prescribed size. Alternatively, the reference-range information may be updated such that the reference range reduces by the prescribed size.

BRIEF DESCRIPTION OF THE DRAWINGS

The above and other objects, features, advantages and technical and industrial significance of the present invention will be better understood by reading the following detailed description of preferred embodiments of the invention, when considered in connection with the accompanying drawings, in which:

FIGS. 5A-5B show a flow chart indicating a display-editing processing routine executed in the apparatus of FIG. 1;

FIGS. 10A-10C show a flow chart indicating a display-editing processing in a third embodiment;

FIG. 11 is a block diagram showing an electric structure of an image reading apparatus according to a fourth embodiment;

DETAILED DESCRIPTION OF THE PREFERRED EMBODIMENTS

Figure 1:
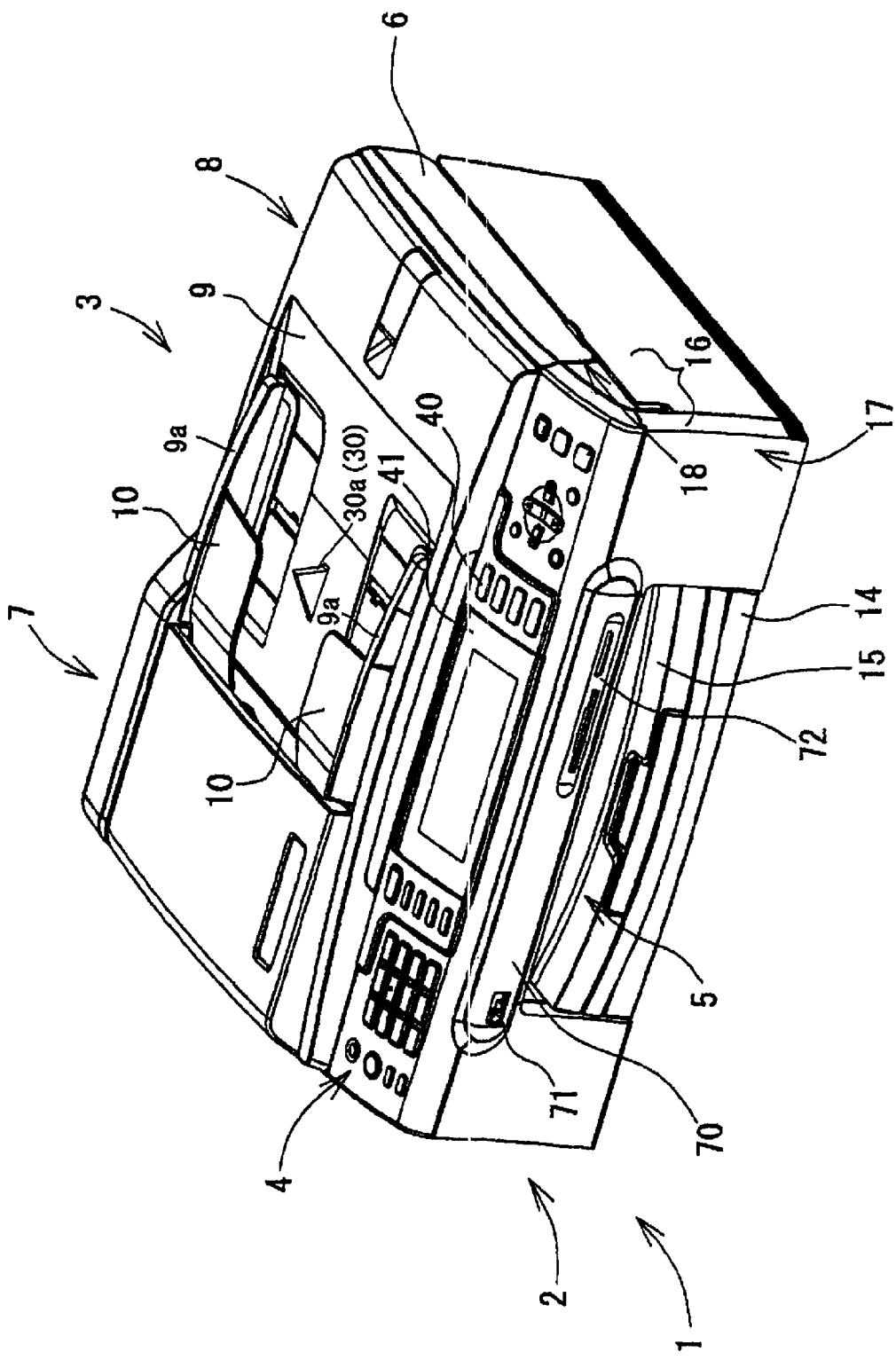
FIG. 1 is a perspective view showing an external structure of an image reading apparatus according to one embodiment of the present invention.

By referring to the drawings, there will be described preferred embodiments of the present invention.

FIG. 1 is a perspective view showing an external structure of a Multi Functional Device 1 (hereinafter referred to as "MFD") as one example of an image reading apparatus according to a first embodiment of the invention. As shown in FIG. 1, the MFD 1 functioning as a Multi Function Peripheral or Multi Function Printer (MFD) integrally includes a printer 2 and a scanner 3 respectively provided on a lower part and an upper part of the MFD 1 and an operation panel 4 as an operable portion provided in front of the scanner 3. The MFD 1 has a printer function, a scanner function, a copier function, and a facsimile function.

The MFD 1 is connected mainly to a computer, not shown, and arranged to record images and text on recording paper sheets (as recording media), based on image data and text data transmitted from the computer. Further, the MFD 1 may be connected to an external device such as a digital camera and arranged to record, on the recording sheets, images based on image data outputted from the digital camera. Moreover, the MFD 1 may be arranged to record images and the like stored in a storage medium such as a memory card that is loaded into the MFD 1. It is needless to mention that the MFD 1 may be arranged to record images on overhead transparency films and cloths as well as the recording paper sheets. It is noted that, throughout the specification, directional terminology such as "front", "rear", "left", "right", "upper", "lower", "above", "below", etc., is used with respect to an orientation of the MFD 1 disposed for its intended use.

The MFD 1 is configured to perform a reading operation of reading a document and an outputting operation of outputting the read image data of the document to an image-data receiving device. In the MFD 1, images based on the read image data are successively displayed on a Liquid Crystal Display 41 (hereinafter abbreviated as "LCD" where appropriate) as a display device. It is noted that, in the MFD 1, a speed of displaying the images on the LCD 41 (i.e., displaying speed) is made lower than a speed of reading the document (i.e., reading speed), that is, the displaying speed is made asynchronous with the reading speed.

The MFD 1 is configured to pause the successive displaying of the images on the LCD 41 when a pause key 40B1 (FIG. 2) is pressed during the reading operation of the document and to determine, as an output range, a range of image data corresponding to an image currently displayed on the LCD 41 at a time when the pause key 40B1 is pressed. Moreover, the MFD 1 is configured to output the image data in the determined output range to the image-data receiving device which is designated in accordance with a currently-effective operation mode of the MFD 1 (that corresponds to one of the printer function, the scanner function, and the facsimile function). In other words, the MFD 1 is configured to perform partial reading of the document and outputting of the read image data.

The scanner 3 as a reading device is for reading an image of the document and includes a document reading bed 6 functioning as a Flatbed Scanner (hereinafter abbreviated as "FBS" where appropriate) and a document cover 8 with an Auto Document Feeder 7 (hereinafter abbreviated as "ADF" where appropriate). The document cover 8 is pivotably attached to the document reading bed 6 through a hinge disposed on a rear side of the MFD 1, such that the document cover 8 is configured to be opened upward and closed downward. The document reading bed 6 is disposed below the document cover 8. The document reading bed 6 has a generally rectangular parallelepiped shape having, in its plan view, a length dimension (as measured in a left-right direction of the MFD 1) larger than a width dimension (as measured in a front-rear direction of the MFD 1 corresponding to a depth direction thereof) and having a predetermined height. The document reading bed 6 is configured to be covered by the document cover 8 when the document cover 8 is closed downward and to be exposed or uncovered when the document cover 8 is opened upward. The document cover 8 has, in its plan view, a shape substantially identical with the document reading bed 6. Thus, the scanner 3 in which the document reading bed 6 and the document cover 8 are integral with each other has a generally parallelepiped shape.

There is disposed, on an upper portion of the document reading bed 6, a platen glass having a rectangular shape in which its lengthwise dimension (as measured in the left-right direction of the MFD 1) is larger than its widthwise dimension (as measured in the front-rear direction of the MFD 1). The platen glass is built into the upper portion of the document reading bed 6. The width dimension of the platen glass in its plan view corresponds to a short side of a letter-size document while the lengthwise dimension of the platen glass in its plan view corresponds to a long side of an A4-size document. Accordingly, the image data is readable from both of the letter-size document and the A4-size document.

An image-reading unit not shown is incorporated in the document reading bed 6. Within the document reading bed 6, there is a space large enough for a movement of the image-reading unit and disposition of the image-reading unit, supporting members and drive mechanisms respectively for supporting and driving the image-reading unit. Accordingly, the document reading bed 6 is larger in size than the platen glass.

Where the thus constructed scanner 3 is used as the FBS, the document cover 8 is opened upward and a document is placed on an upper surface of the platen glass, i.e., on the upper portion of the document reading bed 6. Then, the document cover 8 is closed downward so as to fixedly position the document on the platen glass. Thereafter, upon inputting of a reading-start command to start the reading operation of the document, the image-reading unit is moved along a back or lower surface of the platen glass that is opposite to the upper surface thereof so as to scan the document. Thus, the image reading of the document by the FBS is performed.

The image-reading unit includes a line image sensor whose main scanning direction corresponds to the depth direction of the MFD 1. The image-reading unit is arranged to read an image in the following manner. The document is irradiated with a light generated by a light source, and a reflected light from the document is led to photoelectric converting elements by a lens. The photoelectric converting elements output electric signals in accordance with the intensity of the reflected light, whereby an image is read. As the line image sensor, there may be employed a Contact Image Sensor (CIS) of a contact type, a Charge Coupled Device (CCD) of a reduction optics type, a Complementary Metal-Oxide Semiconductor (CMO), or the like. The internal structures of the image-reading unit and the scanner 3 are not directly relevant to the present invention, and a detailed explanation of which is dispensed with.

The ADF 7 is for feeding a document from a document-supply tray 9 to a document-discharge tray 10 through a document-feed path. During the feeding of the document by the ADF 7, when the document passes a prescribed location on the platen glass 6 disposed on the document reading bed 6, i.e., a reading location, an image of the document is read by the image-reading unit that is standing by below the reading location. That is, unlike the reading of the document using the FBS, the reading of the document using the ADF 7 is performed by carrying the document with the image-reading unit located at the prescribed location (the reading location). The reading of the document by the ADF 7 described above is performed with the document cover 8 closed downward so as to cover the document reading bed 6. In the present invention, the ADF 7 may have any suitable structure, and a detailed description of which is dispensed with.

The document-supply tray 9 is configured to accommodate a plurality of documents and includes a pair of guides 9*a* for guiding each of the documents set on the document supply tray 9 toward an interior of the MFD 1 when the ADF 7 introduces each document into the interior of the MFD 1. The guides 9*a* are slidably movable in a direction perpendicular to a direction of introduction of the document, i.e., in the depth direction of the MFD 1. A distance between the two guides 9*a* is adjustable depending upon a width, i.e., a short side, of the document sheet to be introduced. Between the two guides 9*a*, there is provided a document-detecting sensor 30 which is arranged to be covered by the document set on the document-supply tray 9.

The document-detecting sensor 30 is for detecting a presence or an absence of the document on the document-supply tray 9. The document-detecting sensor 30 includes: a movable piece 30*a* which is biased upward by a biasing member so as to protrude upward from the document-supply tray 9 and which is movable in an upward-downward direction; and an electric contact which is provided below the movable piece 30*a*. When at least one document is set on the document-supply tray 9, the movable piece 30*a* is pushed downward due to the weight of the at least one document, so that the electric contact is on, in other words, the document-detecting sensor 30 is on. On the other hand, when the document is removed from the document-supply tray 9, the movable piece 30*a* is moved upward by the biasing force of the biasing member, so that the electric contact is off, in other words, the document-detecting sensor 30 is off. Thus, the presence or absence of the document on the document-supply tray 9 is detected according to the on/off condition of the document-detecting sensor 30.

The document-detecting sensor 30 is also for detecting a presence of a next document that follows the document which is being currently read, i.e., the document which has been introduced into the interior of the MFD 1. The movable piece 30*a* is provided at a position where the movable piece 30*a* does not contact a trailing end of the document which has been introduced into the interior of the MFD 1. That is, in an initial condition in which the at least one document is set on the document-supply tray 9, the document-detecting sensor 30 is on (i.e., detection of the presence of the next document) because the movable piece 30*a* is pushed downward by the at least one document. When the reading-start command is inputted, a drive system (not shown) such as a picking roller provided in the ADF 7 is activated, whereby an uppermost one of the at least one document on the document-supply tray 9 is fed to the reading location in the MFD 1. When there exists no next document on the document-supply tray 9, the movable piece 30*a* is moved upward because the trailing end of the document being set at the reading location does not contact the movable piece 30*a* as described above. Accordingly, the document-detecting sensor 30 is off (i.e., detection of the absence of the next document).

The printer 2 is an image recording apparatus utilizing a so-called ink-jet method, i.e., an ink-jet recording apparatus, which is configured to record an image on a recording sheet by selectively ejecting ink droplets based on the image data read by the scanner 3 or inputted from an external device. As described above, the printer 2 is disposed below the scanner 3. Since the scanner 3 and the printer 2 are positioned relative to each other such that respective back surfaces of the scanner 3 and the printer 2 are flush with each other, the MFD1 has a straight back surface with no unevenness. Needless to say, the above-indicated ink-jet method is one example of the image recording method and there may be employed various other image recording methods such as an electrophotographic method and a thermal transfer method.

An opening 5 is formed on a front side of the MFD 1, namely, on a front side of the printer 2. In the opening 5, a sheet-supply tray 14 and a sheet-discharge tray 15 are disposed so as to have a two-tier structure in a vertical direction in which the sheet-discharge tray 15 is located above the sheet-supply tray 14. The sheet-supply tray 14 is configured to accommodate the recording sheets having a rectangular shape, such that a lengthwise direction of the recording sheets corresponds to the front-rear direction of the MFD 1 in the plan view. The sheet-supply tray 14 has a widthwise dimension adjusted to the short side of the letter-size sheet and a lengthwise dimension adjusted to a long side of the A4-size sheet so that both of the letter-size sheet and the A4-size sheet can be used as the recording sheets.

As described above, the document reading bed 6 has an oblong parallelepiped shape. On a front side of the scanner 3, a front end face of the document reading bed 6 and a front face of the document cover 8 are made flush with each other, thereby forming an end face 18. A front end face 17 of the printer 2 protrudes from the end face 18 of the scanner 3 by a suitable distance, and the MFD 1 accordingly has an external shape which is generally square in its plan view. Hereinafter, an end portion on the front side of the printer 2 that protrudes forwardly from the end face 18 of the scanner 3 may be referred to as a protruding portion 16.

As mentioned above, the document reading bed 6 is configured to have a size that permits the letter-size document to be placed thereon such that a long side of the letter-size document extends in the left-right direction of the MFD 1 while the sheet-supply tray 14 is configured to have a size that permits the recording sheets to be accommodated therein such that a long side of each recording sheet extends in the front-rear direction of the MFD 1. Accordingly, the distance by which the protruding portion 16 forwardly protrudes from the end face 18 of the scanner 3 is set so as to correspond to a difference between a dimension of the long side of the A4-size sheet and a dimension of the short side of the letter-size sheet. According to the arrangement, there is formed a space having an oblong parallelepiped shape over the protruding portion 16 because the printer 2 has a dimension (as measured in the left-right direction of the MFD 1) that corresponds to a dimension of the scanner 3 (as measured in the left-right direction of the MFD 1). As will be described, the operation panel 4 of the MFD 1 is disposed in the above-indicated space over the protruding portion 16.

In the printer 2, there is formed a U-turned sheet-feed path which initially extends upward from a rear side of the sheet-supply tray 14 and is then curved toward the front side of the MFD 1 so as to be connected to the sheet-discharge tray 15. Each of the recording sheets accommodated in the sheet-supply tray 14 is supplied to the sheet-feed path with its short side being fed as a leading end and carried through the sheet-feed path in a U-turn manner, so that the recording sheet is guided to a recording position provided in the sheet-feed path. At the recording position, the ink-jet recording apparatus records an image on the recording sheet. The recording sheet on which the image has been recorded is discharged to the sheet-discharge tray 15.

Figure 2:
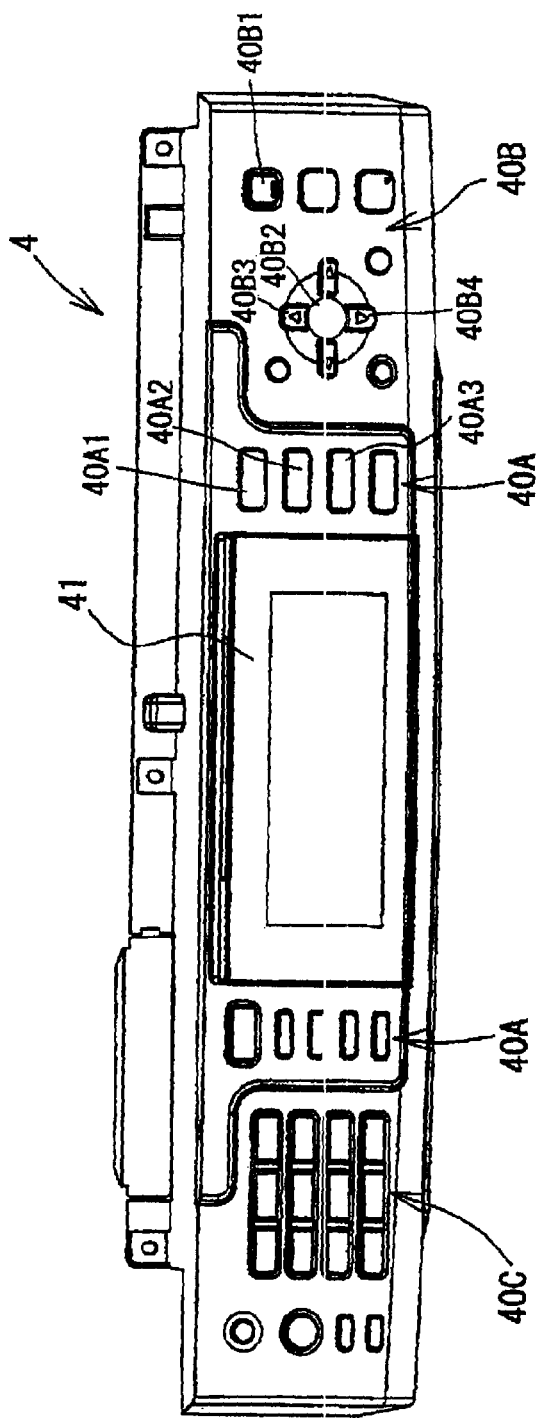
FIG. 2 is a plan view of an operation panel of the apparatus of FIG. 1.

The operation panel 4 is provided on the front side of the MFD 1. As shown in FIGS. 1 and 2, the operation panel 4 has an oblong, rectangular shape so as to fit in the above-indicated space over the protruding portion 16. In other words, the operation panel 4 has a depth dimension that corresponds to a difference between a depth dimension of the scanner 3 and a depth dimension of the printer 2, i.e., a depth dimension of the above-indicated space. The operation panel 4 is for operating the printer 2 and the scanner 3 and includes various operation keys 40 and the LCD 41.

An operator can input desired commands by operating the operation panel 4. When suitable commands are inputted through the operation panel 4, operations of the MFD 1 are controlled by a control section 20 shown in FIG. 3 based on information of the inputted commands. A concrete structure of the operation panel 4 will be explained in detail. The MFD 1 is configured to operate based on commands transmitted, via a printer driver or a scanner driver, from a computer connected to the MFD 1, as well as commands inputted through the operation panel 4.

A connecting panel 70 is disposed above the opening 5 of the printer 2. In the connecting panel 70, a USB terminal 71 is provided at a left end portion thereof. The USB terminal 71 functions as a connector terminal by which the MFD 1 is connected to the external device via a USB cable, whereby the MFD 1 performs data communications with the external device. In the connecting panel 70 a slot section 72 is further provided at a right end portion thereof. In the slot section 72, there are provided a plurality of card slots into each of which a card memory can be loaded. When the card memory is loaded into one of the plurality of card slots and image data is read out from the card memory by the control section 20, an image based on the read image data and information on the image data are displayed on the LCD 41 by the control section 20. Alternatively, an arbitrary image selected by the operator is recorded by the printer 2 on the recording sheet.

There will be next explained the operation panel 4 of the MFD 1 in more detail with reference to the plan view of FIG. 2.

The operation panel 4 is disposed above the protruding portion 16 on the front side of the scanner 3. The operation panel 4 includes the operation keys 40 and the LCD 41. As shown in FIG. 2, the LCD 41 has, in its plan view, an oblong rectangular shape whose dimension as measured in the depth direction of the MFD 1 is substantially the same as, or more specifically, slightly smaller than, the depth dimension of the operation panel 4. Accordingly, on an upper side and a lower side of the LCD 41, there exists no space for disposing the operation keys 40 on the operation panel 4. In other words, the LCD 41 is upsized so as to have the dimension as measured in the depth direction of the MFD 1 as large as possible when the LCD 41 is disposed on the operation panel 4. In the MFD 1, the LCD 41 is disposed at a position at which the LCD 41 can be viewed by the operator with ease when the MFD 1 is disposed for its intended use. While the LCD 41 is disposed at the upper portion of the MFD 1 in the present embodiment, the LCD 41 may be disposed otherwise. For instance, the LCD 41 may be disposed on a front side of the MFD 1 as long as the LCD 41 can be viewed by the operator when the operator operates the operation panel 4. Further, the LCD 41 need not be provided integrally with the operation panel 4, but may be configured to be detachable from the operation panel 4.

As shown in FIG. 2, the LCD 41 is disposed at a central portion in a lengthwise direction of the operation panel 4 that corresponds to the left-right direction of the MFD 1. The LCD 41 has a lengthwise dimension as measured in the left-right direction of the MFD 1 sufficiently smaller than that of the operation panel 4. Accordingly, there exists, on a right side and a left side of the LCD 41, enough space for disposing the operation keys 40 on the operation panel 4. By disposing the LCD 41 at the lengthwise central portion of the operation panel 4, the operation keys 40 can be disposed on the left side and the right side of the LCD 41. According to the arrangement, the operation hays 40 and the LCD 41 are disposed so as to be well-balanced with each other. In the MFD 1, the image data read by the scanner 3 is outputted to the LCD 41, thereby permitting the operator to check a reading state of the document.

Further, the LCD 41 is disposed on an outer surface of a casing of the MFD 1 in the proximity of the operation keys 40. Accordingly, the operator can stay at a position at which the MFD 1 is situated in performing a work operation for reading such as setting the document on the reading device and in performing a work operation for editing the read image data such as determining an output range (which will be described) of the image data. Therefore, as compared with an ordinary image reading apparatus configured to output the read image data to the image-data receiving device such as a personal computer and to determine the output range of the image data in the computer, the MFD 1 of the present embodiment ensures the operator reduced work or labor to move between the MFD 1 as the image reading apparatus and the image-data receiving device and realizes efficient and labor-saving work operation for reading of the document. Moreover, because the LCD 41 is disposed in the proximity of the operation keys 40, the operator can easily operate the operation keys 40 while checking a display image displayed on the LCD 41.

The operation keys 40 are classified into the following three groups: (a) a group of operation keys 40A disposed adjacent to the LCD 41; (b) a group of operation keys 40B disposed at a right-side end portion of the operation panel 4; and (c) a group of operation keys 40C disposed at a left-side end portion of the operation panel 4. The operation keys 40A are arranged in two rows which are respectively disposed along left and right edges of the LCD 41. Owing to the arrangement in which the operation keys 40A are disposed on the left and right sides of the LCD 41, it is possible to effectively utilize the space of the operation panel 4 on the left and right sides of the LCD 41.

The operation keys 40A disposed on the right side of the LCD 41 include operation-mode selecting keys 40A1, 40A2, and 40A3. The operation-mode selecting keys 40A1-40A3 are for selecting an operation mode of the MFD 1 and constituted as a fax-mode selecting key, a copy-mode selecting key, and a scanner-mode selecting key, respectively. In a normal state, the MFD 1 is set in a facsimile mode (a reception mode) for permitting the MFD 1 to operate as a facsimile for receiving facsimile data. When a command is inputted through a selected one of the operation-mode selecting keys 40A-40A3, the operation mode of the MFD 1 is temporarily changed from the facsimile mode (the reception mode) to an operation mode which corresponds to the selected one of the operation-mode selecting keys 40A1-40A3 and the MFD 1 is operated in the above-indicated operation mode selected by the operator.

More specifically explained, the fax-mode selecting key 40A1 is for requesting the MFD 1 to operate in the facsimile mode (the data-transmission mode). When the fax-mode selecting key 40A1 is pressed, reading of the document by the scanner 3 and transmission of the read data to a recipient facsimile machine are performable in the MFD 1. The copy-mode selecting key 40A2 is for requesting the MFD 1 to operate in the copy mode. When the copy-mode selecting key 40A2 is pressed, reading of the document by the scanner 3 and outputting of the read image data to the printer 2 are performable in the MFD 1. The scanner-mode selecting key 40A3 is for requesting the MFD 1 to operate in the scanner mode. When the scanner-mode selecting key 40A3 is pressed, reading of the document by the scanner 3 and outputting of the read image data to the PC are performable in the MFD 1.

Thus, each of the operation-mode selecting keys 40A1-40A3 is for assigning the MFD 1 to execute a function including the reading by the scanner 3, namely, to execute a corresponding one of the facsimile function (image-data transmission), the copier function, and the scanner function.

There will be next explained a role of each key used in various processings in the present embodiment in connection with the outline of the present embodiment.

The operation keys 40B include the pause key 40B1, a determination key 40B2, and two modification keys 40B3, 40B4. The pause key 40B1 is for inputting a pause command (as a specific command) to pause the progress of displaying of the display image on the LCD 41. When the operator presses the pause key 40B1, the progress of displaying is paused and the display image currently indicated on the LCD 41 at a time when the pause key 40B1 is pressed is kept displayed on the LCD 41. In this state, there is determined, as the output range, a range of the image data that corresponds to the display image currently indicated on the LCD 41, i.e., a range of the image data from a beginning margin of the document as a reading-start margin to an end margin of the display image. The display image is formed in such a manner that images each based on a prescribed amount of the image data sequentially read by the scanner 3 are sequentially displayed on the LCD 41. Accordingly, it is possible for the operator to determine the output range as desired in one document from which the image data is read, by operating the pause key 40B1 while visually checking or identifying the LCD 41.

In general, there is used a hard circuit (which is not a computer operated based on programs) in the reading of the document by the scanner 3, whereby a processing to obtain the image data from the document is speeded up. Accordingly, in the conventional image reading apparatus which is configured to display, on the LCD 41, an image based on the read image data substantially at the same time when the image data is read, in synchronism with the reading speed, the operator may only be able to merely acknowledge that the reading of the document is actually performed even when the image based on the read image data is displayed on the LCD 41. Namely, in the conventional apparatus, it is impossible for the operator, by visually identifying the images that are displayed in parallel with the reading of the image data, to find an error in the order of the documents which are read and to check whether the read document is an intended document, for example. In particular when a plurality of documents are successively read, the image displayed on the LCD 41 is instantaneously changed, thereby making it more difficult for the operator to conduct a detailed checking of the image based on the read image data.

In the light of the above-described inconvenience, the MFD 1 according to the present embodiment is designed such that the image displaying speed is made lower than the image reading speed, thereby improving viewability of the image displayed on the LCD 41 and allowing the operator to appropriately confirm the content of the document that has been read.

The determination key 40B2 is for finalizing the output range of the image data. The modification keys 40B3, 40B4 are for modifying the output range. The output range determined as a result of pressing the pause key 40B1 can be modified within a range of the image data that has been read, by operating the modification keys 40B3, 40B4, only before the determination key 40B2 is pressed.

In the MFD 1, the reading of the document by the scanner 3 is sequentially performed, and the images based on the sequentially read image data are sequentially displayed on the LCD 41. Accordingly, the output range to be determined by operation of the pause key 40B1 changes every moment. In this respect, if the operator operates the pause key 40B1 at a wrong timing, the output range may be determined at a position undesirable for the operator, thereby failing to determine the output range as desired by the operator. In view of this, the MFD 1 is provided with the modification keys 40B3, 40B4 for modifying the output range determined by operating the pause key 40B1. Accordingly, when the output range is modified by operating the modification keys 40B3, 40B4 before the determination key 40B2 is pressed, the modified output range becomes the output range to be actually outputted to the image-data receiving device. When the determination key 40B2 is pressed without operating the modification keys 40B3, 40B4, the range determined as a result of pressing the pause key 40B1 becomes the output range without any modification.

The modification key 40B3 is for reducing the output range of the image data. In the MFD 1, one-line data read by the line image sensor in the main scanning direction (corresponding to the depth direction of the MFD 1) corresponds to one unit, and the modification of the output range is performable on a line-by-line basis, i.e., per one-line data. When the modification key 40B3 is pressed one time, the end margin of the output range of the image data is shifted, by one line, from a current position toward the beginning margin (the reading-start margin) of the document.

The modification key 40B4 is for enlarging the output range of the image data. When the modification key 40B4 is pressed one time, the end margin of the output range is shifted, by one line, from a current position toward the end margin of the document. Accordingly, where the operator desires to enlarge the output range which has been once reduced, the output range can be re-modified as desired by the operator by operating the modification key 40B4.

In the present MFD 1, the image reading speed is made higher than the image displaying speed, so that there has been already read the image data which is more than the image data corresponding to the image that is displayed on the LCD 41. Accordingly, by operating the modification key 40B4, it is possible not only to re-modify the once reduced output range (i.e., not only to enlarge the output range to an extent that is determined by operating the pause key 40B1), but also to enlarge the output range to such an extent that the already read image data is included in the output range, beyond the output range determined by operating the pause key 40B1. This arrangement allows a fine adjustment of the enlargement of the output range and improves operability while reducing limitations in determining the output range. However, it is noted that, even when the output range is enlarged to the largest extent, the end margin of the output range is made as the end margin (a reading-end margin) of one document and the output range cannot be enlarged across pages, namely, the output range cannot be enlarged into another document.

When the modification keys 40B3, 40B4 are operated, the output range of the image data is modified, whereby the display image displayed on the LCD 41 is updated in accordance with the modified output range. Therefore, the operator can appropriately modify the output range of the image data as desired by operating the modification keys 40B3, 40B4.

The group of operation keys 40C are constituted as a ten-key numeric pad including ten numeric keys respectively for inputting numeric characters "0"-"9".

Figure 3:
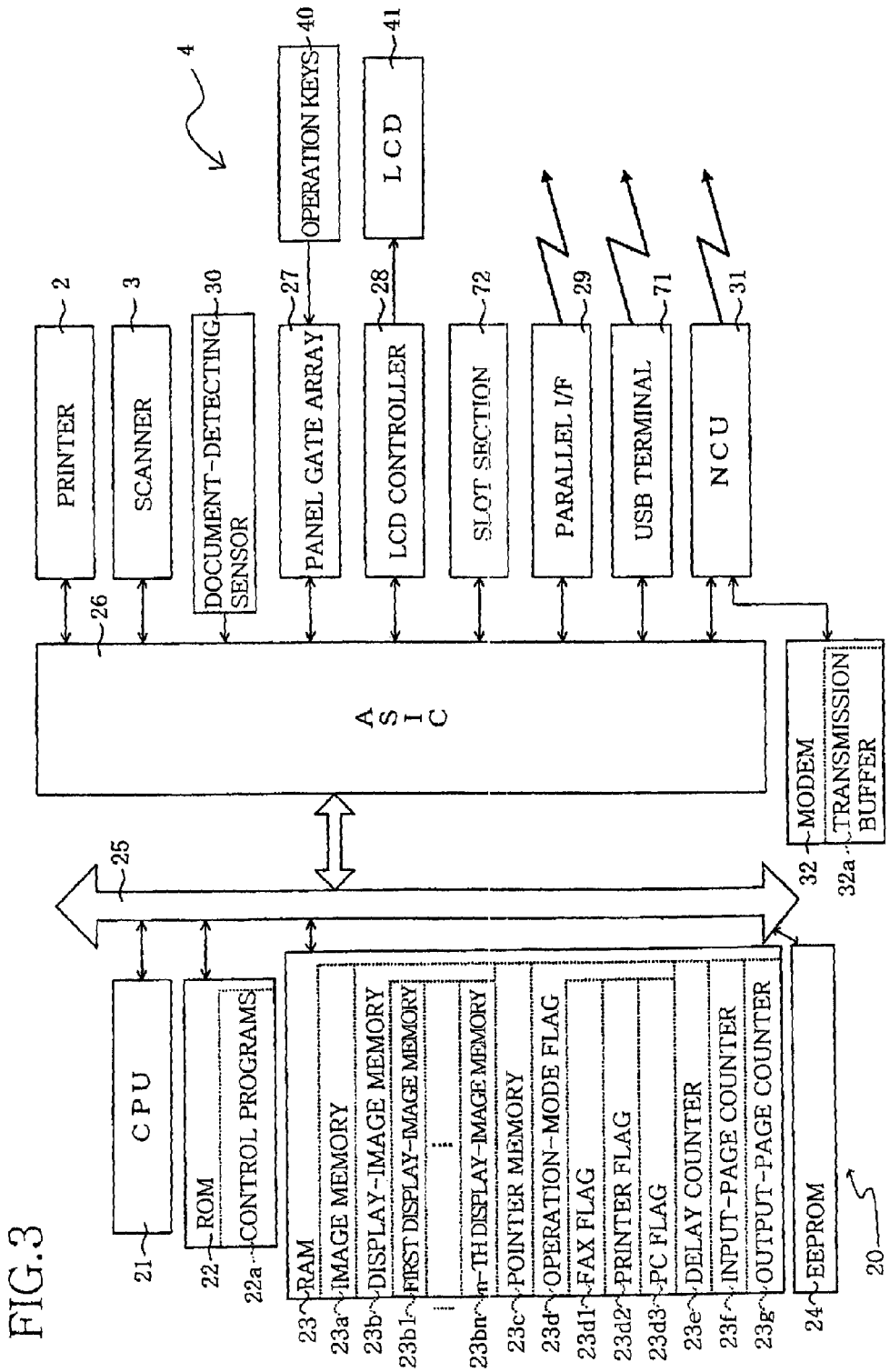
FIG. 3 is a block diagram showing an electric structure of the apparatus of FIG. 1.
Figure 4:
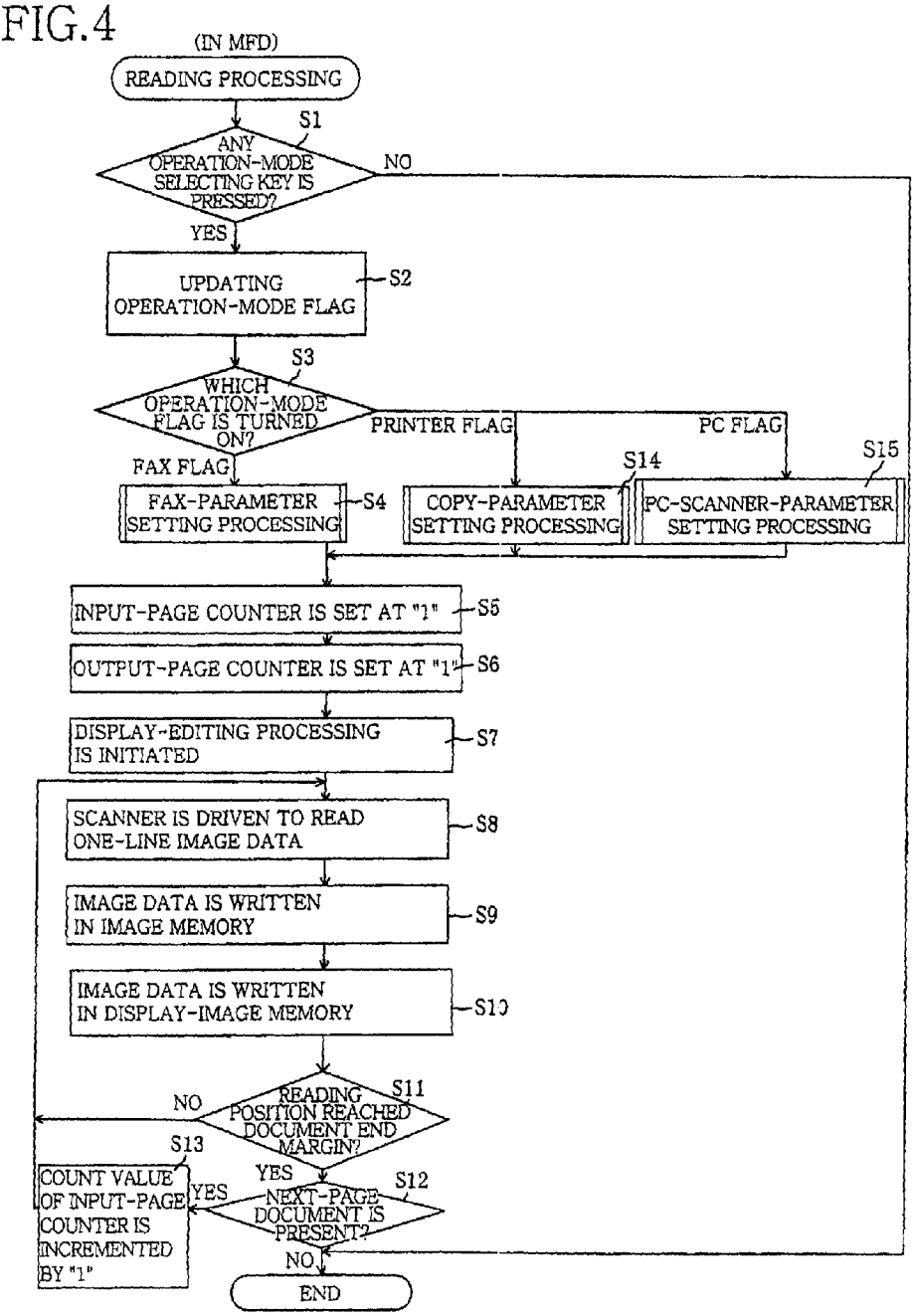
FIG. 4 shows a flow chart indicating a reading processing routine executed in the apparatus of FIG. 1.
Figure 5A:
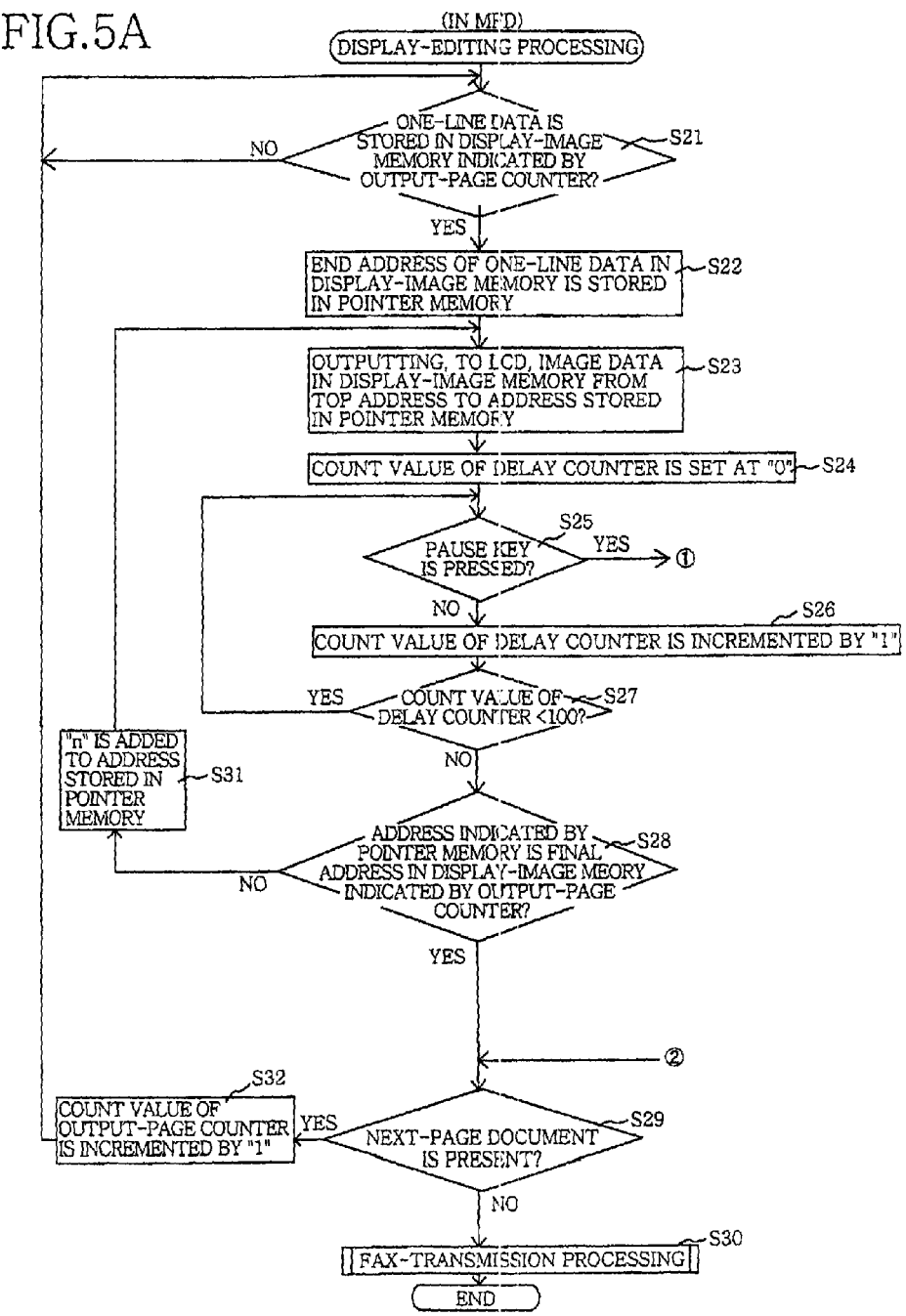

Hereinafter, there will be explained a schematic construction of the control section 20 which controls the operations in the MFD 1 with reference to the block diagram of FIG. 3 showing an electric structure of the MFD 1. The control section 20 is for controlling the operations in the MFD 1 which includes the printer 2, the scanner 3, and the operation panel 4. As shown in FIG. 3, the control section 20 is constituted as a microcomputer that mainly includes: Central Processing Unit (CPU) 21 as an arithmetical unit; a Read Only Memory (ROM) 22 as a nonvolatile memory which is not rewritable and which stores various control programs and fixed value data to be processed by the CPU 21; a Random Access Memory (RAM) 23 as a memory for temporarily storing various data, etc.; and an Electrically Erasable and Programmable ROM (EEPROM) 24 as a nonvolataile memory which is rewritable. The CPU 21, the ROM 22, the RAM 23, and the EEPROM 24 are connected to one another via a bus 25 which is connected to an Application Specific Integrated Circuit (ASIC) 26. Programs indicated by the flow charts of FIG. 4 and FIGS. 5A-5B are stored in the ROM 22 as a part of a control program 22a.

The CPU 21 controls various portions of the MFD 1 based on the control program 22a stored in the ROM 22 such that a facsimile operation, a copying operation, and a scanning operation are performed in the MFD 1.

The RAM 23 includes an image memory 23a, a display-image memory 23b, a pointer memory 23c, operation-mode flags 23d, a delay counter 23e, an input-page counter 23f, and an output-page counter 23g.

The image memory 23a is for storing the image data of the image of the document read by the scanner 3. Each time when the document is read by the line image sensor per one line, the scanner 3 successively outputs the read image data (the line data). The outputted image data is stored in the image memory 23a in the order in which the image data has been outputted. Where a plurality of documents (i.e., plural-page documents) are read, the image data stored in the image memory 23a is handled or managed on a page-by-page basis. When the output range is finalized in one page by operating the determination key 40B2, an image data portion among the image data belonging to that one page, which image data portion is outside the finalized output range, is deleted from the image memory 23a. Thus, only the image data within the finalized output range is retained in the image memory 23a.

In the present embodiment, the image data portion to be deleted corresponds to the end-margin side of the document because the determined output range develops from the beginning margin (the reading-start margin) of the document toward the end margin of the document. When the image data portion is deleted as a result of the finalization of the output range, the image data belonging to pages that follow the above-indicated one page is shifted, by an amount which corresponds to the deleted image data portion, toward a smaller address side in the image memory 23a. In this instance, the image data belonging to a next page that comes next the above-indicated one page is stored so as to be continuous with the image data of the above-indicated one page.

The image data within the determined output range is deleted from the image memory 23a at a timing when the image data is outputted to the designated image-data receiving device. A portion of the control section 20 that performs the outputting of the image data within the determined output range corresponds to an outputting portion.

The display-image memory 23b is for storing the image data which is a source of the display image to be displayed on the LCD 41. The display-image memory 23b is constituted by including a plurality of memories, i.e., a first display-image memory 23b1 through an n-th display-image memory 23bn. That is, the read image data of the first-page document is written into the first display-image memory 23b1, the read image data of the second-page document is written into the second display-image memory 23b2 . . . the read image data of the n-th-page document is written into the n-th display-image memory 23bn.

The image data successively read by the scanner 3 is successively written into the image memory 23a, and the image data written into the image memory 23a is written into the display-image memory 23b. It is indicated by the input-page counter 23f into which display-image memory 23b the image data should be written. The image data which has been written into the display-image memory 23b is outputted therefrom to an LCD controller 28, and the image based on the outputted image data is displayed on the LCD 41. It is indicated by the output-page counter 23g from which one of the first display-image memory 23b1 through the n-th display-image memory 23bn the image data should be outputted.

The image data stored in a certain display-image memory 23b designated by the output-page counter 23g, i.e., one of the first display-image memory 23b1 through the n-th display-image memory 23bn, is read out by the CPU 21 and outputted to the LCD 41 every time the delay counter 23e measures a prescribed time, except when initial one-line data is written into the designated display-image memory 23b. That is, the image data which has been written from the image memory 23a except the initial one-line data is not immediately outputted from the display-image memory 23b, but is refrained from being outputted until the measurement by the delay counter 23e is completed. Every time the delay counter 23e measures the prescribed time, the image data is outputted to the LCD 41 in such a manner that the one-line data is successively added to the image data outputted. Accordingly, the image based on the image data stored in the display-image memory 23b is displayed on the LCD 41 in such a manner that a one-line image is successively added to the display image displayed on the LCD 41. Further, the outputting of the image data stored in the display-image memory 23b is delayed with respect to the writing of the image data from the image memory 23a into the display-image memory 23b. That is, the image displaying speed (the image updating speed) is made lower than the reading speed because the image displaying is delayed by the operation of the delay counter 23e.

When the modification keys 40B3, 40B4 are operated after the output range has been determined, a range of the image data outputted from the display-image memory 23b to the LCD 41 is modified. Where the output range is modified, the range of the image data outputted from the display-image memory 23b is modified, but the image data stored in the display-image memory 23b is not modified due to the modification of the output range.

The pointer memory 23c as a reference-range-information storing portion is for storing an address of the image data that corresponds to the end margin of the display image displayed on the LCD 41, i.e., reference-range information. More specifically explained, in the pointer memory 23c, there is stored a position (an address) in the display-image memory 23b at which the image data corresponding to the end margin of the display image is stored. The images of the read documents are displayed on the LCD 41 on a page-by-page basis. In any one of the first display-image memory 23b1 through the n-th display-image memory 23bn that corresponds to the document page to be displayed, there is designated, as the image data of the display image to be displayed on the LCD 41, the image data ranging from the image data at a top address corresponding to the beginning margin (the reading-start margin of the document) to the image data at the address indicated by the pointer memory 23c, namely, the image data within a reference range. It is indicated by the output-page counter 23g which document page should be displayed, in other words, from which one of the first display-image memory 23b1 through the n-th display-image memory 23bn the image data should be read out.

When the initial one-line image data is written into the display-image memory 23b, there is written into the pointer memory 23c an address (an end address) at which end data of the above-indicated one-line image data is stored. Thereafter, each time when the measurement by the delay counter 23e is completed, a prescribed number "n" is added to a value currently stored in the pointer memory 23c. The prescribed number "n" corresponds to a number of addresses required for storing one-line image data. Accordingly, the range of the image data which is enlarged line by line owing to the addition of the prescribed number "n" is made as the range of the image data of the display image displayed on the LCD 41. In displaying the image on the LCD 41, the CPU 21 refers to the pointer memory 23c, and the image data is read out from the designated one of the first display-image memory 23b1 through the n-th display-image memory 23bn while setting, as the end margin, the data indicated by the address stored in the pointer memory 23c. Thus, the images based on the image data successively read by the scanner 3 are successively displayed on the LCD 41.

In the present embodiment, the MFD 1 is configured to determine the output range of the image data on the basis of the display image being currently displayed on the LCD 41. As described above, when the pause key 40B1 is operated, the MFD 1 determines, as the output range, a range of the image data of the display image being currently displayed on the LCD 41 at a time when the pause key 40B1 is operated. The range of the image data of the currently displayed image is recognized by the CPU 21 owing to the address in the display-image memory 23b stored in the pointer memory 23c, so that the output range of the image data in one document page is determined based on the address stored in the pointer memory 23c.

The MFD 1 is configured to modify the output range determined by the operation of the pause key 40B1, by operating the modification keys 40B3, 40B4. The modification of the output range is performed per one-line data. Accordingly, in one modification, the image data is deleted from or restored in the display-image memory 23b on line-by-line basis, namely, by a predetermined number of bitmap data. In other words, the end margin of the output range of the image data is moved by "n" addresses (the prescribed number "n") at which the predetermined number of bitmap data is stored. According to the arrangement, when the modification key 40B3 or the modification key 40B4 is operated, the prescribed number "n" is added to or subtracted from the value of address that is currently stored in the pointer memory 23c, by the CPU 21, based on the operation of the modification key 40B3 or the modification key 40B4. Therefore, even if the once determined output range is modified by the operation of the modification keys 40B3, 40B4, the address stored in the pointer memory 23c clearly indicates the end margin of the output range of the image data which is stored in the display-image memory 23b and on the basis of which the display image is displayed on the LCD 41. As a result, the MFD 1 is capable of outputting the image data within the modified output range with high reliability.

The operation-mode flags 23d are for indicating the operation mode of the MFD 1, namely, for indicating the image-data receiving device to which the image data read by the scanner 3 is to be outputted. The operation-mode flags 23d include a FAX flag 23d1, a printer flag 23d2, and a PC flag 23d3, in correspondence with the image-data receiving device.

The MFD 1 has a plurality of functions, i.e., the facsimile function, the copier function, the scanner function, and the printer function. Because the reading of the image data by the scanner 3 is an operation common to the facsimile function (in the data-transmission mode), the copier function, and the scanner function, the MFD 1 fails to operate according to any one of the three functions after the reading of the image data, unless it is indicated which one of the three functions should be executed.

In view of the above, the FAX flag 23d1, the printer flag 23d2, and the PC flag 23d3 are provided as the operation-mode flags 23d to indicate which one of the facsimile function (in the data-transmission mode), the copier function, and the scanner function should be executed after the reading of the image data is performed by the scanner 3.

Each of the three flags 23d1-23d3 is configured to be turned ON and OFF in response to a predetermined command inputted by the operator. More specifically explained, when the Fax-mode selecting key 40A1 on the operation panel 4 is pressed, the FAX flag 23d1 is turned ON based on a judgment that the operator desires to operate the MFD 1 as a facsimile for transmitting the image data while the printer flag 23d1 and the PC flag 23d3 are turned OFF. The FAX flag 23d1 being turned ON indicates that the operation mode set for the MFD 1 is the facsimile mode and that the image-data receiving device is a facsimile machine.

Similarly, when the copy-mode selecting key 40A2 on the operation panel 4 is pressed, the printer flag 23d2 is turned ON while the FAX flag 23d1 and the PC flag 23d3 are turned OFF. The printer flag 23d2 being turned ON indicates that the operation mode set for the MFD 1 is the copy mode and that the image-data receiving device is the printer 2. When the scanner-mode selecting key 40A3 on the operation panel 4 is pressed, the PC flag 23d3 is turned ON while the FAX flag 23d1 and the printer flag 23d2 are turned OFF. The PC flag 23d3 being turned ON indicates that the operation mode set for the MFD 1 is the scanner mode and that the image-data receiving device is the PC.

The operation mode flags 23d are referred to by the CPU 21 in a reading processing shown in FIG. 4 (which will be explained) and the MFD 1 performs a function that corresponds to an operation mode indicated by a selected one of the operation-mode flags 23d.

The MFD 1 is normally set in the facsimile mode for performing the data reception. Accordingly, after execution of an operation according to one of the operation-mode flags 23d which has been turned ON, all of the operation-mode flags 23d are turned OFF and the MFD 1 is set in the facsimile mode (the data reception mode). When the image data is received or inputted through a parallel interface (I/F) 29, the USB terminal 71, and the slot section 72 in a state in which the MFD 1 is set in the facsimile mode (the image-data reception mode), the operation mode of the MFD 1 is temporarily changed from the facsimile mode to a printer mode in which the MFD 1 is operated as the printer.

The delay counter 23e is for measuring the prescribed time (i.e., a delay time) by which the image displaying is delayed with respect to the image reading. After a one-line image based on one-line data is displayed, the displaying of a next one-line image based on next line data waits for a time period corresponding to the delay time measured by the delay counter 23e. The delay counter 23e is set at zero at a timing when a one-line image based on one-line image data is newly displayed on the LCD 41. In a display-editing processing which will be explained, a count value counted by the delay counter 23e is incremented by "1" until the count value reaches a prescribed count value (e.g., 100) that corresponds to the delay time. When the count value of the delay counter 23e reaches the prescribed count value, the CPU 21 judges that the prescribed time has elapsed, so that a next line image based on next line data appears on the LCD 41. That is, a timing at which the line image based on the line data is displayed on the LCD 41 is controlled by the count value of the delay counter 23e. The line images are successively displayed on the LCD 41 while being delayed with respect to the reading of the corresponding line data.

The input-page counter 23f is for indicating, when writing the image data into the display-image memory 23b, into which one of the first display-image memory 23b1 through the n-th display-image memory 23bn the image data should be written. In other words, the input-page counter 23f is a counter that indicates a page number being currently read. A count value of the input-page counter 23f indicates one of the first display-image memory 23b1 through the n-th display-image memory 23bn. More specifically described, the count value "1" of the input-page counter 23f indicates the first display-image memory 23b1, the count value "2", of the input-page counter 23f indicates the second display-image memory 23b2, . . . , and the count value "n" of the input-page counter 23f indicates the n-th display-image memory 23bn.

The input-page counter 23f is set at "1" at a timing when the reading of a plurality of documents (i.e., plural-page documents) is initiated. When there is detected a presence of a next-page document after the first-page document has been read, there is added "1" to the count value of the input-page counter 23f. Thus, each time when another-page document is read, the count value of the input-page counter 23f is incremented by "1". In this connection, after a final-page document has been read, the input-page counter 23f retains, as the count value, a value corresponding to the final-page document until a subsequent reading operation is newly initiated. Accordingly, the count value of the input-page counter 23f after the reading of the final-page document indicates a total page number of the documents which have been read in the current reading operation.

In writing the image data from the image memory 23a into the display-image memory 23b, the CPU 21 refers to the count value of the input-page counter 23f, and the image data is written into a suitable one of the first through the n-th display-image memories 23b1-23bn that is indicated by the count value of the input-page counter 23f. Accordingly, the image data of the first-page document is stored in the first display-image memory 23b1, the image data of a second-page document is stored in the second-display-image memory 23b2, . . . , and the image data of the n-th-page document is stored in the n-th display-image memory 23bn.

The output-page counter 23g is for designating a document page whose image is to be displayed on the LCD 41. The present MFD 1 is configured to perform successive reading of the plurality of documents (i.e., the plural-page documents) and provided with the display-image memory 23b, i.e., the first through the n-th display-image memories 23b1-23bn in which is stored the image data of the respective document pages. The output-page counter 23g is configured to indicate one of the first through the n-th display-image memories 23b1-23bn from which the image data is to be outputted to the LCD 41.

Explained in more detail a count value of the output-page counter 23g indicates one of the first through the n-th display-image memories 23b1-23bn. More specifically described, the count value "1" of the output-page counter 23g indicates the first display-image memory 23b1, the count value "2" of the output-page counter 23g indicates the second display-image memory 23b2, . . . , and the count value "n" of the output-page counter 23g indicates the n-th display-image memory 23bn. Because the first through the n-th display-image memories 23b1-23bn respectively store the image data of the first through the n-th pages, the output-page counter 23g designates a document page whose image is to be displayed on the LCD 41.

The output-page counter 23g is set at "1" indicative of the first page at a timing when the display-editing processing which will be described is initiated. Where at least a part of the image data of the next-page document is already read and stored in the corresponding display-image memory 23b, there, is added "1" to the count value of the output-page counter 23g to indicate the next display-image memory 23b from which the image data is subsequently to be outputted, after the image based on all of the image data stored in the display-image memory 23b currently indicated by the output-page counter 23g has been displayed on the LCD 41. Since the image displaying is performed with being delayed in relation to the image reading (i.e., the writing of the image data into the display-image memory 23b), the image data of the next-page document is already stored in the display-image memory 23b at a time when the displaying of the image of the preceding page is completed where there exists the next-page document. The output-page counter 23g is referred to by the CPU 21 in displaying the image on the LCD 41, and the image data is read from the display-image memory 23b that is indicated by the output-page counter 23g.

By displaying the image based on the image data of the document page which is designated by the output-page counter 23g, the image is displayed on a display screen of the LCD 41 on a page-by-page basis. If the images of the plural-page documents are displayed on one display screen, a display area allocated for a one-page document is inevitably reduced, resulting in deteriorated viewability. In addition, it is required to change allocation of the display area depending upon a total page number of the documents, complicating the control of the displaying. In the present embodiment, however, the image is displayed on the page-by-page basis. Accordingly, unlike the arrangement in which the images of the plural-page documents are displayed on one display screen, the present embodiment permits the image to be displayed on the LCD 41 in such a manner that the image can be easily viewed. Further, the control of the displaying can be simplified.

The value stored in the pointer memory 23c and the respective count values of the input-page counter 23f and the output-page counter 23g are cleared to zero upon initiation of the reading processing in the MFD 1.

The ASIC 26 controls operations relating to the printer 2, the scanner 3, the operation panel 4, and the slot section 72 in accordance with commands transmitted from the CPU 21. In the reading operation by the scanner 3, the ASIC 26 controls the driving system to be turned ON and OFF in response to a result of the detection by the document-detecting sensor 30. While a detailed explanation is not given, the control section 20 controls operations of an ink-jet head and a motor for driving the printer 2 and operations of the image-reading unit and a motor for driving the ADF 7 of the scanner 3. To the ASIC 26, there are connected the parallel I/F 29 and the USB terminal 71 for transmitting/receiving data to/from the computer via a parallel cable and the USB cable, respectively. To the ASIC 26, there are further connected a Network Control Unit (NCU) 31 and a modem 32 for realizing the facsimile function. The modem 32 is for transmitting image information and communication data while modulating and demodulating and for transmitting and receiving various processing signals for transmission control. The modem 32 includes a transmission buffer 32a for temporarily storing transmission data. The image data to be transmitted in the facsimile transmission is written into the transmission buffer 32a from the image memory 23a one line by one line, then stored temporarily in the transmission buffer 32a, and finally transmitted to the recipient facsimile machine (as the image-data receiving device) via a communication line.

To the ASIC 26, there is further connected a panel gate array 27 for controlling the operation keys 40 through which desired commands are inputted to the MDF 1. The panel gate array 27 is configured to detect pressing of any of the operation keys 40 and output a suitable key code signal based on a result of the detection. Each key code signal is assigned to a corresponding one of the operation keys 40. When the CPU 21 receives the key code signal from the panel gate array 27, the CPU 21 executes a suitable control operation pursuant to a prescribed key-code processing table in which the key code signals and the control operations are tabled so as to be related to each other. The key-code processing table is stored in the ROM 22, for instance.

To the ASIC 26, there is further connected the LCD controller 28 for controlling the image displaying on the LCD 41. The LCD controller 28 controls, based on commands of the CPU 21, the LCD 41 to display information relating to the operation of the printer 2 or the scanner 3 and the image read by the scanner 3 or inputted to the MFD 1. The image data of the display image to be displayed on the LCD 41 is outputted by the CPU 21 to the LCD controller 28. The LCD controller 28 is configured to store the received image data in an integral memory incorporated therein and scan the integral memory at a prescribed period so as to generate RGB signals for pixels to be outputted to the LCD 41, based on the image data (the bitmap data) stored in the integral memory. Accordingly, each time when new image data is received, the content of the integral memory is updated. The updated content is reflected on the display image on the LCD 41. In other words, the image which has been already displayed does not change, so that, as the image reading by the scanner 3 proceeds, the image based on the new image data appears on the LCD 41. Thus, the images based on the read image data are successively displayed on the LCD 41.

The LCD 41 includes matrix switches (not shown) each of which corresponds to one of the three RGB primary colors. Upon application of electric charge to one of the matrix switches, liquid crystal molecules belonging to that matrix switch are arranged in a direction in which light passes therethrough, whereby one of the three RGB colors corresponding to that matrix switch is displayed on the LCD 41. Each one of the matrix switches corresponds to one dot of the RGB (one sub-dot of the RGB). Each of the RGB signals generated by the LCD controller 28 corresponds to one of the three RGB colors. On the basis of the generated RGB signals, the electric charge is applied to each of the matrix switches, whereby a display image is displayed on the LCD 41 based on information generated by the CPU 21 that includes the image data read by the scanner 3.

In the LCD controller 28, each time when the new image data is received from the display-image memory 23b, the content of the integral memory incorporated therein is updated, so that the images based on the read image data are successively displayed on the LCD 41 by a prescribed amount, e.g., by a prescribed amount corresponding to one-line data in the present embodiment.

In the present embodiment the outputting of the image data from the display-image memory 23b to the LCD controller 28 is delayed in accordance with the operation of the delay counter 23e, so that the image based on the read image data is displayed on the LCD 41 asynchronous to the reading, namely, displayed at a speed lower than the image reading speed. That is, a displaying timing is controlled such that a pace at which one-line images based on the one-line image data read out from the display-image memory 23b are successively displayed, i.e., the image displaying speed is made lower than a pace at which the read one-line image data is successively stored in the image memory 23a (in the display-image memory 23b), i.e., the image reading speed.

Next, there will be explained processings and operations performed in the thus constructed MFD 1 with reference to the flow charts of FIGS. 4, 5A-5B, and 6 and the schematic view of FIGS. 7A-7H showing the memory operations. The MFD 1 is configured to execute the reading processing (FIG. 4) in relation to the document reading and the display-editing processing (FIGS. 5A-5B) in relation to the image displaying based on the read image data, according to time-division in a multitasking fashion.

The flow chart of FIG. 4 shows the reading processing performed in the MFD 1. The reading processing is executed by the CPU 21 periodically at predetermined time intervals. The reading processing is performed in response to a command inputted through any of the operation-mode selecting keys 40A1-40A3. The reading processing will be explained with reference to the flow chart of FIG. 4. Initially, it is confirmed whether a command has been inputted through any one of the operation-mode selecting keys 40A1-40A3 (S1). Where no command has been inputted through the operation keys 40A-40A3 (S1: NO), the reading processing is ended because the MFD 1 is not requested to perform any of the three functions, i.e., the facsimile transmission, the copier function, and the scanner function. On the other hand, where a command has been inputted through any one of the operation-mode selecting keys 40A1-40A3 (S1: YES), the operation-mode flag is updated (S2) in accordance with a selected one of the operation-mode selecting keys 40A-40A3 because the MFD 1 is requested to perform any one of the three functions described above.

More specifically explained, where the selected one of the operation-mode selecting keys 40A1-40A3 is the facsimile-mode key 40A1, the FAX flag 23d1 is turned ON to indicate that the image-data receiving device to which the image data read by the scanner 3 is to be outputted is the recipient facsimile machine and the MFD 1 is set in the facsimile mode.

Where the selected one of the operation keys 40A1-40A3 is the copy-mode selecting key 40A2, the printer flag 23d2 is turned ON to indicate that the image-data receiving device is the printer 2 and the MFD 1 is set in the copy mode. Where the selected one of the operation-mode selecting keys 40A-40A3 is the scanner-mode selecting key 40A3, the PC flag 23d3 is turned ON to indicate that the image-data receiving device is the PC and the MFD 1 is set in the scanner mode. In this respect, except the operation-mode flag 23d that corresponds to the selected one of the operation-mode selecting keys 40A-40A3, the other two operation-mode flags 23d are tamed OFF in the processing of S2.

Subsequently, it is confirmed which one of the operation-mode flags 23d1-23d3 has been turned ON (S3). Where the operation-mode flag which has been turned ON is the FAX flag 23d1 (S3: FAX flag), there is executed a FAX-parameter setting processing for setting various parameters necessary for executing the facsimile operation, i.e., facsimile-transmission operation (S4). Examples of the parameters set in the FAX-parameter setting processing include a phone number of the recipient facsimile machine and image resolution.

Thereafter, the input-page counter 23f is set at "1" (S5), the output-page counter 23g is set at "1" (S6), and the display-editing processing is initiated (S7). In the display-editing processing shown in FIGS. 5A-5B, the image based on the image data if the document that has been read in the reading processing is displayed on the LCD 41 and the output range of the image data is determined based on a manipulation by the operator. The display-editing processing is executed by the CPU 21 in a multitasking fashion in parallel with the reading processing after having being initiated in the reading processing.

After the display-editing processing has been initiated in S7, the scanner 3 is driven to read the image data by one line (S8). After the read image data has been written in the image memory 23a (S9), the image data written in the image memory 23a is written in the display-image memory 23b indicated by the count value of the input-page counter (S10).

The MFD 1 of the present embodiment is not configured such that the writing of the image data from the image memory 23a into the display-image memory 23b is delayed, but configured such that the outputting of the image data from the display-image memory 23b to the LCD 41 is delayed in relation to the reading of the image data from the document. According to the arrangement, the writing of the image data from the image memory 23a into the display-image memory 23b is performed without delay. The image data written into the image memory 23a in S8 is immediately written into the display-image memory 23b in S9. The MFD 1 may be configured such that the image displaying speed is made lower than the image reading speed by delaying the writing of the image data from the image memory 23a into the display-image memory 23b.

Subsequently, it is confirmed whether a position in the document being currently read by the scanner 3 (i.e., a reading position) has reached the end margin of the document (S11). Where the reading position has not yet reached the end margin of the document (S11: NO), it means that the reading of the whole image of the document is not yet finished, namely, the reading position has not yet reached the last line of the image of the document and there remains a portion of the image which has not yet been read. In this instance, the control flow goes back to S8 and the processings in S8-S11 are repeatedly executed until the reading position in the document by the scanner 3 reaches the end margin of the document.

Where the reading position has reached the end margin of the documents (S11: YES), it means that the reading of the image data by the scanner 3 has completed with respect to the last line of the image of the document. In this instance, it is judged whether there exists a next-page document based on the result of detection by the document-detecting sensor 30 (S12). Where it is judged that there exists no next-page document (S12: NO), it means that all pages, i.e., all documents, have been read. Thus, the current execution of the reading processing is ended. In this connection, when the reading of the document by the scanner 3 is performed using the FBS, there exists no next-page document. Therefore, the reading processing is ended upon completion of the reading of a one-page document.

On the other hand, where it is judged that there exists a next-page document (S12: YES), the count value of the input-page counter 23f is incremented by "1" (S13) to designate the next-page document. Then, the control flow goes back to S8 and the processings in S8-S12 are repeatedly executed until the reading of the final-page document is completed. In this connection, when the plural-page documents are continuously read with the ADF 7 being actuated, a step not shown is implemented before going back to S8 if it is judged that there exists a next-page document, so that there are performed discharging of the already read document into the document-discharge tray 10 and setting of the next-page document into the prescribed reading location by actuating corresponding portions in the MFD 1.

In the meantime, where it is confirmed in S3 that the operation-mode flag which has been turned ON is the printer flag 23d2 (S3: printer flag), it means that the MFD is requested to perform the copying operation. In this instance, there is executed the copy-parameter setting processing for setting various parameters necessary for the copying operation (S14). Then the control flow goes to S5. Further, where it is confirmed in S3 that the operation-mode flag which has been turned ON is the PC flag 23d3 (S3: PC flag), it means that the MFD 1 is requested to perform the scanning operation for outputting the read image data to the PC. In this instance, there is executed the PC-scanner-parameter setting processing (S15). Then the control low goes to S5.

With reference to the flowchart of FIGS. 5A-5B, there will be explained the display-editing processing in a case where the facsimile transmission is selected. In the display-editing processing, the image based on the read image data is displayed on the LCD 41 at a speed lower than the image reading speed and the output range of the read image data is determined on the display screen of the LCD 41. It is noted that, even where the printer 2 or the PC is designated as the image-data receiving device, a processing similar to the display-editing processing is executed and the outputting operation in accordance with the designated image-data receiving device is executed, in place of the facsimile transmission processing (S30).

In the display-editing processing, it is initially confirmed whether one-line image data is stored in the display-image memory 23b, i.e., one of the first through the n-th display-image memories 23ba-23bn, that is indicated by the output-page counter 23g (S21). In this connection, since the count value of the output-page counter 23g is set at "1" upon initiation of the reading processing, there is initially indicated the first display-image memory 23b1, namely, there is initially designated, as target image data to be processed in the display-editing processing, the image data of the first-page document.

In the present embodiment, a one-line image of the document is displayed on the LCD 41 a predetermined time after displaying of a preceding one-line image which precedes that one-line image. An image of a first line of the first-page document is displayed without waiting for an elapse of the prescribed time measured by the delay counter 23e. Accordingly, in some occasions, there may arise a situation in which the image data of the first line is not yet stored in the display-image memory 23b. In the present embodiment wherein one-line image data is set as a minimum output unit, it is confirmed in S21 whether the image data in the minimum output unit is stored in the display-image memory 23b.

Where the one-line image data is not stored in the display-image memory 23b (S21: NO), implementation of the processings in S22 and the following steps is waited for until the one-line image data is stored in the display-image memory 23b indicted by the output-page counter 23g. On the other hand, where the one-line image data is stored in the display-image memory 23b (S21: YES), there is stored, in the pointer memory 23c, an address in the display-image memory 23b at which end data of the image data of the first line is stored (S22).

In FIGS. 7A-7H, there are schematically illustrated the image memory 23a on a left-hand side of the figures, the display-image memory 23b on a right-hand side of the figures, the pointer memory 23c interposed between the image memory 23a and the display-image memory 23b, and the output-page counter 23g below the pointer memory 23c. In FIGS. 7A-7H, each of the image memory 23a and the display-image memory 23b has addresses from 0 (zero) to X. At the same address in the image memory 23a and in the display-image memory 23b, the same image data is retained. Here, the address in each of the image memory 23a and the display-image memory 23b is virtually provided while assigning a top address in each memory to "0". Accordingly, when the image data is actually read out from or written into each memory, an offset value is added to the virtually provided address so as to be converted into an actual address indicative of an actual storage position in the RAM 23.

In the interest of brevity in FIGS. 7A-7H, one-line image data is stored in an area of 100 addresses, and whole image data of a one-page document is stored in an area of 2000 addresses. Accordingly, where whole image data of all of the documents is read, the image data of the first-page document is stored in the image memory 23a at addresses from "0" to "1999", the image data of the second-page document is stored in the image memory 23a at addresses from "2000" to "3999". In FIGS. 7A-7H, each diagonally hatched area in each memory 23a, 23b indicates an area in which the image data is stored while each double-hatched area in the display-image memory 23b indicates an area of the image data outputted to the LCD 41.

Figure 7A:
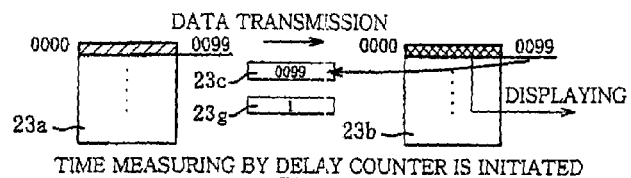
FIGS. 7A-7H schematically show memory operations of an image memory and a display-image memory.

As shown in FIG. 7A, in the image data written into the display-image memory 23b from the image memory 23a in the reading processing, a final or end address of the stored image data is stored in the pointer memory 23c in S22.

Subsequently, in the image data stored in one display-image memory 23b that is indicated by the count value of the output-page counter 23g, the image data stored in an area from the top address to the address stored in the pointer memory 23c is outputted to the LCD controller 28 and the image based on the outputted image data is displayed on the LCD 41 (S23). Accordingly, as shown in FIG. 7A, the image based on the first-line image data is displayed on the LCD 41.

The outputting of the image data from the display-image memory 23b to the LCD controller 28 may not be necessarily performed one line by one line, but may be performed for a predetermined unit amount, e.g., for a set of line image data of plural lines.

Figure 8A:
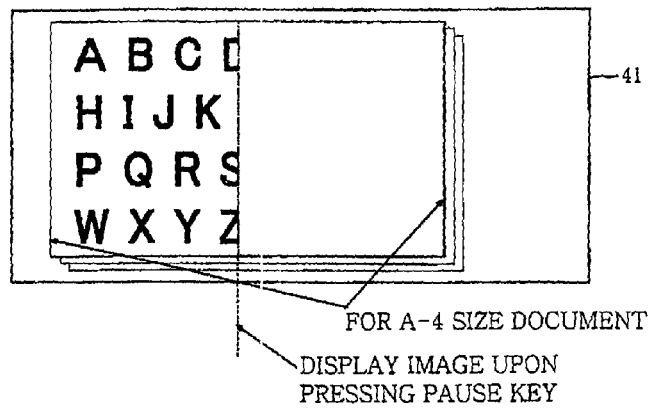
FIGS. 8A-8C are views showing examples of display images displayed on a display screen after image reading.
Figure 8B:
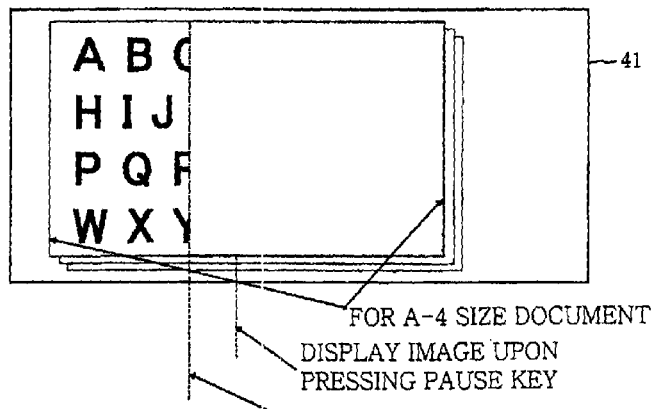
Figure 8C:
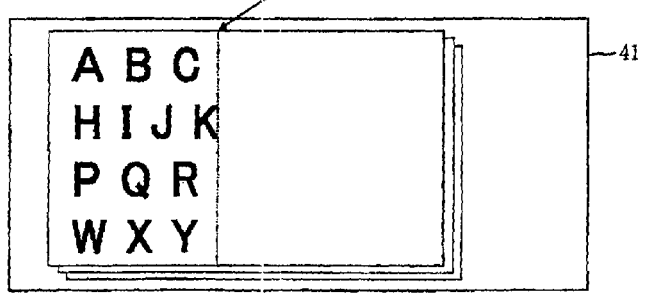

By outputting the image data stored in one display-image memory 23a indicated by the count value of the output-page counter 23g, a group of image data is outputted to the LCD controller 28 on a page-by-page basis. The LCD controller 28 writes the received image data into a buffer incorporated therein, and the display image to be displayed on the LCD 41 is formed by the image data stored in the buffer. Accordingly, the display image of a one-page document is formed on a forefront of the display screen. Where the display image of a next-page document is displayed, the display image of a preceding document that precedes the next-page document is formed behind the display image of the next-page document. Actually, the display image of the preceding document does not appear on the LCD 41 as shown in FIGS. 8A-8C.

Subsequently, the count value of the delay counter 23e is set at "0" (S24). Then it is confirmed whether the pause key 40B1 is pressed (S25). Where the pause key 40B1 is not pressed (S25: NO), the count value of the delay counter 23e is incremented by "1" (S26) and then it is confirmed whether the count value is less than 100 (S27). Where the count value of the delay counter 23e is less than 100 (S27: YES), it means that the prescribed time (i.e., the delay time or the waiting time) has not elapsed. In this instance, the control flow goes back to S25 and waits until the pause key 40B1 is pressed or until the delay time elapses, in other words, until the count value of the delay counter 23e reaches "100".

Figure 7B:
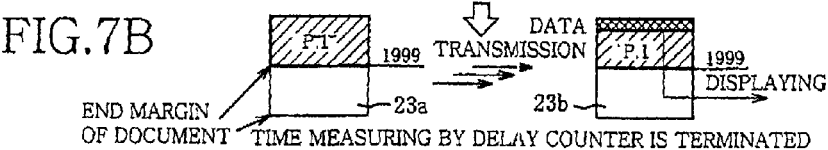

In the present embodiment, the display-editing processing and the reading processing are executed in the multitasking fashion. Therefore, even in a time period of waiting for a lapse of the delay time, the image data written into the image memory 23a in accordance with the reading of the document is successively stored in the display-image memory 23b as shown in FIG. 7B.

Where it is confirmed in S27 that the count value of the delay counter 23e is not smaller than 100 (S27: NO), it is checked whether the value stored in the pointer memory 23c is equal to the final or end address in the display-image memory 23b that is indicated by the output-page counter 23g (S28).

Where the value stored in the pointer memory 23c is equal to the final or end address (S28: YES), it means that the image data of the one-page document is already outputted. In this instance, it is confirmed whether there exists a next-page document (S29). The confirmation whether there exists a next-page document is performed by comparing the count value of the input-page counter 23f and the count value of the output-page counter 23g. That is, where the count value of the output-page counter 23g is smaller than the count value of the input-page counter 23f, the number of pages of the documents whose image data has been outputted does not yet reach the number of pages of the read documents. Thus, it is possible to judge whether there exists a next-page document. The confirmation in S29 may be performed otherwise. For instance, the confirmation whether there exists a next-page document may be performed based on whether or not the image data is stored in addresses that follow after the address indicated by the pointer memory 23c that is confirmed in S28.

Where it is confirmed that there exists no next-page document (S29: NO), there is executed a FAX transmission processing for transmitting the read image data to the facsimile machine as the designated image-data receiving device (S30), and the display-editing processing is completed. Where it is confirmed that there exists a next-page document (S29: YES), the count value of the output-page counter 23g is incremented by "1" (S32), and the control flow goes to S21. When the processing in S21 and the processings in the following steps are implemented via the processing in S32, the image based on the image data of the next-page document is indicated on a forefront of the display screen of the LCD 41.

Figure 7C:
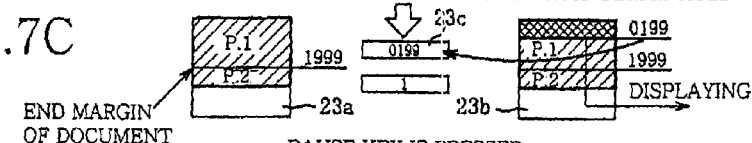

On the other hand where it is confirmed in S28 that the value stored in the pointer memory 23c is not equal to the final or end address in the display-image memory 23b that is indicated by the output-page counter 23g (S28: NO), the prescribed number "n" is added to the value stored in the pointer memory 23c (S31) to output the image data of a next line, and the control flow goes to S23. As mentioned above, because the prescribed number "n" corresponds to a number of addresses required for storing the one-line image data, the addition of the prescribed number "n" causes the value stored in the pointer memory 23c to be written into the final or end address at which the end data of the image data of the next line is stored. In FIGS. 7A-7H, the prescribed number "n" is 100. Accordingly, as shown in FIG. 7C, the value stored in the pointer memory 23c is changed from "0099" to "0199" after the delay counter 23e has measured the prescribed time.

Where it is confirmed that the pause key 40B1 is pressed (S25: YES), it means that there has been inputted a command for pausing the image displaying on the LCD 41. Where the answer "YES" is obtained in S25 due to the inputting of the pause command, the control flow avoids taking a route to S23 and S31 for updating the display image on the LCD 41. Therefore, the image based on the image data of a new line is not displayed on the LCD 41, and the image based on the image data that has been outputted to the LCD 41 is kept displayed, in other words, the progress of the image displaying is paused due to the inputting of the pause command.

After the pressing of the pause key 40B1, the processings in S33 and the following steps are executed, whereby a range of the image data based on which the image is displayed on the LCD 41 at a timing when the pause command is inputted is determined as a range of the image data to be outputted in the image data of a one-page document, i.e., the output range.

According to the arrangement described above, a range of necessary image data among the image data of the document is selected, and the necessary image data in the range is outputted to the image-data receiving device. Accordingly, it is possible to avoid image-data outputting in which the necessary image data is intermingled with unnecessary image data and to save recording sheets and so on to be consumed in printing.

Figure 7D:
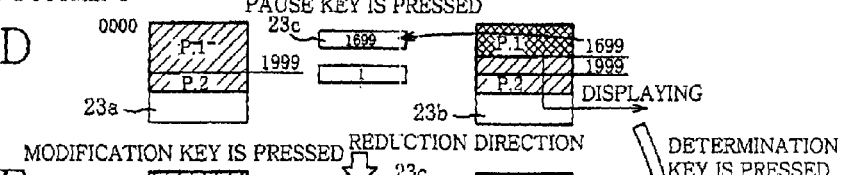
Figure 7E:
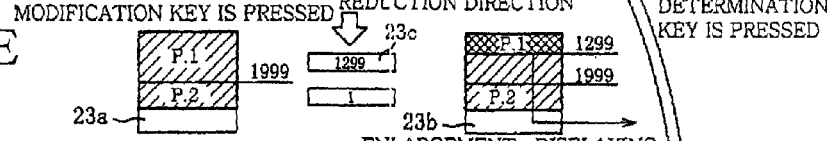

FIG. 7D shows state in which the pause key 40B1 is pressed during the image displaying of the first-page document. FIG. 7D indicates the following states: the image data up to some midpoint in a second-page document is stored in the image memory 23a and the display-image memory 23b; and the image data that corresponds to the display image being displayed on the LCD 41 is a part of the image data of the first-page document, which part is stored in the first display-image memory 23b1 from the top address to an address of "1699" thereof. Accordingly, there is stored, in the pointer memory 23c, the address of "1699" which is the address of the end data in the image data that corresponds to the display image being displayed on the LCD 41.

Where the answer "YES" is obtained in S25 as a result of pressing the pause key 40B1 as described above, it is confirmed whether any one of the modification keys 40B3, 40B4 has been pressed (S33). Where any one of the modification keys 40B3, 40B4 has been pressed (S33: YES), it means that the output range of the image data determined by pressing the pause key 40B1 is requested to be modified. In this instance, it is confirmed in S34 whether the output range is requested to be modified by pressing the modification key 40B3 in a direction in which the output range is reduced (i.e., a reduction direction) or the output range is requested to be modified by pressing the modification key 40B4 in a direction in which the output range is enlarged (i.e., an enlargement direction).

Where it is confirmed that the output range is requested to be modified in the reduction direction (S34: reduction direction), the prescribed number "n" is subtracted from the address stored in the pointer memory 23c (S35). In a state shown in FIG. 7E, as a result of pressing the modification key 40B3 four times, the end data address in the output range of the image data stored in the display-image memory 23b is shifted toward a top address side by four lines (corresponding to the predetermined number "n" (=100)×4), namely, shifted from an address "1699" in FIG. 7D to an address "1299". Accordingly, in FIG. 7E, the output range of the image data ranges from an address of "0" to the address of "1299".

Figure 7F:
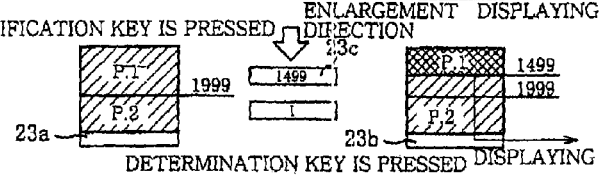

In the meantime, where it is confirmed that the output range is requested to be modified in the enhagement direction (S34: enlargement direction), the prescribed number "n" is added to the address stored in the pointer memory 23c (S36). The pressing of the modification key 40B4 one time means a request of modification of the output range such that the image data is added by one line to the image data in the current output range. FIG. 7F indicates the following state: in the state of FIG. 7E in which the end data address in the output range of the image data stored in the display-image memory 23b is the address of "1299", namely, the address stored in the pointer memory 23c is "1299", the modification key 40B4 is pressed two times, whereby there is added, to the address stored in the pointer memory 23c, the prescribed number "n" (=100) two times and accordingly the address stored in the pointer memory 23c is updated to "1499". Thus, there is specified, as the output range of the image data based on which the image is to be displayed on the LCD 41, a range of the image data in the first display-image memory 23b1 from the address of "0" to the address of "1499".

In other words, the output range which has been once reduced can be enlarged or restored. More specifically explained, the data-output range (the image-display range) can be enlarged beyond a range of the image data based on which the display image is displayed at a timing when the pause key 40B1 is pressed, provided that the image data to be included in the output range is stored in the display-image memory 23b that is indicated by the output-page counter 23g.

S35 or S36 is followed by S37 in which there is outputted, to the LCD 41, the image data stored in the display-image memory 23b (indicated by the count value of the output-page counter 23g) from the top address to the address stored in the pointer memory 23c, thereby updating the display image on the LCD 41. In the present embodiment, the range of the image data based on which the display image is displayed on the LCD 41 is determined as the output range of the image data to be outputted to the designated image-data receiving device. Accordingly, it is possible to notify the operator of the modification of the output range by updating the display image on the LCD 41 in accordance with the modified output range.

When the value of the pointer memory 23c updated in S36, namely, the updated address in the pointer memory 23c, is beyond the range of the image data stored in one display-image memory 23b from which the image data is to be read out, there is no image data to be read out in S37. In this instance, the output range of the image data to be outputted to the LCD 41 is up to the end of the image data stored in the display-image memory 23b. In S37, the image data within a storage area of the display-image memory 23b that is indicated by the output-page counter 23g is read out. Accordingly, even if it is requested, by pressing the modification key 40B3, 40B4, to modify the output range beyond the range of one display-image memory 23b from which the image data is to be read out, there are not displayed images of documents which are prior to and subsequent to a current document whose image is currently being displayed.

In a state in which the display image of a first-page document is currently displayed on the LCD 41, for instance, when the value (the address) stored in the pointer memory 23c is updated beyond the storage area of the first display-image memory 23b1, there is indicated, on the LCD 41, up to the image that corresponds to the end data of the image data stored in the first display-image memory 23b1.

Figure 7G:
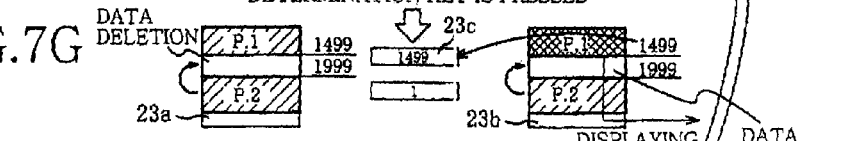
Figure 7G:
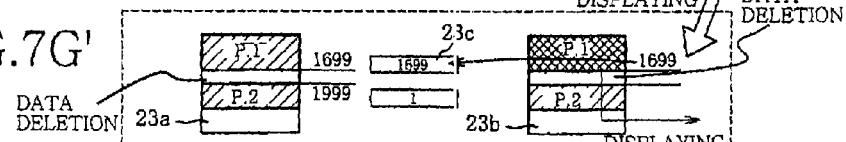

Subsequently, it is confirmed whether the determination key 40B2 has been pressed (S38). Where it is confirmed that the determination key 40B2 has been pressed (S38: YES), there is deleted, from the display-image memory 23b and the image memory 23a, the image data stored at addresses whose values are larger than the value of the address stored in the pointer memory 23c (S39). The pressing of the determination key 40B2 means that the output range is determined. Accordingly, in the image memory 23a and the display-image memory 23b, the image data stored at the addresses whose values are larger than the value of the address stored in the pointer memory 23c is unnecessary data, namely, such image data does not fall within the output range. In a state shown in FIG. 7G, for instance, where the image data from the address of "0" to the address of "1499" is included in the output range (the image display range) determined for the first-page document, the image data stored at an address of "1500" to an address of "1999" is no longer necessary, so that such image data is deleted from the image memory 23a and the display-image memory 23b.

Where the determination key 40B2 is pressed without the modification keys 40B3, 40B4 pressed after the pause key 40B1 has been pressed, the output range determined by pressing the pause key 40B1 is finalized as the output range, as shown in FIG. 7G' enclosed by a broken line. In other words, the image data within the output range determined by pressing the pause key 40B1 shown in FIG. 7D is outputted to the image-data receiving device.

After S39, the control flow goes to S29. On the other hand, where it is confirmed in S33 that the modification keys 40B3, 40B4 has not been pressed (S33: NO), the control flow goes to S38. Where it is confirmed in S38 that the determination key 40B2 has not been pressed (S38: NO), the control flow goes to S33 to wait for pressing of the modification keys 40B3, 40B4 or the determination key 40B2. In other words, when the image displaying is paused as a result of pressing the pause key 40B1, there is determined, as the output range, a range of the image data that corresponds to the display image which is static due to the pressing of the pause key 40B1. However, the output range of the document is not finalized unless the determination key 40B2 is pressed. Accordingly, the determined output range is modifiable by operating the modification keys 40B3, 40B4 until the determination key 40B2 is pressed. If the determination of the output range is made only by determining with use of the pause key 40B1, there is required an exact operation to timely operate the operable portions for determining a desired output range, deteriorating usability or operability of the MFD 1. In the light of this, in the present MFD 1, the output range determined by the pause key 40B1 is made provisional and the determined output range is modifiable.

In the present embodiment, when there exists a next-page document, the image data which is read out from the next-page document is stored in each of the image memory 23a and the display-image memory 23b, so as to be continuous with an end of the image data of a preceding-page document that precedes the next-page document. In other words, when a part of the image data which has been read from the preceding-page document is deleted in S39, the image data of the next-page document is shifted toward a smaller address side in each of the image memory 23a and the display-image memory 23b, as shown in FIG. 7H.

Figure 7H:
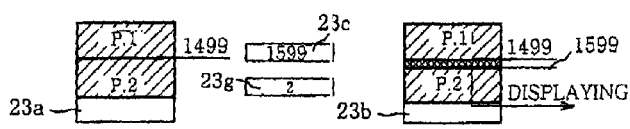

In a state shown in FIG. 7H, if the reading operation were performed up to the end margin of the first-page document, the image data of the first-page document would be stored up to an address of "1999". However, in fact, the output range is reduced, so that the image data of the first-page document is stored only up to an address of "1499". In such an instance, in the present embodiment, the image data of the next-page document, i.e., the image data of the second-page document, is stored not from an address of "2000", but from an address of "1500".

Here, a part of the first-page document which is not included in the determined output range may be set as a blank. Data of the blank part, i.e., blank data, may be stored in a rest of the memory area (ranging from the address of "1500" to the address "1999") which is kept in each of the image memory 23a and the display-image memory 23b for the first-page document. That is, the data to be stored in the image memory 23a and the display-image memory 23b may be constituted by a combination of the image data and the blank data. In the present embodiment, however, the data shifting is performed in the step (not shown) in the display-editing processing, such that the image data of the next-page document is continuous with the end of the image data of the preceding-page document. Therefore, it is possible to efficiently utilize the image memory 23a and the display-image memory 23b.

As described above, when it is judged that the document being read is a final-page document, namely, it is judged that there exists no next-page document, in the display-editing processing, there is executed the outputting operation of outputting the image data to the image-data receiving device. Therefore, the operator need not perform any operation for commanding the execution of the outputting operation. In addition, since the step (S29) for judging a presence or an absence of the next-page document is implemented after the steps for determining and modifying the output range, the image data is outputted after the output range desired by the operator has been finalized. Thus, the image data is outputted at an adequate and accurate timing.

Further, in the display-editing processing, the displaying of the image of the next line is delayed until the delay counter 23e measures the prescribed time, owing to the processings from S25 to S27, while, on the other hand, the document reading proceeds irrespective of the delay in the image displaying, so that the images based on the read image data can be successively displayed on the LCD 41 at a speed lower than the image reading speed. In other words, when focusing on the read image data of a certain one line, the image based on the image data of the one line is not displayed on the LCD 41 in synchronization with the reading, but is displayed at a timing delayed from the reading. Accordingly, there arises a difference between an amount of the image data which has been stored in the image memory 23a as a result of the reading and an amount of the image data based on which the display image has been displayed on the LCD 41.

As in the MFD 1 according to the present embodiment, the image is displayed based on the image data read in parallel with the document reading in a conventional image reading apparatus. However, in the conventional apparatus, the image displaying is performed in synchronization with the document reading by the scanner. Since the document reading by the scanner is speeded up, the image displaying is accordingly speeded up, making it difficult for the operator to visually check or identify the images successively displayed on the LCD. In the present MFD 1, however, in the display-editing processing, the displaying of the image of the next line is waited for during the measuring of the prescribed time by the delay counter 23e, whereby the image based on the read image data can be displayed on the LCD 41 while being incremented by one line, at a speed lower than the image reading speed, namely, at a speed lower than a pace at which a target line on the document from which the image data is to be read is moved. Therefore, the image is displayed on the LCD 41 such that the image successively increases at a slow pace, thereby improving the viewability of the image.

In the present embodiment, the image data which has been read by a raster scanning technique is successively stored in the image memory 23a and the display-image memory 23b. In the image displaying on the LCD 41, there is conducted coordinate conversion in accordance with disposition of the display screen of the LCD 41, so that the image based on the read image data is displayed such that a reading direction corresponds to a longitudinal or lengthwise direction of the display screen of the LCD 41, as shown in FIGS. 8A-8C.

Figure 6:
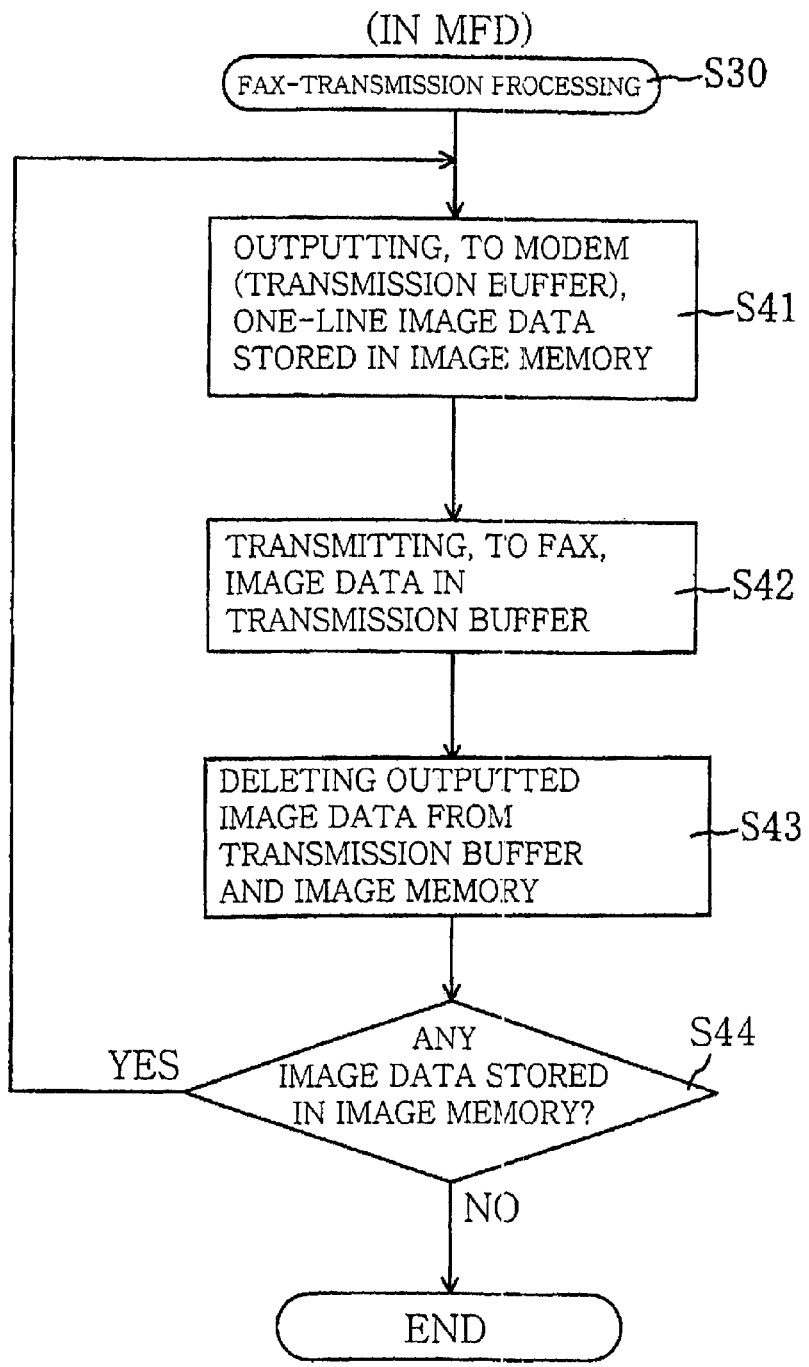
FIG. 6 shows a flow chart indicating a FAX-transmission processing routine executed in the apparatus of FIG. 1.

Referring next to the flow chart of FIG. 6, the FAX-transmission processing (S30) executed in the display-editing processing shown in FIGS. 5A-5B will be explained. Prior to the execution of the FAX-transmission processing of S30, there are executed, in advance, various processings necessary for the fax transmission such as a line-closing processing for closing a telephone line.

In the FAX-transmission processing (S30), there is initially outputted, to the modem 32, the image data of one line (one-line image data) stored in the image memory 23a (S41). The one-line image data inputted to the modem 32 is stored in the transmission buffer 32a incorporated in the modem 32. Subsequently, the image data stored in the transmission buffer 32a is transmitted to the recipient facsimile machine, namely, the image data is outputted to the line (S42). The image data outputted to the line is deleted from the transmission buffer 32a and the image memory 23a (S43). Then it is confirmed whether there is still stored any image data in the image memory 23a (S44). Where it is confirmed there is stored no image data in the image memory 23a (S44: NO), it means the facsimile transmission of the image data is completed. In this instance, the FAX-transmission processing (S30) is ended.

Where it is confirmed in S44 that there is still stored any image data in the image memory 23a (S44: YES), the control flow goes to S41 to continue the facsimile transmission.

In the above-described FAX-transmission processing, the image data is deleted from the transmission buffer 32a at a timing when the image data is outputted to the line, namely, when the image data is transmitted to the recipient facsimile machine. Accordingly, the transmission buffer 32a is prevented from being full of the image data, so that there causes no trouble in writing the image data into the transmission buffer 32a.

FIGS. 8A-8C show examples of the display image displayed on the display screen of the LCD 41 when the display-editing processing is executed. In each of FIGS. 8A-8C, the reading operation is performed on the documents with an A-4 size.

Within the display screen of the LCD 41, there is indicated a frame which is defined by a size of the document to be read. In FIGS. 8A-8C, the size of the frame corresponds to the A-4 size. The image based on the image data read out from the display-image memory 23b is displayed in the frame.

Because the output range (the image display range) set for the image data stored in the display-image memory 23b is changed or enlarged one line by one line, there is indicated, on the LCD 41, the display image which is successively updated each time when the output range is changed, i.e., the display image which is enlarged one line by one line.

FIGS. 8A-8C, a short side of the LCD 41 corresponds to a width of the document (or the depth direction of the MFD 1) and a long side of the LCD 41 extends in a document-feeding direction in which the document is fed. A left-hand end of the frame corresponds to the beginning margin as the reading-start margin of the document, and the line images based on the read line image data are sequentially displayed in order in a rightward direction of the frame. As shown in FIGS. 8A-8C, the display image is displayed on a page-by-page basis in the present embodiment. Accordingly, the display image of a target-page document which is desired to be displayed is indicated in a forefront frame on the display screen while the display image of a preceding-page document that precedes the target-page document is indicated in a frame behind the forefront frame so as to overlap the same. That is, the display image of the preceding-page document is not viewable.

Here, alphabet characters "A B C D . . . " are recorded in the document. As shown in FIGS. 8A-8C, the image "A B C D . . . " corresponding to the image data read from the document appears in the forefront frame of the LCD 41. A range of the image data based on which the image is displayed on the forefront frame is made as the output range of the image data for the target-page document. In the present embodiment, the range of the image data based on which the image appears on the LCD 41 (including the image data based on which the images appear on the respective frames behind the forefront frame) is made as the output range of the image data to be outputted to the image-data receiving device.

The display image of each page of the documents can be displayed such that a part of the image of the read document is displayed, by operating the pause key 40B1 and the modification keys 40B3, 40B4. Since a range of the image data based on which the display image is being displayed is made as the output range, the output range can be determined so as to include the image data of the part of the image of the read document by the operation of the pause key 40B1 and the modification keys 40B3, 40B4. To the image-data receiving device, the image data of a series of line images displayed in the frame is transmitted or outputted as the image data of a one-page document.

It is noted that the image displaying manner is not limited to that described above, but various image displaying manners may be suitably employed. For instance, the display images of the respective pages of the documents may be displayed in a scrolling manner. Further, the display images of the respective pages of the documents may be displayed on the same display screen (in a multi-displaying manner). In the multi-displaying manner, when one of the pages of the documents is designated on the display screen, the display image of the document corresponding to the designated page may be displayed in enlargement. Further, a plurality of image displaying manners may be selectively employed depending upon a request by the operator.

FIG. 8A shows a state in which the image displaying is paused due to pressing of the pause key 40B1. Explained in more detail, in the forefront frame of the LCD 41, the image of the alphabet characters "A B C D . . . " is displayed in an area from the left-hand end of the frame to a middle position thereof corresponding to a position in the document at which the reading is paused (i.e., a reading-pausing position) whereas no image appears in an area from the middle position of the frame (corresponding to the reading-pausing position)

to a right-hand end thereof, i.e., in an area enclosed by a two-dot chain line in FIG. 8A.

As described above, the line images based on the line image data read by the scanner 3 are sequentially displayed on the LCD 41 along the reading direction. Accordingly, the operator can visually check the LCD 41 and pause the image displaying by pressing the pause key 40B1 at a timing when the image displaying reaches a desired position. In other words, there is determined, as the output range of the image data of the read document, a range of the image data of the display image being displayed on the LCD 41 at the timing when the pause key 40B1 is pressed. The display image based on the image data which has been read before the pause key 40B is pressed is kept displayed on the LCD 41 until the determination key 40B2 or the modification key 40B3, 40B4 is pressed.

FIG. 8B shows a state in which the output range is reduced by pressing the modification key 40B3 after the pause key 40B1 has been pressed. Every time the modification key 40B3 is pressed, an image of one line (one-line image) is deleted or disappears from the display image that is being displayed on the LCD 41, based on the processings in S35 and S37 of the display-editing processing, so that the operator can recognize the modification of the output range.

FIG. 8C shows a state in which the output range which has been reduced by pressing the modification key 40B3 is restored or enlarged by pressing the modification key 40B4. Every time the modification key 40B4 is pressed, an image of one line (one-line image) appears on or is added to the display image that is being displayed on the LCD 41, based on the processings in S36 and S37 of the display-editing processing, so that the operator can recognize the modification (restoration) of the output range. Thus, the operator can easily modify the output range determined by pressing the pause key 40B1 and appropriately recognize the modified output range.

As described above, in the present embodiment, it is possible to extract or select, as the output range, a part of the image data which has been read and output the extracted part of the image data in the output range to the image-data receiving device. Accordingly, the operator can determine the output range simply by operating the pause key 40B1 at a timing when a range of the images which are sequentially displayed on the LCD 41 becomes equal to a desired range. Moreover, since the image displaying on the LCD 41 is performed at a speed lower than the image reading speed, it is possible to improve viewability of the display image that are dynamically displayed on the LCD 41. Accordingly, the operator can appropriately judge that a range of the image data based on which the image is displayed on the LCD 41 becomes equal to the desired range to be outputted, whereby the output range, can be accurately determined.

Figure 9A:
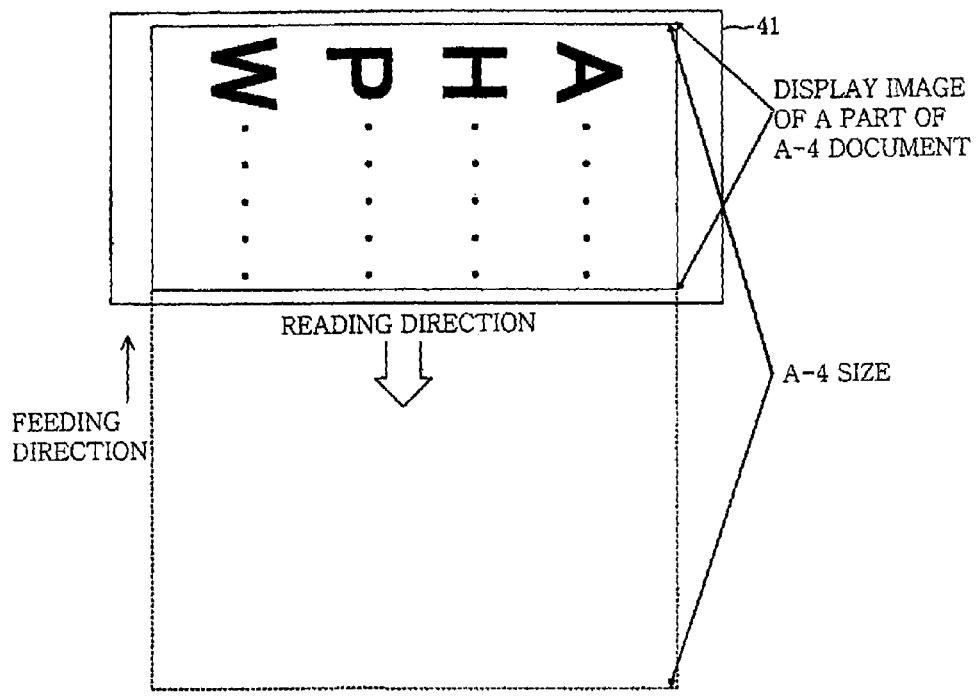
FIGS. 9A-9B are views showing examples of display images displayed on the display screen in a second embodiment.
Figure 9B:
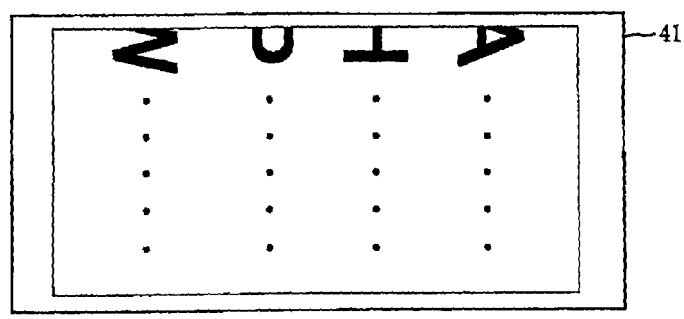

Referring next to FIGS. 9A-9B, there will be explained a second embodiment of the invention. The MFD 1 according to the illustrated first embodiment is configured to display the image of a one-page document in one display screen. Instead, the MFD 1 according to the second embodiment is configured as follows. A region of the image of the one-page document to be displayed at a time on one screen of the LCD 41, i.e., an image-display region of the document, is set as a part of the image of the one-page document, and the image-display region of the document is sequentially moved by scrolling along the reading direction in which the image data of the document is read, whereby the image based on the read image data is displayed on the LCD in a scrolling manner. In the second embodiment, the same reference numerals as used in the illustrated first embodiment are used to identify the corresponding components, and a detailed description of which is dispensed with. Further, in the second embodiment, the same concept as explained in the illustrated first embodiment is not explained in the interest of brevity.

FIGS. 9A-9B indicate examples of the display image displayed on the LCD 41 in the scrolling manner. In FIGS. 9A-9B, the widthwise direction of the document (or the depth direction of the MFD 1) corresponds to a direction in which the short side of the LCD 41 extends while the document-feeding direction (the reading direction) corresponds to a direction in which the long side of the LCD 41 extends. In FIGS. 9A-9B, the document has the A-4 size and is larger than the LCD 41. On the LCD 41, a part of the image based on the image data of the document is being displayed.

FIG. 9A shows an initial state of the reading operation, i.e., an initial state of the image displaying, in which the image in the vicinity of the beginning margin of the document is displayed. As the image displaying proceeds, the image-display region of the document is moved toward the end margin of the document as shown in FIG. 9B, so that the display image is updated.

Accordingly, the second embodiment is arranged as follows. In the processing in S23 of the display-editing processing of the illustrated first embodiment, the range of the image data to be read out from the display-image memory 23b does not start from the top address, but from an address which is smaller, by a predetermined number, than the address stored in the pointer memory 23c. According to the arrangement, an address of the image data corresponding to a display-beginning margin from which the image displaying is to start is linked to an address of the image data corresponding to a display-end margin at which the image displaying ends. Thus, there is displayed in the scrolling manner, on the LCD 41, the image from the display-end margin to a position located on an upstream side of the display-end margin in the document-feeding direction while the end margin is shifted.

Accordingly, the image displaying on the LCD 41 is performed in the scrolling manner, whereby parts of the document can be displayed in enlargement, unlike the arrangement in which the whole image based on the image data of the document is displayed on one display screen. As a result, the present arrangement ensures the operator improved viewability of the image displayed on the LCD 41.

Figure 10A:
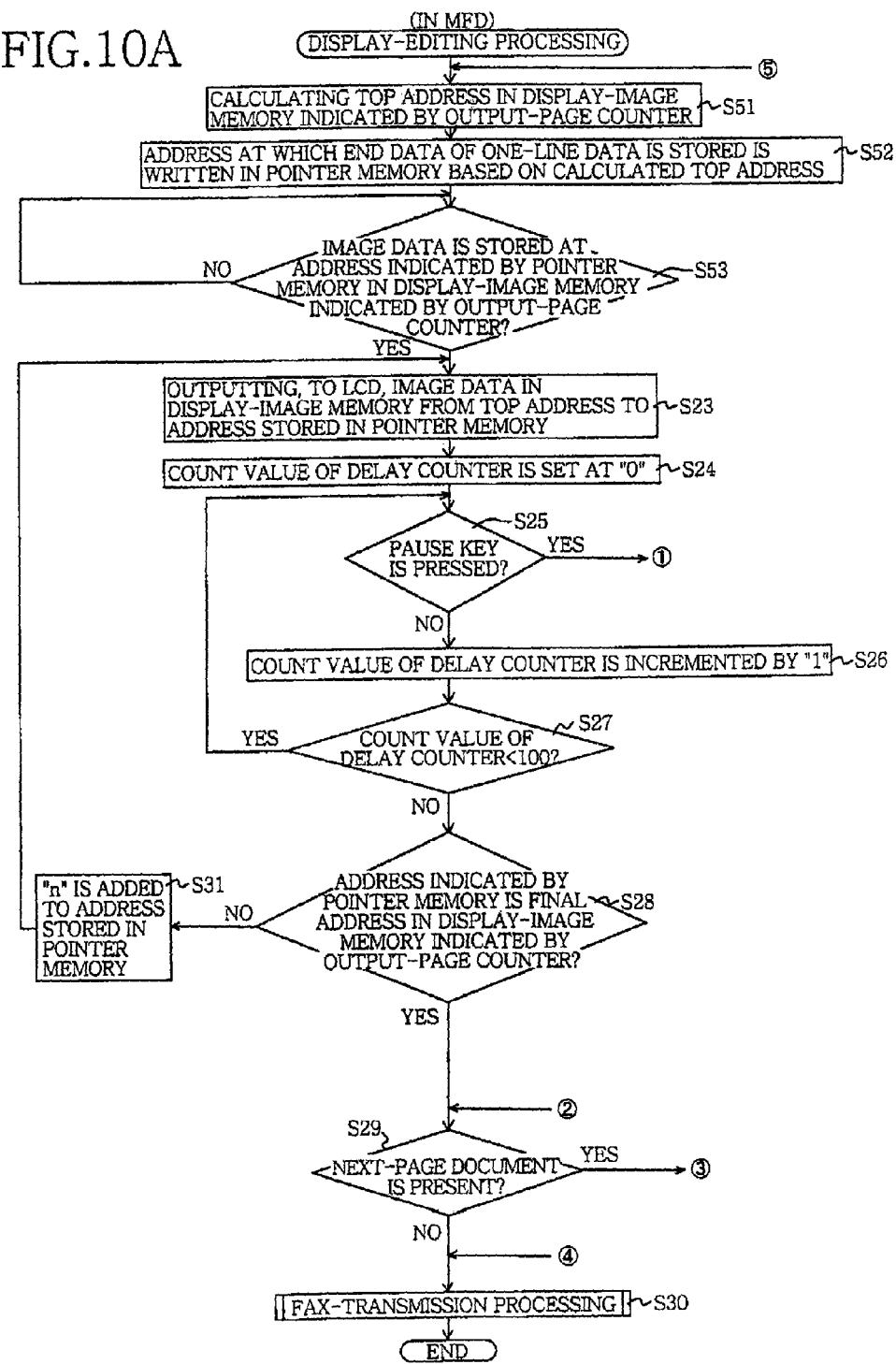
Figure 10C:
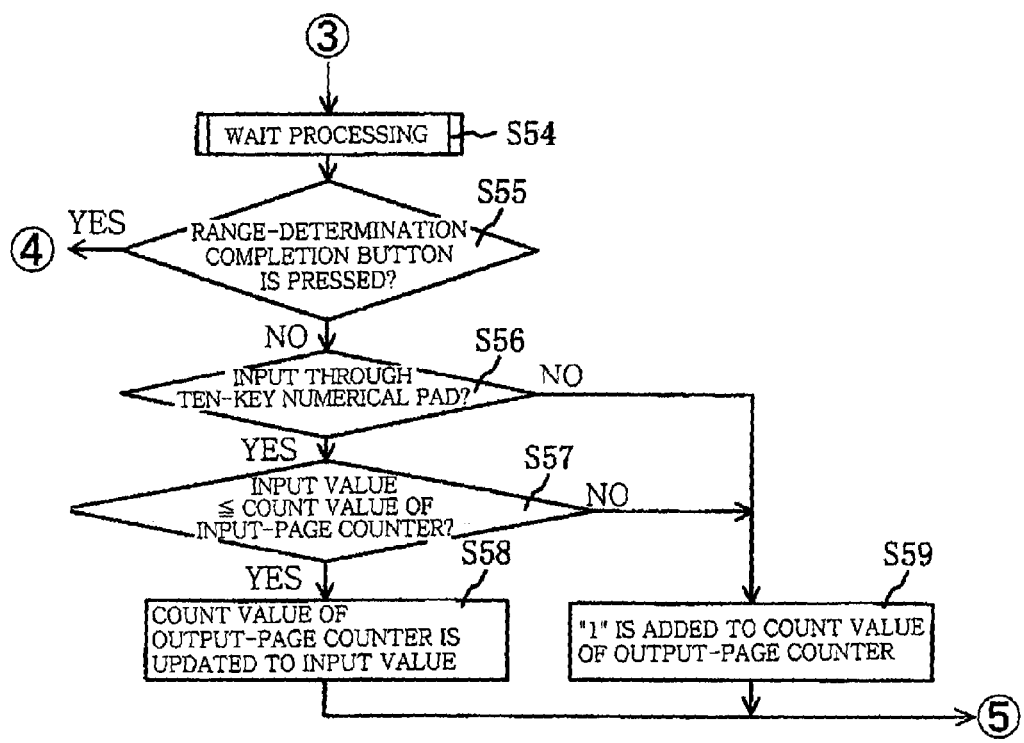

Referring next to FIGS. 10A-10C, there will be explained a third embodiment of the invention. In the illustrated first embodiment, the MFD 1 is configured to sequentially display, on the LCD 41, the images based on the read image data of the respective documents in the order in which the documents were read. Instead, in the third embodiment, when the operator performs a page-designating operation for designating a page of the document, the display-editing processing is arranged to display the image based on the image data of one of the document pages that is designated or selected by the operator. In other words, in the third embodiment, the image of the document page desired by the operator, namely, the image of the document page for which the output range of the image data needs to be specified, is displayed on the LCD 41 immediately when the page-designating operation is performed by the operator. The MFD 1 of the third embodiment additionally includes a range-determination completion button (not shown) for notifying the CPU 21 that the operation of determining the output range is, completed. In the third embodiment, the same reference numerals as used in the illustrated first embodiment are used to identify the corresponding components, and a detailed explanation of which is dispensed with. Further, in the third embodiment, the same concept as explained in the illustrated preceding embodiments is not explained in the interest of brevity.

The range-determination completion button is for being pressed by the operator and notifying the CPU 21 that the operation of determining the output range by the operator is completed. When the range-determination completion button is pressed by the operator, the CPU 21 judges that the determining operation of the output range by the operator is completed and executes the outputting operation of outputting the image data within the determined range to the image-data receiving device.

The operation of determining the output range is performed by the operator as desired. Therefore, the determining operation is not necessarily performed for all pages of the documents. Further, in the MFD 1 according to the third embodiment, when the operator performs the page-designating operation by inputting a numerical number through the ten-key numeric pad, the image of the designated document page is displayed on the LCD 41. Accordingly, the operator can perform the operation of determining the output range not in the order in which the documents are read, but in a random order designated by the operator. In the MFD 1, therefore, it is unknown how many times the page-designating operation is to be performed, namely, it is unknown whether the operation of determining the output range is completed, except when the operation is performed on the final-page document.

In the third embodiment, therefore, the MFD 1 is provided with the range-determination completion button for notifying the CPU 21 that the operation of determining the output range performed by the operator is completed. The arrangement enables the CPU 21 to accurately recognize completion of the determination of the output range which is performed for the read document page or pages as desired by the operator, owing to the pressing of the range-determination completion button.

A judgment for judging whether the range-determination completion button is pressed or not is made during a predetermined time period after the display image of a one-page document has been displayed. When it is detected that the range-determination completion button is pressed in the predetermined time period, the CPU 21 starts the outputting operation of the image data read by the scanner 3. In the third embodiment, the MFD 1 is configured to detect the pressing of the range-determination completion button only within the predetermined time period. Instead, the MFD 1 may be configured to monitor a state of the range-determination completion button all the time and to start the outputting operation at a timing when the pressing of the range-determination completion button is detected.

The document page whose image is to be displayed on the LCD 41 is indicated by the count value of the output-page counter 23g. In the third embodiment, however, since the document page whose image is to be displayed is designated through the ten-key numerical pad, the count value of the output-page counter 23g is changed in response to a value inputted through the ten-key numerical pad.

With reference to the flow chart of FIGS. 10A-10C, there will be explained a display-editing processing executed in the third embodiment. Like the display-editing processing in the illustrated first embodiment, the display-editing processing in the third embodiment is executed in a multi-tasking manner with the reading processing shown in FIG. 4. Initially, there is obtained by calculation a top address in the display-image memory 23b that is indicated by the output-page counter 23g (S51). The image data is written into the display-image memory 23b on a page-by-page basis. However, when the operation of determining the output range is completed for a one-page document, the image data of the one-page document which is outside the determined output range is deleted from the display-image memory 23b for the one-page document. In this instance, the image data of a next-page document that follows the one-page document is shifted toward a memory area of the display-image memory 23b for the one-page document, which memory area corresponds to the deleted image data of the one-page document. In other words, depending upon an amount of the image data that is deleted, top addresses of the image data of the second-page document and the following documents are changed. Accordingly, there is obtained in S51 by calculation a top address of the display-image memory 23b (i.e., any one of the first through the n-th display-image memories 23b1-23bn) that is indicated by the output-page counter 23g. Since the display-editing processing is initiated before the scanner is driven for the reading operation and after the output-page counter 23g has been set at "1", the value of the output-page counter 23g which is referred to in the processing of S51 performed immediately after the initiation of the display-editing processing is "1". Therefore, the image based on the image data of a first-page document is initially outputted to the LCD 41.

On the basis of the top address obtained in S51, there is written, into the pointer memory 23c, an address at which end data of one-line image data is stored (S52). Subsequently, it is confirmed whether the image data is stored at the address indicated by the pointer memory 23c in the display-image memory 23b that is indicated by the count value of the output-page counter 23g (S53). Where no image data is stored (S53: NO), implementation of the processings in S23 and the following steps are waited for until the one-line image data which has been read is written into the display-image memory 23b that is indicated by the count value of the output-page counter 23g. On the other hand, where the image data is stored at the address indicated by the pointer memory 23c in the display-image memory 23b (S53; YES), every time the count value of the delay counter 23e reaches the prescribed value (i.e., "100" in the present embodiment), there are displayed images, one line by one, based on the image data stored in the display-image memory 23b until the image of the last line on that document page is displayed (S23-S28, S31), as in the illustrated first embodiment.

When the pause key 40B1 is pressed during the image displaying, there is determined, as the output range, a range of the image data based on which the image is displayed on the LCD 41 at a timing when the pause key 40B1 is pressed. Thereafter, where any modification key 40B3, 40B4 is pressed, the determined output range is modified depending upon the pressed modification key 40B3, 40B4. Then by pressing the determination key 40B2, there is finalized, as the output range, the output range determined by pressing the pause key 40B1 (the modified output range where any modification key 40B3, 40B4 is pressed) (S33-S39). After the image of the last line has been displayed on the LCD 41 or after the determination key 40B2 has been pressed, it is confirmed whether there exists a next-page document (S29). Where there exists no next-page document (S29: NO), there is executed a FAX-transmission processing in which the image data stored in the image memory 23a is transmitted to a recipient facsimile machine as the image-data receiving device (S30). Thus, the display-editing processing is ended.

The display editing processing of the third embodiment is configured to designate, by an inputting operation using the ten-key numerical pad by the operator, a page of a document whose image is to be displayed on the LCD 41, among a second-page document and subsequent-page documents, after the image of the first-page document has been displayed or after the output range of the image data for the first-page document has been determined (or finalized). As described above, the reading operation proceeds at a higher speed than the image displaying. Accordingly, while the image displaying for the first-page document proceeds at a low speed, the image data of plural-page documents that follow the first-page document is successively stored in the image memory 23a (the display-image memory 23b). Therefore, it is possible to designate a page of one of the second-page document and the subsequent-page documents. Where it is judged that there exists a next-page document (S29: YES), a wait processing is executed (S54) and it is then confirmed whether the range-determination completion button has been pressed (S55).

Where it is confirmed that the range-determination button has been pressed (S55: YES), it means that the output range is no longer determined for other-page documents, namely, the operation of determining the output range for the current reading is completed. Accordingly, the control flow goes to S30 to execute the FAX-transmission processing (S30) for transmit the image data in the image memory 23a to the recipient facsimile machine as the image-data receiving device.

On the other hand, where it is confirmed that the range-determination button has not been pressed (S55: NO), it is confirmed whether there has been made an input through the ten-key numerical pad (S56). Where there has been made an input through the ten-key numerical pad (S56: YES), a numeric character, i.e., an input value, inputted through the ten-key numerical pad, is recognized as a page designated by the operator and it is confirmed whether the input value is not larger than the counter value of the input-page counter 23f (S57). As explained in the illustrated first embodiment, the input-page counter 23f is configured to count a number of pages of the documents which are read. Accordingly, the count value of the input-page counter 23f indicates a page of a document being currently read, namely, the number of pages of the documents which are already read up to now. Where the count value of the input-page counter 23f is "2", for example, it indicates that the page of the document being currently read is a second page, or, the total number of pages of the documents which have been read is "2". In this instance, there can be displayed on the LCD 41 up to the image corresponding to a position of the second-page document up to which the reading has been completed. Therefore, by comparing the input value inputted through the ten-key numerical pad with the count value of the input-page counter 23f, it is possible to judge whether the document page designated by the operator is already been subjected to the reading operation up to now and the image based on the image data of the document page is displayable. For permitting the operator to recognize the pages of the documents that can be designated, the count value of the input-page counter 23f is displayed on the LCD in a step, not shown, thereby notifying the operator of the number of pages of the documents which have been read, namely, the pages of the documents whose images are displayable.

Where it is confirmed that the input value inputted through the ten-key numerical pad is not larger than the count value of the input-page counter 23f (S57: YES), the image of the document page designated by the operator is displayable. In this instance, for displaying the image of the document page designated by the operator, the count value of the output-page counter 23g is updated to the input value (S58). On the contrary, where the input value inputted through the ten-key numerical key pad exceeds the count value of the input-page counter 23f (S57: NO), the image of the designated document page is not displayable. In this instance, for displaying the image of a next-page document that follows the document whose image is currently displayed, "1" is added to the count value of the output-page counter 23g (S59). Here, a message that the page of the document designated by the operator is invalid may be displayed. Where it is confirmed that there has been made no input through the ten-key numerical pad (S56: NO), the control flow goes to S59.

After S58 or S59, the control flow goes to S51 and the following steps in accordance with the count value of the output-page counter 23g. As a result, the image of the designated document page is indicated on the LCD 41, and there is executed the operation of determining the output range of the image data for the designated document page in accordance with the input operation by the operator.

As explained above, in the third embodiment, the FAX-transmission processing (S30) is executed when it is confirmed in S55 that the range-determination completion button is pressed. Accordingly, when the range-determination completion button is pressed, the image displaying is not performed even if there exists the image data based on which the image is not yet displayed. Instead, the FAX-transmission processing (S30) is initiated. Accordingly, the image data of the document page/pages for which the output range is determined and the image data of the document page/pages for which output range is not determined are transmitted while being intermingled with each other.

Here, the reading of the one-line image data in the reading processing is performed at a higher speed than the transmission of the one-line image data in the FAX-transmission processing (S30). Further, the display-editing processing and the reading processing are executed in the multitasking manner. Accordingly, even if the reading of all of the documents is not yet completed at a timing when the range-determination button is pressed, image data of a next line is already read and stored in the image memory 23a at least before a timing when the image data of the next line is transmitted. Therefore, even if the range-determination completion button is pressed and the FAX-transmission processing (S30) is initiated before the reading of the image data of all of the documents is completed, all of the image data of the read documents can be transmitted to the recipient facsimile machine, obviating a trouble that a portion of the read documents is not transmitted.

In the third embodiment, the document page whose image is displayed on the LCD 41 can be changed to the document page desired by the operator, and the operator can perform the operation of determining the output range of the image data for the desired document page whose image is displayed on the LCD 41. Accordingly, when the reading processing is executed for a plurality of pages of documents, it is possible in the present embodiment to shorten a wait time for waiting displaying of the image of the document page desired by the operator (except when the desired document page is a top page), as compared in a case where the images of the plurality of pages are sequentially displayed in the order in which the document pages were read. In other words, it is possible to omit displaying the images of the document pages for which the output range of the image data need not be specified. Thus, a series of operations and processings starting from the reading operation and ending with the outputting operation can be efficiently performed.

Referring next to FIGS. 11, 12A-12C, and 13A-13B, there will be explained a fourth embodiment of the invention. In the illustrated first embodiment, the output range of the image data is determined on the basis of the image displayed on the LCD 41 based on the read image data. In short, the images are sequentially displayed on the LCD 41 one line by one line, and there is determined, as the output range, a range of the image data based on which the image is displayed at a timing when the pause key 40B1 is pressed (while permitting the range to be modified by pressing any modification key 40B3, 40B4). Instead, in the fourth embodiment, the image based on the image data of a whole document page is displayed at one time as a predetermined unit of the image data, for instance. Further, there are indicated selection bars each as a marker which are arranged to slide on the image of the whole document page displayed on the LCD 41, and the output range of the image data is determined by positions of the selection bars. In the fourth embodiment, the same reference numerals as used in the illustrated first embodiment are used to identify the corresponding components, and a detailed description of which is dispensed with. Further, in the fourth embodiment, the same concept as explained in the illustrated preceding embodiments is not explained in the interest of brevity.

As in the illustrated third embodiments the MFD 1 in the fourth embodiment is configured to designate a page of a document whose image is to be displayed on the LCD 41, i.e., a document page whose image is to appear on a forefront of the display screen, based on a page-designating operation by the operator. The MFD 1 in the fourth embodiment is provided with a range-determination completion button similar to that of the MFD 1 in the illustrated third embodiment. Further, the MFD 1 in the fourth embodiment is configured to determine not only an end margin of the output range but also a beginning margin of the output range, by two selection bars. For determining the output range of the image data by the selection bars, the pointer memory 23$c$ includes a first pointer memory 23$c$1 and a second pointer memory 23$c$2. Further, a swap memory 23$h$ and an end-margin flag 23$j$ are provided in the RAM 23.

In the fourth embodiment, an image which is statically displayed when the pause key 40B1 is pressed corresponds to an image of each selection bar. Further, the indication positions of the selection bars are changeable by pressing any modification key 40B3, 40B4.

In the fourth embodiment, the output range of the image data is determined by a relative positional relationship between the two selection bars on the displayed image. Here, one of the two selection bars on the image which is nearer to the reading-start margin of the document is referred to as a beginning-margin selection bar while the other of the two selection bars is referred to as an end-margin selection bar.

As shown in the block diagram of FIG. 11 indicating an electric structure of the MFD 1 of the fourth embodiment, the RAM 23 is provided with the first pointer memory 23$c$1, the second pointer memory 23$c$2, the swap memory 23$h$, and the end-margin flag 23$j$.

The first pointer memory 23$c$1 and the second pointer memory 23$c$2 are respectively for storing addresses of the indication positions of the respective selection bars. In the fourth embodiment, a range of the image data defined by and interposed between the two selection bars is determined as the output range. The range indicated above is a reference range for determining the output range. For this reason, the first and second pointer memories 23$c$1, 23$c$2 are provided respectively for storing the positions of the respective two selection bars. Described more specifically, each of the addresses stored in the first and second pointer memories 23$c$1, 23$c$2 is an address in the display-image memory 23$b$ at which image data of a corresponding one of the two selection bars is written, namely, a top address of a write area in the display-image memory 23$b$ in which the image data of each selection bar is written.

The image data stored in the display-image memory 23$b$ is written in the integral memory incorporated in the LCD controller 28, and the image based on the image data is displayed on the LCD 41. The integral memory is configured to store the image data such that the image data corresponds to coordinates of each pixel on the display screen of the LCD 41. It is predetermined at which position (coordinates) of the display screen of the LCD 41 the image based on the image data stored in the display-image memory 23$b$ is to be displayed. Accordingly, the image data is written in the integral memory at a position corresponding to the coordinates.

Here, for indicating each selection bar on the LCD 41, the image data of each selection bar needs to be written in the integral memory of the LCD controller 28. That is, among the read image data of the document stored in the display-image memory 23$b$, the image data of the image that corresponds to the indication position of each selection bar needs to be replaced with the image data of each selection bar. An image of each selection bar has a width of one pixel, corresponds to one-line image data, and is indicated by a straight line that extends in the width direction of the document.

The first pointer memory 23$c$1 is referred to by the CPU 21 when the beginning-margin selection bar is indicated while the second pointer memory 23$c$2 is referred to by the CPU 21 when the end-margin selection bar is indicated. There is executed the above-described replacement of the image data in an area in the display-image memory 23$b$ ranging from the address stored in each pointer memory 23$c$1, 23$c$2 to an address shifted toward a larger address side by a predetermined number "n", namely, at addresses corresponding to the image data of one line.

In the fourth embodiment, each selection bar initially appears on the image of a first line. For indicating each selection bar on that position, i.e., on the image of the first line, there is written, into each of the first and second pointer memories 23$c$1, 23$c$2, a top address of the image data of the first line in the display-image memory 23$b$ as an initial value. Thereafter, the address stored in each pointer memory 23$c$1, 23$c$2 is updated by the predetermined number "n" being added thereto. Thus, each selection bar is indicated while being moved, one line by one line, toward the end margin of the document.

The swap memory 23$h$ is for swapping the image data stored in the display-image memory 23$b$. As explained above, when each selection bar is indicated, the image data of the selection bar is written over the image data of the display-image memory 23$b$, i.e., the execution of the above-indicated replacement of the image data. Prior to the writing of the image data of each selection bar, there is swapped, to the swap memory 23$h$, the image data stored in the display-image memory 23$b$ at the addresses corresponding to the predetermined number "n" as the write area into which the image data of each selection bar is to be written. Accordingly, even when the image data of each selection bar is written into the display-image memory 23$b$, the image data originally stored in the display-image memory is not lost. The image data swapped to the swap memory 23$h$ is written back into the original addresses in the display-image memory 23$h$ at a timing when the indication of the selection bar moves to a next line. Thereafter, the image data of the next line is swapped to the swap memory 23$h$.

The end-margin flag 23$j$ is for indicating whether it is a stage of determining the beginning margin of the output range or it is a stage of determining the end margin of the output range, in the display-editing processing. The end-margin flag 23$j$ is configured to be turned ON when the display-editing processing is initiated, thereby internally indicating that it is a stage of determining the output range by the end-margin selection bar, namely, it is the stage of determining the end margin of the output range.

The end-margin flag 23*j* which has been turned ON is turned OFF when the determination key 40B2 is pressed after the pause key 40B1 has been pressed. That is, the pressing of the pause key 40B1 and the pressing of the determination key 40B2 thereafter indicate that the end margin of the output range is determined (finalized). In other words, because the end margin of the output range is already determined, the end-margin flag 23*j* is turned OFF to internally indicate that it is a stage of determining the beginning margin of the output range.

In the display-editing processing, the CPU 21 refers to a state of the end-margin flag 23*j*. Where the end-margin flag 23*j* is ON, there is executed a processing for determining the end margin of the output range. On the other hand, where the end-margin flag 23*j* is OFF, there is executed a processing for determining the beginning margin of the output range. Thus, in the fourth embodiment, a first selection bar indicated immediately after the initiation of the display-editing processing becomes the end-margin selection bar for determining the end margin of the output range while a second selection bar subsequently indicated becomes the beginning-margin selection bar for determining the beginning margin of the output range.

Figure 12A:
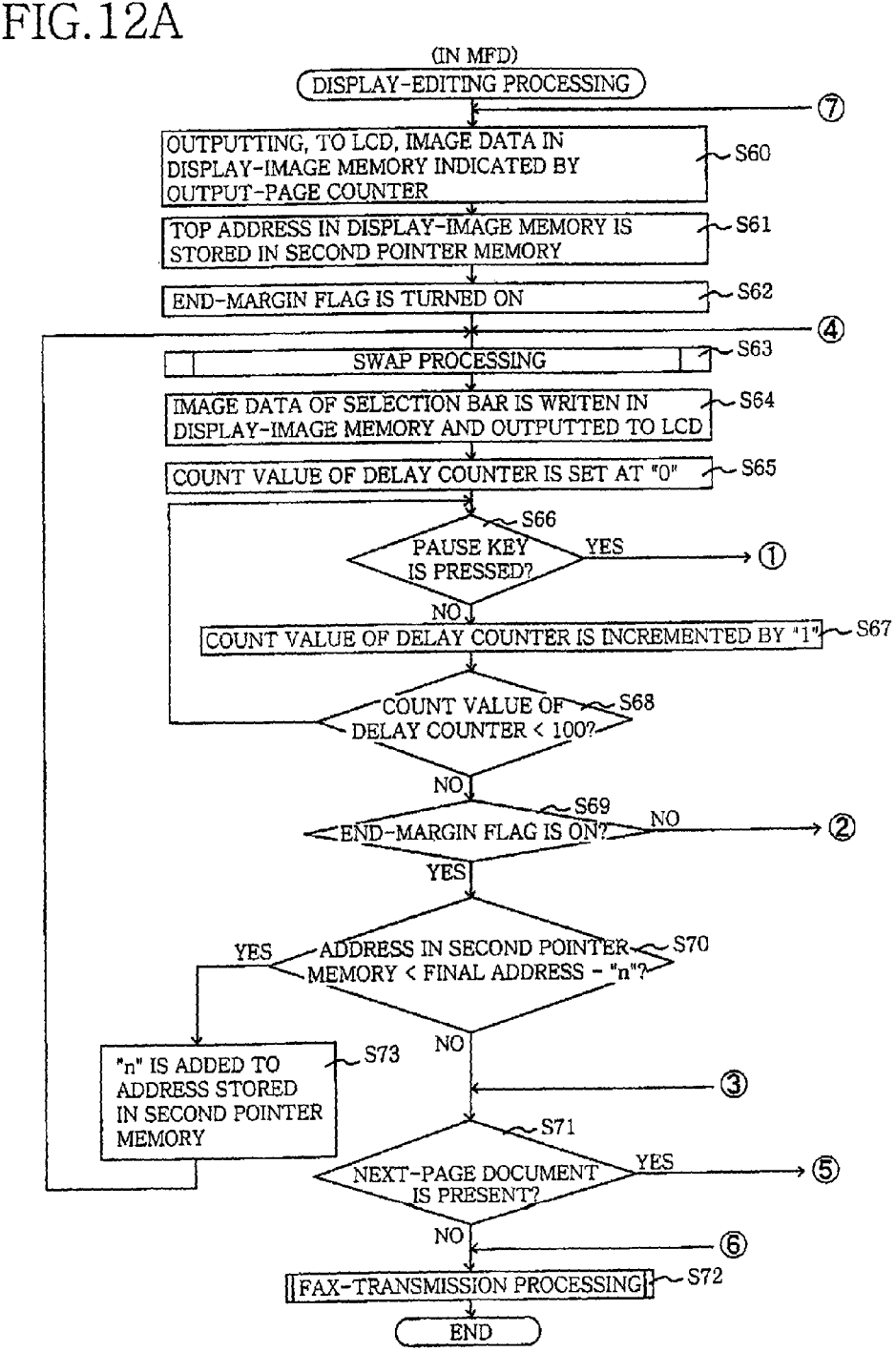
FIGS. 12A-12C show a flow chart indicating a display-editing processing routine in the fourth embodiment.
Figure 12B:
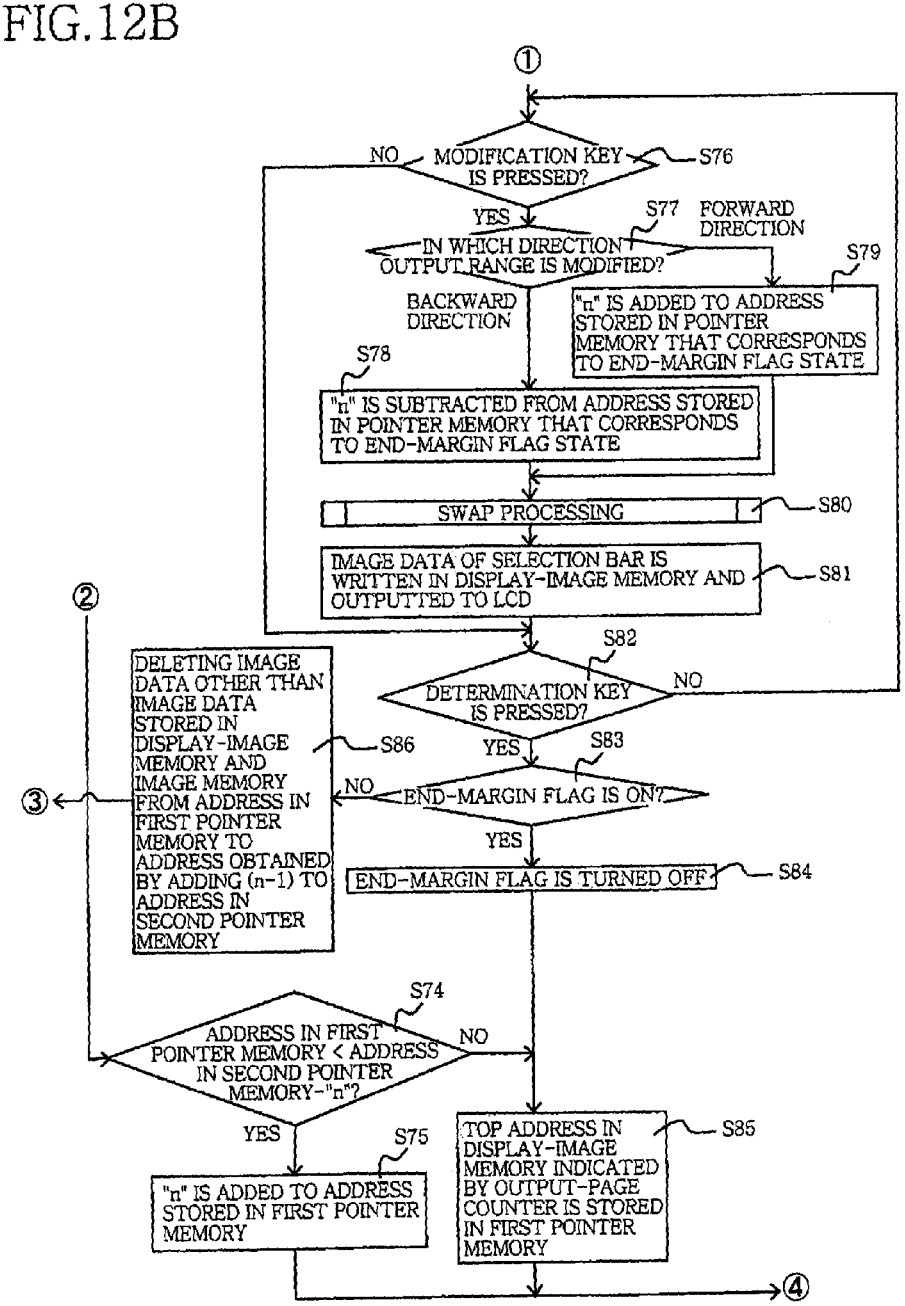
Figure 12C:
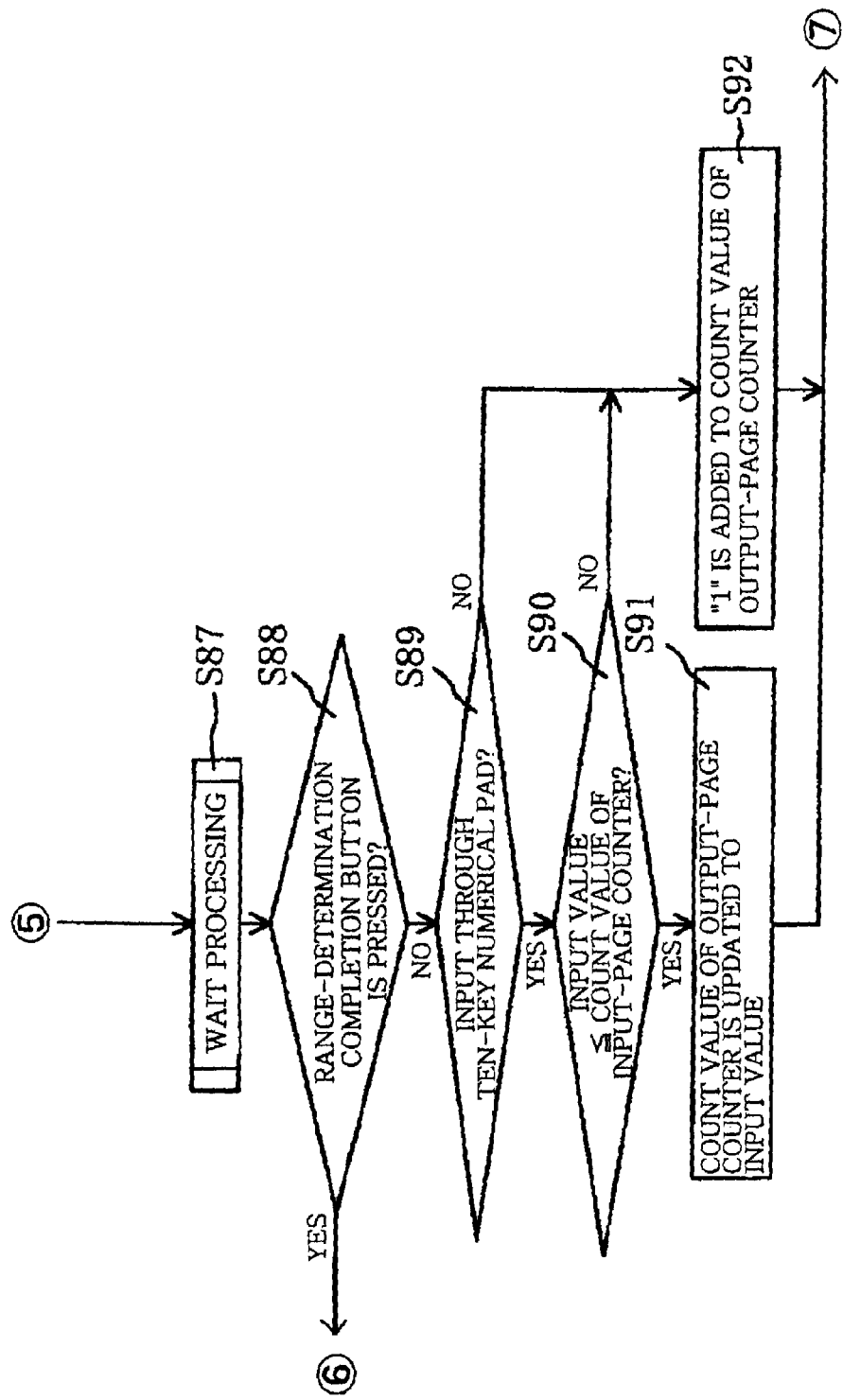

FIGS. 12A-12C indicate a flow chart showing the display-editing processing executed in the fourth embodiment. Like the display-editing processing in the illustrated first embodiment, the display-editing processing in the fourth embodiment is executed in the multitasking manner with the reading processing shown in FIG. 4. Initially, there is outputted, to the LCD 41, the image data stored in the display-image memory 23*b* indicated by the output-page counter 23*g* (S60). In the processing of S60, the image data of a one-page document is outputted in the present embodiment. Where the image data of the one-page document is not yet stored in the corresponding display-image memory 23*b*, the processing in S60 is waited for until the image data of the one-page document is stored. Thereafter, the processing in S60 is executed. Immediately after the initiation of the display-editing processing, the count value of the output-page counter 23*g* is set at "1". Therefore, the image based on the image data of a first-page document is displayed.

Subsequently, there is set, in the second pointer memory 23*c*2, a top address of the display-image memory indicated by the output-page counter 23*g*, namely an address at which top data of the image data of a first line is stored (S61). Then, the end-margin flag 23*j* is turned ON (S62) and a swap processing is executed (S63). In the swap processing (S63), the following processings are executed: (i) a write processing of writing, into the swap memory 23*h*, the image data stored in the area of the display-image memory 23*b* ranging from the address stored in one of the pointer memories 23*c*1, 23*c*2 that corresponds to the state of the end-margin flag 23*j* to the address shifted toward the larger address side by the predetermined number "n"; and (ii) a write processing of writing, the image data previously stored in the swap memory 23*h*, back into an area in the display-image memory 23*b* from which the previously swapped image data has been read out, this write processing (ii) being executed prior to execution of the above-indicated write processing (i).

In the fourth embodiment, said one of the pointer memories that corresponds to the state of the end-margin flag 23*j* is the second pointer memory 23*c*2 where the end-margin flag 23*j* is ON while said one of the pointer memories that corresponds to the state of the end-margin flag 23*j* is the first pointer memory 23*c*1 where the end-margin flag 23*j* is OFF.

Subsequently, the image data of the selection bar is written into the area of the display-image memory 23*b* ranging from the address stored in said one of the pointer memories 23*c*1, 23*c*2 that corresponds to the state of the end-margin flag 23*j* to the address shifted toward the larger address side by the predetermined number "n" and the image data in the display-image memory is outputted to the LCD 41 (S64). Subsequently, after the delay counter 23*e* is set at "0" (S65), it is confirmed whether the pause key 40B1 has been pressed (S66). Where the pause key 40B1 is not pressed (S66: NO), the count value of the delay counter 23*e* is incremented by "1" (S67) and it is confirmed whether the count value of the delay counter 23*e* is less than 100 (S68). Where the count value of the delay counter 23*e* is less than 100 (S68: YES), it means that the prescribed time (i.e., the delay time or the wait time) does not yet elapse. In this instance, the control flow goes to S66 and waits for pressing of the pause key 40B1 or a lapse of the delay time, namely, reaching of the count value of the delay counter 23*e* to "100". According to the arrangement, the selection bar which is indicated while being moved is not immediately moved to a next indication position on a next line from a current indication position on a current line, but the movement is delayed for a time counted by the delay counter 23*e*. In other words, in the reading operation of the document, the reading of the image data of the next line is performed immediately after the reading of the image data of the current line, without any delay. Accordingly, a speed at which the selection bar is moved can be made lower than the reading speed.

On the other hand, where the count value of the delay counter 23*e* is not less than "100" (S68: NO), it is confirmed whether the end-margin flag 23*j* is ON (S69). Where the end-margin flag 23*j* is ON (S69: YES), it is the stage of determining the end margin of the output range. Accordingly, it is confirmed whether the address stored in the second pointer memory 23*c*2 is less than a value obtained by subtracting "n" from a final address in the display-image memory 23*b* (the final address−n), i.e., a top address of the last line (S70). Where the address stored in the second pointer memory 23*c*2 is less than the value (the final address−n) (S70: YES), there still exists an area in which the selection bar can be moved. In a case where the address stored in the second pointer memory 23*c*2 does not yet reach the above-indicated value, there is a possibility that the operator waits for reaching of the selection bar to a desired position on the display screen of the LCD 41. In this instance, the predetermined number "n" is added to the address stored in the second pointer memory 23*c*2 (S73), and the control flow then goes to S63. Accordingly, the selection bar is moved, by one line, toward the end margin of the display image on the LCD 41, so that the selection bar is indicated at an indication position that corresponds to the next line.

On the other hand, where the address stored in the second pointer memory 23*c*2 is not less than the value (the final address−n) (S70: NO), it means that the selection bar reaches the position of the last line. In this instance, it is judged that the operation of determining the output range by the operator is not performed for the document page whose image is being displayed on the LCD 41, and it is confirmed whether there exists a next-page document by comparing the count value of the input-page counter 23*f* with the count value of the output-page counter 23*g* (S71). Where there exists no next-page document (S71: NO), there is executed a FAX-transmission processing (S72) similar to the FAX-transmission processing in the illustrated first embodiment. Then the display-editing processing is ended.

Where it is confirmed that the pause key 40B1 is pressed (S66: YES), it means that the displaying of the selection bar on the LCD 41 is requested to be paused. When the answer NO is obtained in S66, the control flow avoids taking a route to S64 and S73 in which the display image on the LCD 41 is updated. Therefore, the selection bar is not newly indicated aside from the current indication position and is statically indicated on the current indication position. Then it is confirmed whether any modification key is pressed (S76).

Where any modification key 40B3, 40B4 is pressed (S76: YES), it means that the output range specified by pressing the pause key 40B1 is requested to be modified. In this instance, it is confirmed whether the output range is requested to be modified by pressing the modification key 40B3 in a backward direction toward the reading-start margin of the document or the output range is requested to be modified by pressing the modification key 40B4 in a forward direction toward the reading-end margin of the document. That is, in determining the end margin of the output range, the output range is reduced when the modification key 40B3 is pressed whereas the output range is enlarged when the modification key 40B4 is pressed. On the contrary, in determining the beginning margin of the output range, the output range is enlarged when the modification key 40B3 is pressed whereas the output range is reduced when the modification key 40B4 is pressed.

Where it is confirmed that the modification direction is the backward direction (S77: backward direction), the predetermined number "n" is subtracted from the address stored in said one of the pointer memories 23c1, 23c2 that corresponds to the state of the end-margin flag 23j. On the other hand, where the modification direction is the forward direction (S77: forward direction), the predetermined number "n" is added to the address stored in said one of the pointer memories 23c1, 23c2 that corresponds to the state of the end-margin flag 23j (S79). After S78 or S79, there is executed a swap processing (S80) similar to that in S63. Further, the image data of the selection bar is written into the area of the display-image memory 23b ranging from the address stored in said one of the pointer memories 23c1, 23c2 that corresponds to the state of the end-margin flag 23j to the address shifted toward the larger address side by the predetermined number "n", i.e., "n" addresses, and the image data of the display-image memory 23b is outputted to the LCD 41 (S81).

Thus, where the end-margin flag 23j is ON, the indication position of the first selection bar (i.e., the end-margin selection bar) is changed. On the other hand, where the end-margin flag 23j is OFF, the indication position of the second selection bar (i.e., the beginning-margin selection bar) is changed.

Thereafter, it is confirmed whether the determination key 40B2 has been pressed (S82). Where it is confirmed that the determination key 40B2 has been pressed (S82: YES), it is checked whether the end-margin flag 23j is ON (S83). Where the end-margin flag 23j is ON (S83: YES), it can be judged that the end margin of the output range is determined (i.e., determination of the end margin of the output range) according to the processings described above. In this instance, the end-margin flag 23j is turned OFF (S84), and a top address of the display-image memory 23b that is indicated by the output-page counter 23g is set into the first pointer memory 23c (S85). Then the control flow goes to S63. Accordingly, after the control flow goes to S63, the second selection bar (i.e., the beginning-margin selection bar) is indicated at a position of a first line of the display image, so that there is performed an operation of determining the beginning margin of the output range. In this respect, the end-margin selection bar is kept displayed even after the control flow goes to S63. Further, the image data that corresponds to the indication position of each selection bar is kept in a prescribed area of the RAM 23 until a series of the image data which has been read is outputted.

Where it is confirmed that the end-margin flag 23j is OFF (S83: NO), the processing being currently executed is for determining the beginning margin of the output range. Hence, there is deleted the image data other than the image data stored in an area of the display-image memory 23b that is indicated by the output-page counter 23g and in a corresponding area of the image memory 23a, ranging from the address stored in the first pointer memory 23c1 to an address which is obtained by adding the address stored in the second pointer memory 23c2 to "(n-1)" namely, up to end data of a line starting from the address stored in the second pointer memory 23c2. Here, a range of the image data that is not deleted corresponds to the output range of the image data for the target document page. In the fourth embodiment, according to the processing in S86, the image data at the indication positions of the respective selection bars are also included in the output range. Then the control flow goes to S71. In the processing of S71, where the image data is deleted as described above, there is executed the data shifting as described above in the image memory 23a and the display-image memory 23b in a step not shown.

On the other hand, where it is confirmed that the end-margin flag 23j is OFF (S69: NO), it is confirmed whether the address stored in the first pointer memory 23c1 indicative of a current position of the beginning-margin selection bar is less than a value obtained by subtracting "n" from the address stored in the second pointer memory 23c2 (S74), for prohibiting the beginning-margin selection bar from being located nearer to the end margin of the display image (i.e., the end margin of the document image) than the end-margin selection bar. Since the address stored in the second pointer memory 23c2 represents the already determined location of the end-margin selection bar, the address in the second pointer memory 23c2 is a fired value upon implementation of S74 in which the processing comes to a stage of determining the beginning-margin of the output range. In the processing of S74, it is checked whether the current position of the beginning-margin selection bar is located apart from the position of the end-margin selection bar by a distance corresponding to one line or more, in order to prevent the beginning-margin selection bar from overlapping the end-margin selection bar when the beginning-margin selection bar is moved by one line.

Where the address stored in the first pointer memory 23c1 is less than the value obtained by subtracting "n" from the address stored in the second pointer memory 23c2 (S74: YES), "n" is added to the address stored in the first pointer memory 23c1 (S75), and the control flow goes to S63. Accordingly, the address stored in the first pointer memory 23c1 is updated "n" by "n" so as not to exceed the above-indicated value obtained by subtracting "n" from the address stored in the second pointer memory 23c2, whereby the indication position of the second selection bar is moved one line by one line.

Where the address stored in the first pointer memory 23c1 is not less than the value obtained by subtracting "n" from the address stored in the second pointer memory 23c2 (S74: NO), the beginning-margin selection bar would overlap the end-margin selection bar if the beginning-margin selection bar was moved by one line. To avoid this, the control flow goes to S85 to change the indication position of the beginning-margin selection bar to a position corresponding to the first line, whereby the operation of determining the beginning margin of the output range can be again performed.

Where it is judged that there exists a next-page document (S71: YES), a wait processing is executed (S87) and it is confirmed whether the range-determination completion button has been pressed (S88). Where the range-determination completion button has been pressed (S88: YES), it means that the output range is not determined for other-page documents, namely, the operation of determining the output range in the current execution of the reading processing is completed. Therefore, the control flow goes to S72 to execute the FAX-transmission processing in which the image data is transmitted to the recipient facsimile machine.

On the other hand, where the range-determination completion button has not been pressed (S88: NO), it is confirmed whether there has been made an input through the ten-key numerical pad (S89). Where there has been made an input through the ten-key numerical pad (S89: YES), it is confirmed whether the input value inputted from the ten-key numerical pad is not larger than the count value of the input-page counter 23$f$ (S90). Where the input value is not larger than the count value of the input-page counter 23$f$ (S90: YES), it means that the image of the document page designated by the operator is displayable. In this instance, for displaying the image of the document page desired by the operator, the count value of the output-page counter 23$g$ is updated to the input value (S91). On the other hand, where the input value inputted from the ten-key numerical pad exceeds the count value of the input-page counter 23$f$ (S90: NO), the image of the document page designated by the operator is not displayable. In this instance, "1" is added to the count value of the output-page counter 23$g$ (S92) to display the image of the next-page document that follows the document whose image is currently being displayed. On the other hand, where it is confirmed that there has not been made any input from the ten-key numerical pad (S89: NO), the control flow goes to S92. After S91 or S92, the control flow goes to S60, and the processings in S60 and the following steps are executed depending upon the count value of the output-page counter 23$g$. Accordingly, the image of the designated document page is displayed on the LCD 41, and the operation of determining the output range for the designated document page is executed in accordance with commands to be inputted by the operator.

Where it is confirmed that any modification key 40B3, 40B4 is not pressed (S76: NO), the control flow goes to S82. Where it is confirmed that the determination key 40B2 is not pressed (S82: NO), the control flow goes to S76 to wait that the modification keys 40B3, 40B4 or the determination key 40B2 is pressed.

In other word, when the movement of the selection bar indicated on the display image is paused by pressing the pause key 40B1, the position of the selection bar, namely, the beginning margin or the end margin of the output range, is provisionally determined. The position of the selection bar is not finalized unless the determination key 40B2 is pressed. That is, the output range (the beginning margin or the end margin thereof) determined by the selection bar is modifiable by operating the modification keys 40$b$3, 40B4 until the determination key 40B2 is pressed.

In this respect, for permitting the operator to recognize the document pages that can be designated, the count value of the input-page counter 23$f$ is displayed on the LCD 41 in a step, not shown, so as to notify the operator of a number of pages of the read documents, i.e., a number of pages of the documents whose images are displayable.

Figure 13A:
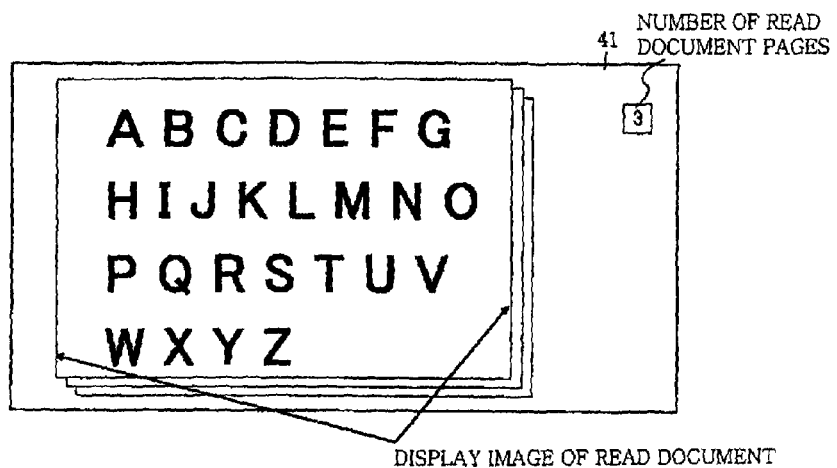
FIGS. 13A-13B are views showing examples of display images displayed on the display screen in the fourth embodiment
Figure 13B:
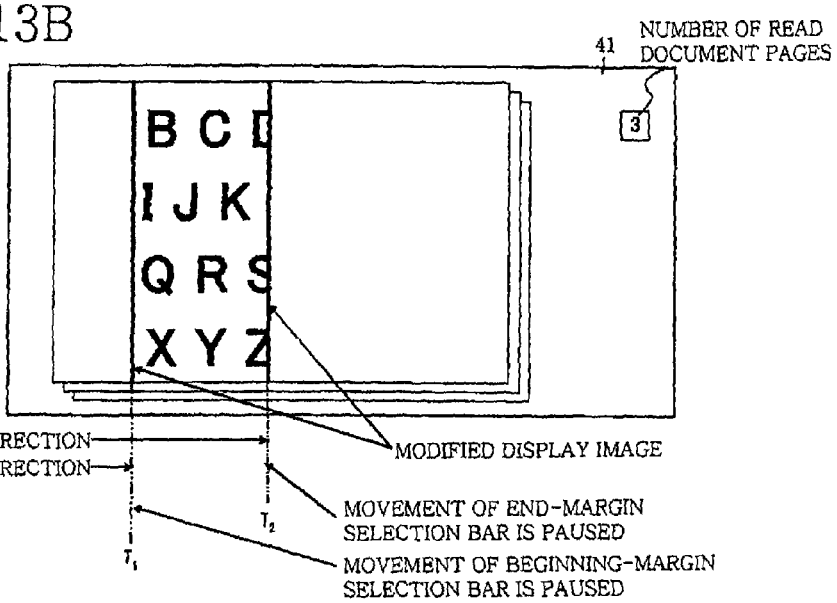

FIGS. 13A and 13B show examples of the display images displayed on the display screen of the LCD 41 when the display-editing processing in the fourth embodiment is executed. In FIGS. 13A and 13B, the reading operation is performed on the documents with an A-4 size.

Within the display screen of the LCD 41, there is indicated a frame which is defined by a size of the document to be read.

In FIGS. 13A and 13B, the size of the frame corresponds to the A-4 size. The image based on the image data read out from the display-image memory 23$b$ is displayed in the frame on a page-by-page basis. FIG. 13A shows a state in which the image based on whole image data of a one-page document which has been read is displayed on a forefront of the display screen. In this state, the selection bars are to be indicated. It is noted that the image based on the image data of the designated document page is displayed on the LCD when the document page is designated by the operator through the ten-key numerical key pad. At an upper right portion of the LCD 41, the count value of the input-page counter 23$f$ is indicated to indicate the number of the document pages which have been read. The arrangement notifies the operator up to which page the operator can designate.

FIG. 13B shows a state in which the output range of the image data is detrermined by the two selection bars. Both of the selection bars are arranged to be moved from left to right in the figure, namely, from the reading-start margin to the reading-end margin. In FIG. 13B, the end-margin selection bar is stopped at a position $T_2$ due to pressing the pause key 40B1. The beginning-margin selection bar is stopped at a position $T_1$ due to pressing the pause key 40B1. Therefore, the output range of the image data for that document page is a range sandwiched between the two selection bars, i.e., between $T_1$ and $T_2$.

Thus, the MFD 1 according to the fourth embodiment is configured such that the selection bars are indicated while being moved and the movement of the selection bars is paused by pressing the pause key 40B1, whereby the output range of the image data can be determined for a one-page document. Further, both of the beginning margin and the end margin of the output range can be determined.

In the illustrated fourth embodiment, the image based on whole image data of the one-page document is displayed on one display screen. A range of the image data smaller than the range of the whole image data may be set as a predetermined unit, and there may be displayed, on the LCD 41, an image based on the image data in the smaller range. Further, the MFD 1 according to the fourth embodiment may be equipped with the image scrolling means provided in the MFD 1 according to the third embodiment.

In each of the illustrated embodiments, the images are displayed on the LCD 41 in the order in which the image data was read, by a series of operations including: the writing operation in which the image data written from the image memory 23$a$ into the display-image memory 23$b$ is written into the integral memory incorporated in the LCD controller 28; and the displaying operation in which an image based on the image data in the integral memory is displayed on the LCD 41. Namely, the images based on the stored data are sequentially displayed in a predetermined order.

The MFD 1 in each of the illustrated embodiments is configured such that various operations indicated above are controlled by the control section 20. In view of the functions of the MFD 1, it may be considered that the control section 20 has various functional portions. The functional portions include an image-data storing portion, a reference-range managing portion, a display controlling portion, a timing controlling portion, a command detecting portion, an output-range determining portion, an outputting portion, and a designating portion, and so on. The function of each functional portion is realized by execution of various programs indicated above by the CPU 21. Accordingly, among various steps included in the programs, steps for realizing the processings of the respective functional portions indicated above respectively correspond to an image-data storing step, a reference-range managing step, a display controlling step, a timing controlling step, a command-detecting step, an output-range determining step, an outputting step, and a designating step, for instance.

More specifically described, the image-data storing portion is constituted by including a portion of the control section 20 that executes the processings in S9, S10. The reference-range managing portion is constituted by including a portion of the control section 20 that executes the processings in S28, S31, S70, S73. The display controlling portion is constituted by including the LCD controller 28 and a portion of the control section 20 that executes the processings in S23, S64. The timing controlling portion is constituted by including a time counter and a portion of the control section 20 that executes the processings in S26, S27, S67, S68. The command detecting portion which detects the specific command is constituted by including a portion of the control section 20 that executes the processings in S25, S76. The output-range determining portion is constituted generally by including a portion of the control section 20 that executes the processings in S33-S38, S76-S82. Since the output-range determining portion also executes the processing of changing a determined output range, the output-range determining portion includes an output-range changing portion (S35-S38, S78-S81) and further includes a change-information detecting portion (S33, S76) which detects change information that is for changing the output range. The outputting portion is constituted by including a portion of the control section 20 that executes the processing in S30. The designating portion which designates the image-data receiving device is constituted by including the operation-mode selecting keys 40A1-40A3, the operation-mode flag 23*d*, and a portion of the control section 20 that executes the processing in S3. Further, the MFD 1 according to the illustrated fourth embodiment is configured such that the marker is indicated on the display device for permitting the reference range to be visually identified. Accordingly, in the control section 20 of the MFD 1 in the fourth embodiment, the display controlling portion includes a marker indicating portion which executes the processing in S64.

While the preferred embodiments of the present invention have been described in detail by reference to the drawings, it is to be understood that the present invention may be otherwise embodied.

In the display-editing processing in each of the illustrated embodiments, the output range cannot be modified when the end margin of the output range reaches the reading-end margin of the document as a result of updating of the pointer memory 23*c*. The arrangement may be modified to wait for pressing the modification keys 40B3, 40134 during a predetermined time period after it is judged that the end margin of the output range reaches the reading-end margin of the document and to enable modification of the output range until the output range is finalized due to pressing of the determination key 40B2, in a case where the modification keys 40B3, 40B4 are pressed.

In the illustrated embodiments, the delay counter 23*e* measures the prescribed delay time by which the image displaying is delayed with respect to the image reading. The delay time may be measured by an integral timer circuit incorporated in the control section 20, for instance. Further, in the illustrated embodiments, the image displaying is executed when the count value of the delay counter 23*e* reaches "100", for instance, in the display-editing processing. That is, the value counted by the delay counter 23*e* to delay the image displaying is made "100". The value may be smaller or larger than "100".

In the illustrated embodiments, the count value counted by the delay counter 23*e*, namely, the delay time, is a fixed value. Instead, the count value counted by the delay counter 23*e* may be configured to be inputted by a suitable inputting operation through the control panel 4 and the count value to be counted by the delay counter 23*e* in the display-editing processing may be set at the inputted value, that is, the delay counter 23*e* may be configured to count up to the inputted value. According to the arrangement, the image displaying speed at which the one-line images are successively displayed on the LCD 41 or the speed at which the selection bars are moved can be modified depending upon the inputted value, thereby enabling the image displaying at an appropriate speed suitable for the skill of the operator. Further, a switch for changing or switching the image displaying speed may be provided, and there may be stored in advance different values determined for different states of the switch. The count value counted by the delay counter 23*e* may be selected depending upon the state of the switch. Described more specifically, every time the CPU 21 judges whether the count value of the delay counter 23*e* reaches the set value, the CPU 21 may refer to the state of the switch and judge termination of the counting by the delay counter 23*e* based on the state. As the value selected depending on the state of the switch becomes larger, the image displaying speed becomes lower. Accordingly, if the operator operates the switch, the image displaying speed by which the images are displayed on the LCD 41 can be changed during the operation of determining the output range. Therefore, the operator can accurately judge a timing of pressing the pause key 40B1 and determine the desired output range with high accuracy while visually checking or identifying the LCD 41 on which the image displaying progresses at a relatively low speed. In addition, when the images of the read document pages are successively displayed, the image of the document page for which the output range does not need to be determined can be displayed at a speed higher than a speed at which the image of the document page for which the output range needs to be determined is displayed. Therefore, it is possible to reduce a time required for the entire processing. Where either of the above-indicated arrangements is employed, the control section 20 is constituted to have a prescribed-count-value setting portion which sets the inputted value as the count value counted by the delay counter 23*e*.

In the display-editing processing in each of the illustrated embodiments, when the read image data is deleted from the image memory 23*a* and display-image memory 23*b* by the operation of the operator, the data shifting is executed such that the image data of different document pages remaining in the image memory 23*a* and the display-image memory 23*b* is continuous with each other. Without executing the data shifting, there may be provided a management memory for managing a final address of the image data in each of the document pages, and the image data may be read out based on the addresses stored in the management memory, whereby the images based on the image data may be successively displayed on the LCD 41 and the image data may be continuously outputted to the image-data receiving device.

In the illustrated third and fourth embodiments, the display-editing processing has the step of judging a presence or an absence of a next-page document, and the FAX-transmission processing (S30, S72) is executed where there exists no next-page document. Instead of the judging step, the control flow may be configured to go to the FAX-transmission processing (S30, S72) depending upon whether the range-determination completion button is pressed or not. In the third and the fourth embodiments, it is possible to determine the output range for a document page that is randomly selected or designated by the operator. Where there are five pages of read documents in total, the operator can deal with the documents in the following procedure, for instance: (i) the operator determines the output range of the image data for a first-page document; (ii) after skipping a second-page document and a third-page document, the operator controls the MFD 1 to display the image of a fourth-page document and determines the output range of the image data for the fourth-page document; and (iii) the operator controls the MFD 1 to display the image of the second-page document and determines the output range of the image data for the second-page document. However, at a timing when the image of a fifth-page document is displayed, even if the operator finds that there exists a document page, among the first-page through the fourth-page documents, for which the output range should be determined, it is impossible for the operator to determine the output range for the first-page through the fourth-page documents. In view of this, the display-editing processing in each of the third and fourth embodiments may be modified as follows. That is, it is judged that the operator has finished determining the output range based on pressing the range-determination completion button, and the FAX-transmission processing (S30, S72) is executed on the condition that the range-determination completion button is pressed. In other words, the display-editing processing may be configured such that, even after a final-page document is already displayed, the operator can determine the output range for previous-page documents.

In each of the illustrated third and fourth embodiments, for allowing the operator to easily recognize that inputting the designated document page or pressing the range-determination completion button is possible during the wait processing (S54, S87), there may be made, on the LCD 41, an indication that requests inputting the designated document page or pressing the range-determination completion button.

In the illustrated third and fourth embodiments, the designation of a desired document page and the operation based on the pressing of the range-determination completion button are arranged to be executable after displaying the image of the first-page document. Instead, the designation of the desired document page and the operation based on the pressing of the range-determination completion button may be arranged to be executable at a timing when the display-editing processing is initiated. Further, in the third and fourth embodiments, the designation of the desired document page by an input through the ten-key numerical pad and the completion of determination of the output range can be notified only at a timing when the displaying of the image of a one-page document has finished, namely, only within the wait processing (S54, S87). In place of this, the display-editing processing may be modified as follows. That is, during the display-editing processing, the input through the ten-key numerical pad and the pressing of the range-determination completion button are monitored all the time. Immediately when the CPU 21 recognizes the inputting or the pressing, namely, at a timing when the inputting or the pressing is made, the image of the designated document page may be displayed or the FAX-transmission processing (S30, S72) may be executed. According to the arrangement, even in the middle of displaying the image of the one-page document the image of the designated document page can be immediately displayed or the FAX-transmission processing (S30, S72) can be immediately executed.

In the illustrated fourth embodiment, the beginning margin and the end margin of the output range are determined. The arrangement may be modified such that only the end margin is determined while setting the reading-start margin of the document as the beginning margin. On the contrary, only the beginning margin may be determined by the selection bar while setting the reading-end margin of the document as the end margin. In the illustrated fourth embodiment, the output range is modified by the movement of the selection bars. Instead, the color of the image being displayed may be changed in accordance with the modification of the output range. For instance, the image being initially displayed is black in color, and an unnecessary image part based on unnecessary image data outside the output range may be gradually indicated in a gray color in accordance with the modification of the output range. Further, the beginning margin and the end margin of the output range may be indicated by any suitable marks other than the selection bars.

As an example of updating the output range of the image data, the output range is gradually enlarged, i.e., one line by one line, in the illustrated first embodiment. The output range may be otherwise updated. For instance, after the reading operation on a first-page document has been completed, the image based on whole image data of the first-page document is displayed, and the displayed image is reduced such that the range of the image data to be selected gradually reduces.

It is to be understood that the present invention may be embodied with various other changes and modifications, which may occur to those skilled in the art, without departing from the spirit and scope of the invention defined in the appended claims.

What is claimed is:

1. An image reading apparatus comprising:
   a scanner which reads an image recorded on a document to obtain image data of the image by scanning;
   an operable portion which is to be operated by an operator;
   an outputting portion which outputs the image data read by the scanner;
   a read-controlling portion configured to conduct a reading operation in which the scanner reads and obtains sections of the image data of the document, wherein parts of the image respectively corresponding to the sections of the image data are read in a reading order;
   an image-data storing portion which stores, in a memory, the sections of the image data read by the scanner in the reading order;
   a display device which displays a display image based on the sections of the image data stored in the image-data storing portion, the display image corresponding to the image recorded on the document;
   a reference-range-information storing portion which stores reference-range information that is required to determine a reference range of the image data, the reference range being a range of the sections of the image data that are stored in the image-data-storing portion and are to be displayed as the display image on the display device;
   a reference-range managing portion which determines, on the basis of the reference-range information stored in the reference-range-information storing portion, the reference range of the image data stored in the memory by the image-data storing portion and which successively updates the reference-range information such that the reference range successively changes by a prescribed size;
   a display controlling portion which controls the display device to display the display image in a manner that parts of the display image respectively corresponding to the sections in the reference range are displayed in the same order as the reading order on the basis of the reference-range information;
   a timing controlling portion which controls updating intervals at which the reference range is updated by the prescribed size, such that an amount of the image data that corresponds to the display image newly displayed in a certain time period is smaller than an amount of the image data newly stored in the memory in the certain time period;
a command detecting portion which detects a specific command which is to be inputted through the operable portion; and
an output-range determining portion which determines an output range of the sections of image data that are stored in the memory and are to be outputted by the outputting portion, on the basis of the reference range decided based on the reference-range information that is the most recently updated by the reference-range managing portion, when the specific command is detected by the command detecting portion.

2. The image reading apparatus according to claim 1,
wherein the timing controlling portion includes a time counter which measures a prescribed time that corresponds to a time length of each of the updating intervals, and
wherein the reference-range managing portion is configured to update the reference-range information when a count value counted by the time counter reaches a prescribed count value.

3. The image reading apparatus according to claim 2, further comprising a prescribed-time setting portion which sets the prescribed time, on the basis of information inputted through the operable portion.

4. The image reading apparatus according to claim 1, wherein the reference-range managing portion is configured to update the reference-range information such that the reference range increases by the prescribed size.

5. The image reading apparatus according to claim 1,
wherein the reference-range managing portion is configured to update the reference-range information such that the reference range increases by the prescribed size, and
wherein the display controlling portion is configured to control the display device to display, as the display image, a part of the image of the document that corresponds to the image data within the reference range, such that, each time when the reference range increases by the prescribed size, the display device displays, by scrolling, an image based on the image data that corresponds to the prescribed size of the reference range by which the reference range is increased.

6. The image reading apparatus according to claim 1, wherein the reference-range managing portion is configured to stop updating the reference-range information when the specific command is detected by the command detecting portion.

7. The image reading apparatus according to claim 1,
wherein the reference-range managing portion is configured to determine the reference range such that a beginning margin of the reference range corresponds to a reading-start margin of the document from which the scanner starts reading and to update the reference-range information such that an end margin of the reference range is updated.

8. The image reading apparatus according to claim 1, wherein the display controlling portion is configured to control the display device to display, as the display image, an image of the document based on the image data stored in the memory and includes a marker indicating portion which indicates a marker for identifying the reference range at a position in the display image, which position is decided based on the reference-range information.

9. The image reading apparatus according to claim 8, wherein the reference-range managing portion is configured to update the reference-range information such that the reference range of the image data increases by the prescribed size.

10. The image reading apparatus according to claim 8,
wherein the reference-range managing portion is configured to stop updating the reference-range information when the specific command is detected by the command detecting portion, and
wherein the marker indicating portion is configured to make the marker static at a time when the reference-range managing portion stops updating the reference-range information.

11. The image reading apparatus according to claim 8,
wherein the reference-range-managing portion is configured to determine the reference range such that a beginning margin of the reference range corresponds to one end of the display image and to update the reference-range information such that an end margin of the reference range is updated, and
wherein the marker indicating portion is configured to indicate the marker at a position in the display image that corresponds to the end margin of the reference image, such that the marker moves from said one end to another end of the display image in accordance with the updating of the reference-range information.

12. The image reading apparatus according to claim 8,
wherein the command detecting portion is configured to detect two specific commands each as the specific command,
wherein the reference-range managing portion is configured to update the reference-range information such that a beginning margin and an end margin of the reference range are updated independently of each other,
wherein the marker indicating portion is configured to indicate two markers each as the marker, such that one of the two markers is indicated at a position corresponding to the end margin of the reference range while the other of the two markers is indicated at a position corresponding to the beginning margin of the reference range, and
wherein the output-range determining portion is configured to determine an end margin of the output range on the basis of the end margin of the reference range at a time when said one of the two specific commands is detected and determine a beginning margin of the output range on the basis of the beginning margin of the reference range at a time when the other of the two specific commands is detected.

13. The image reading apparatus according to claim 1, further comprising a designating portion which designates an image-data receiving device to which the outputting portion is to output the image data, and
wherein the outputting portion is configured to output, to the image-data receiving device designated by the designating portion, the image data within the output range that is determined by the output-range determining portion when the specific command is detected by the command detecting portion.

14. The image reading apparatus according to claim 1, further comprising: a change-information detecting portion which detects change information which is to be inputted through the operable portion and which is for changing the output range that is determined by the output-range determining portion; and an output-range changing portion which changes the output range upon detection of an input of the change information by the change-information detecting portion, such that image data within a range decided based on the change information among the image data stored in the memory is added to or deleted from the image data within the output range determined by the output-range determining portion, wherein the outputting portion is configured to output image data within the output range changed by the output-range changing portion, in a case where the output-range changing portion has changed the output range.

15. A computer-readable non-transitory medium storing a control program for an image reading apparatus comprising: a scanner which reads an image recorded on a document to obtain image data of the image by scanning; a display device which displays a display image based on the image data read by the scanner; and an operable portion which is to be operated by an operator, the control program comprising:

a read-controlling step of conducting a reading operation in which the scanner reads and obtains sections of the image data of the document, wherein parts of the image respectively corresponding to the sections of the image data are read in a reading order;

an image-data storing step of storing, in a memory, the sections of the image data read by the scanner in the reading order;

a reference-range managing step of determining, on the basis of reference-range information required for determining a reference range of the image data, the reference range of the image data stored in the memory in the image-data storing step and successively updating the reference-range information such that the reference range successively changes by a prescribed size, the reference range being a range of the sections of the image data that are stored in the memory and are to be displayed as the display image on the display device;

a display controlling step of controlling the display device to display the display image in a manner that parts of the display image respectively corresponding to the sections in the reference range are displayed in the same order as the reading order on the basis of the reference-range information;

a timing controlling step of controlling updating intervals at which the reference range is updated by the prescribed size, such that an amount of the image data that corresponds to the display image newly displayed in a certain time period is smaller than an amount of the image data newly stored in the memory in the certain time period;

a command-detecting step of detecting a specific command which is to be inputted through the operable portion;

an output-range determining step of determining an output range of the sections of image data that are stored in the memory and are to be displayed as the display image on the display device, on the basis of the reference range decided based on the reference-range information that is the most recently updated in the reference-range managing step, when the specific command is detected in the command detecting step; and an outputting step of outputting the image data within the reference range determined in the output-range determining step.

* * * * *